(12) United States Patent
Vissers et al.

(10) Patent No.: US 10,461,311 B1
(45) Date of Patent: Oct. 29, 2019

(54) DEVICES, SYSTEMS, AND METHODS FOR MOLTEN FLUID ELECTRODE APPARATUS MANAGEMENT

(71) Applicant: Vissers Battery Corporation, Wheaton, IL (US)

(72) Inventors: Daniel R. Vissers, Wheaton, IL (US); Manoel Tenorio, Brasilia (BR)

(73) Assignee: Vissers Battery Corporation, Wheaton, IL (US)

( * ) Notice: Subject to any disclaimer, the term of this patent is extended or adjusted under 35 U.S.C. 154(b) by 0 days.

(21) Appl. No.: 15/982,497

(22) Filed: May 17, 2018

(51) Int. Cl.
*H01M 4/02* (2006.01)
*H01M 4/13* (2010.01)
*H01M 4/04* (2006.01)

(52) U.S. Cl.
CPC ........... *H01M 4/13* (2013.01); *H01M 4/0476* (2013.01)

(58) Field of Classification Search
CPC ..................................................... H01M 4/02
See application file for complete search history.

(56) References Cited

U.S. PATENT DOCUMENTS

| | | |
|---|---|---|
| 3,531,324 A | 9/1970 | Fischer et al. |
| 4,007,315 A | 2/1977 | Brinkmann |
| 4,913,985 A | 4/1990 | Baer |
| 5,070,933 A | 12/1991 | Baer |
| 5,385,793 A | 1/1995 | Tiedemann |
| 5,569,552 A | 10/1996 | Rao |
| 5,834,132 A | 11/1998 | Hasegawa |
| 6,329,096 B2 | 12/2001 | Kawakami |
| 6,551,740 B1 | 4/2003 | Melichar |

(Continued)

FOREIGN PATENT DOCUMENTS

FR 2934087 1/2010

OTHER PUBLICATIONS

Electrochemical Power Sources; Primary & Secondary Batteries; Edited by: M Barak Published by: The Institution of Electrical Engineers, London and New York; Peter Peregrinus Ltd., Stevenage, UK, and New York, ISBN 0-906048-26-5, pp. 318-321.

(Continued)

*Primary Examiner* — Jacob B Marks
(74) *Attorney, Agent, or Firm* — Gavrilovich, Dodd & Lindsey, LLP; Charles D. Gavrilovich, Jr.

(57) ABSTRACT

An apparatus comprises a plurality of negative electrode reservoirs configured to contain a negative electrode material, a plurality of positive electrode reservoirs configured to contain a positive electrode material and a reaction chamber. A heating system is configured to heat negative electrode material within a selected negative electrode material reservoir and to heat positive electrode material in a selected positive electrode material reservoir to maintain the electrode materials in the selected reservoirs in a fluid state while maintaining, in a non-fluid state, negative electrode material in a non-selected negative electrode reservoir and positive electrode material in a non-selected positive electrode reservoir. An electrode material distribution system is configured to cycle fluid positive electrode material between the selected positive electrode reservoir and the reaction chamber and configured to transfer, during a discharge state of the apparatus, fluid negative electrode material from the selected negative electrode reservoir to the reaction chamber.

56 Claims, 13 Drawing Sheets

(56) References Cited

U.S. PATENT DOCUMENTS

| | | | |
|---|---|---|---|
| 6,683,002 | B1 | 1/2004 | Chooi et al. |
| 8,404,375 | B2 | 3/2013 | Gaben |
| 2010/0104936 | A1 | 4/2010 | Meintschel |
| 2012/0003516 | A1 | 1/2012 | Eisenhour |
| 2012/0171524 | A1* | 7/2012 | Hiraiwa .............. H01M 10/399 429/50 |
| 2013/0122331 | A1 | 5/2013 | McDonald |

OTHER PUBLICATIONS

Molleigh Preefer; MTRL 286G, Spring 2016 "Lithium-Sulfur batteries and discharge products from cycling"; pp. 1-20.
Farday Constant; Wikipedia, https://en.m.wikipedia.org/wiki/Faraday_constant; pp. 1-3.
Kurt J. Lesker Company website; Feedthroughs & Viewports; https://www.lesker.com/newweb/menu_Feedthroughs.cfm?section=liquid&init=skip.
INCELL CEO, Stefan Jansson interview; Smart lithium batteries for Telecom industry; https://www.youtube.com/watch?v=FZsiQyqF1rl&feature=youtu.be.
Willmott, A.J. ; http://www.thermopedia.com/content/1832/ Regenerative Heat Exchangers; pp. 1-18.
Recuperator; Wikipedia, https://en.wikipedia.org/Rucuperator, pp. 1-4 https://en.wikipedia.org/wiki/.
https://en.wikipedia.org/Regeneratiave_heat_exchanger, pp. 1-4.
Honeywell, "Dielectric Constant Table", www.honeywellprocess.com/library/marketing/tech-specs/Dielectric%20Constant%20Table.pdf, Jun. 6, 2011, p. 45.
https://www.sensormag.com/components/a-dozen-ways-to-measure-fluid-level-and-how-they-work [finish] Hopper, Henry; A Dozen Ways to Measure Fluid-level and How they Work; Sensors Online; Components; pp. 1-11.
https://en.m.wikipedia.org/wiki/Flow_battery; pp. 1-14.
DOW Data Sheet https://msdssearch.dow.com/PublishedLiteratureDOWCOM-dh_0880/0901b80380880bfe.pdf?filepath=/heattrans/pdfs/noreg/176-01435.pdf&frompage=GetDoc (more . . .) pp. 1-28.
Suberu, Mohammed Yekini, "Energy storage system for renewable energy power sector integration and mitigation of intermittency" Renewable and Sustainable Energy Reviews 35(2014) 499-514; journal homepage: www.elsevier.com/locate/rser.
https://www.hielscher.com/ultrasonically-Homogenizers for Liquid Processing; pp. 1-15.
https://www.hielscher.com/ultrasonically-assisted-catalytic-extraction.htm; pp. 1-8.
http://www.fiberceramics.com/Selee_Corporation_Metal_Foam_Details.php; SELEE Ceramic Foam Filters—World leader in foundry metal filtration and advanced ceramic; pp. 1-5.
https://en.m.wikipedia.org/wiki/Plastic_Extrusion; pp. 1-8.
Greebblatt, Martha; Ionic Conductors; ; Rutgers, The State University of New Jersey USA; pp. 1-34.
Material and Process Selection Charts; CES 2010 EDUPACK; Granta Material Insp; Cambridge University; pp. 1-41.
https://en.m.wiktionary.org/wiki/aliovalent; pp. 1-2.
https://en.m.wikipedia.org/wiki/Crystallographic_defect; pp. 1-7.
https://link.springer.com/article/10.1007/s11581-015-1498-8; Jolley, A., et al.; Improving the ionic conductivity of NASICON through aliovalent cation substitution of Na3Zr2Si2PO12; Ionics (2015) 21:3031-3038.
Liang, C.C., et al., "A High Energy Density Solid-State Battery System"; J. Electrochem. Soc., Electrochemical Science and Technology; Apr. 1976; pp. 453-458.
Liang, C.C.; "Conduction Characteristics of the Lithium Iodide-Aluminum Oxide Solid Electrolytes"; J. Electrochem. Soc., Oct. 1973; pp. 1289-1292.
Rea, J.R. et al., "Development of a Solid-State Secondary Battery System"; Solid State Ionics 3/4 (1981); 267-271.
Okamoto, H.; The Li-S (Lithium-sulfur) System; Asahi University; Journal of Phase Equilibria, vol. 16, No. 1, Feb. 1995, pp. 94-97.
Liang, C.C., et al., "Solid-State Storage Battery System"; J. Applied Electrochemistry; 8 (1978) 445-454.
https://en.m.wikipedia.org/wiki/Molten-salt_battery; pp. 1-5.
https://en.m.wikipedia.org/wiki/Ford Ecostar; pp. 1-4.
https://en.m.wikipedia.org/wiki/State_diagram; pp. 1-9.
Zhang, Shuo, et al.; "Advanced electrolyte/additive for lithium-ion batteries with silicon anode"; Science Direct; Current Opinion in Chemical Engineering; vol. 13, Aug. 2016; pp. 24-35.
Zhan Lin, et al., "Lithium-Sulfer Batteries: From Liquid to Solid Cells?" Department of Chemical & Biological Engineering, Zhejiang University, Hangzhou, Zhejiang, China; Center for Nanophase Materials Sciences, Oak Ridge National Laboratory, Oak Ridge, TN, USA.
https://authors.library.caltech.edu/5456/1/hrst.mit.edu/hrs/materials/public/Weber&Kummer1967.htm; Weber, Neil et al., Sodium-Sulfur Secondary Battery; Session on Vehicle Propulsion Batteries—Ford Motor Company.
Jolley et al., "Improving Ionic Conductity of NASICON through aliovalent cation substitution of Na3Xr2Si2PO12"; Ionics (2015) 21:3031-3038.
https://en.m.wikipedia.org/wiki/Ionic radius; pp. 1-12.

* cited by examiner

US 10,461,311 B1

DEVICES, SYSTEMS, AND METHODS FOR MOLTEN FLUID ELECTRODE APPARATUS MANAGEMENT

TECHNICAL FIELD

This invention generally relates to thermal batteries and more particularly to methods, devices, and systems for management of devices with molten fluid electrodes.

BACKGROUND

A battery generally includes a positive electrode (cathode), a negative electrode (anode) and an electrolyte. A battery typically includes current collectors within the electrodes that direct electrical current to the terminals of the battery. Attempts have been made to use fluids for electrodes where one or both of the electrodes are maintained in a fluid state by heating the electrode material. These batteries are sometimes referred to as thermal batteries or high temperature batteries and include, for example, devices sometimes referred to as liquid-metal batteries and rechargeable liquid-metal batteries. Unfortunately, decades of research and development have not produced a safe and reliable thermal battery using high gravimetric energy density (kWh/kg) electrochemical couples such as, for example, sodium and sulfur or lithium and sulfur.

BRIEF DESCRIPTION OF DRAWINGS

It is to be understood that the drawings are solely for purpose of illustration and do not define the limits of the appended claims. Furthermore, the components in the figures are not necessarily to scale. In the figures, like reference numerals designate corresponding parts throughout the different views.

DETAILED DESCRIPTION

Figure 1:
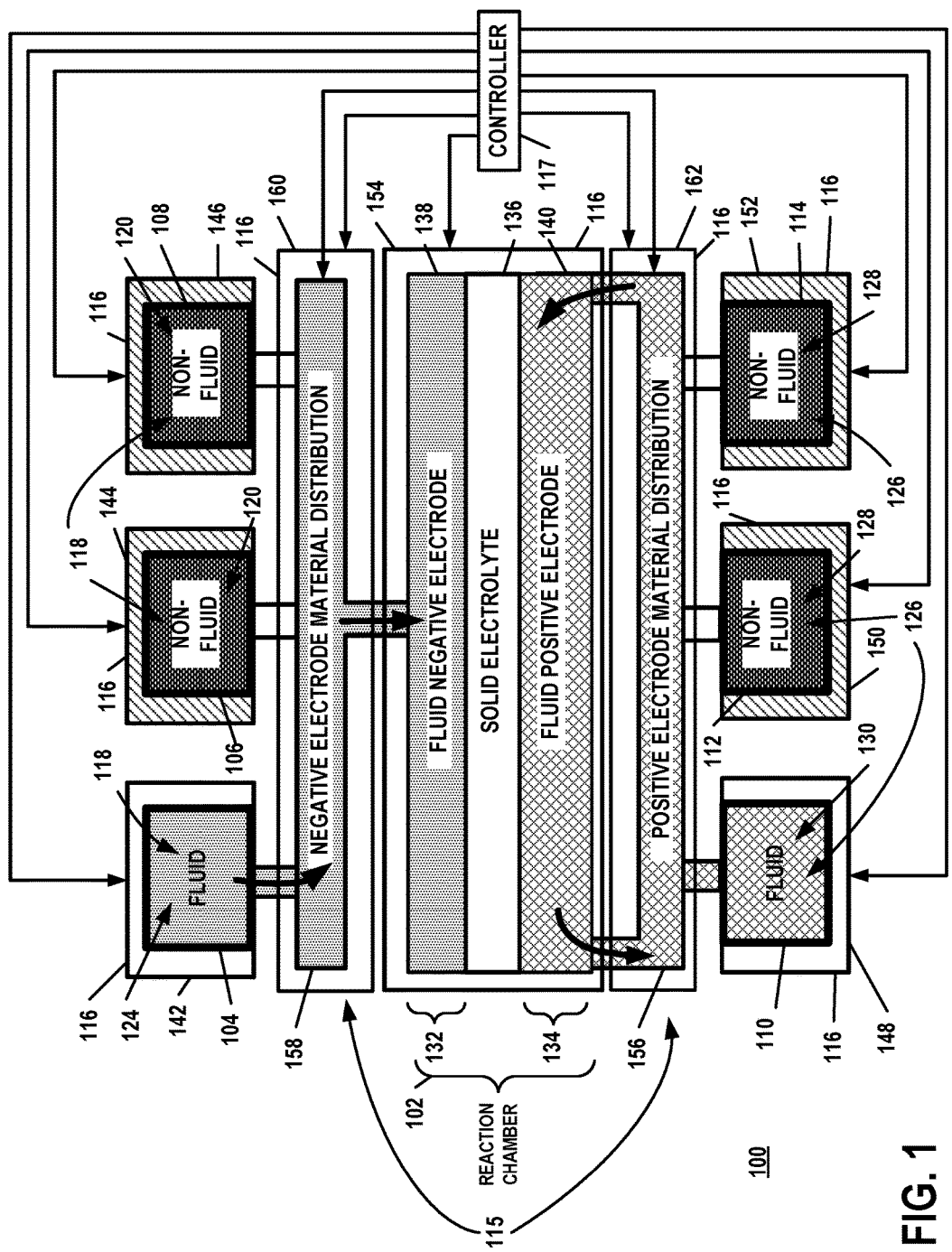
FIG. 1 is a block diagram of a fluid electrode apparatus that includes at least a reaction chamber, a plurality of negative electrode reservoirs, a plurality of positive electrode reservoirs, an electrode material distribution system, a heating system, and a controller.

Thermal batteries have several advantages over other types of batteries. The relatively low cost, high energy density, and high power density of thermal batteries (high temperature batteries) make these types of batteries highly attractive for several uses. Unfortunately, the safety issues with these devices have constrained widespread adoption. Due to their highly energetic chemistry, thermal batteries have suffered from dangerous risks of fire and explosion. Conventional thermal battery designs include two pools of fluid (i.e., molten) materials separated by a third material. If the third material fails and allows the molten materials to mix and react, an immense amount of thermal energy is released in a short period of time. These conditions often lead to a dangerous fire condition or explosion. This severe limitation still continues today although the demand for a safe thermal battery has existed since its inception during World War II. Several decades of attempts have not resulted in an adequate solution to the problem. For example, some attempts include using a gravitational flow battery design in which one of the molten active materials is contained in a large reservoir located physically above a smaller reaction chamber where the walls of the reaction chamber are a solid electrolyte. On the other side of the solid electrolyte is a large reservoir of the other molten active material. In the event that the solid electrolyte fails and the two molten active materials are allowed to mix, the hope is that the solid products that are formed by the chemical reaction of the mixing of the two molten active materials will limit the flow of the active materials from the large reservoir located physically above with the other large reservoir of the other molten active material. The gravitational flow battery design attempt fails because the solid reaction products that are intended to block the flow from the upper reservoir do not coalesce quickly enough at the operating temperature of the thermal battery. Therefore, the mixing of the two molten active materials is only slowed by this design and is insufficient to prevent a thermal runaway event. Other attempts include changing the chemistry of the molten active materials to a metal halide chemistry such that a solid electrolyte failure does not cause a thermal runaway event. Unfortunately, this technique comes at the cost of decreasing the specific energy density (kWh/kg) and the volumetric energy density (kWh/l) to a point where the thermal battery is no longer a viable solution for many applications.

Research in thermal batteries has even been abandoned by some due to the high danger. For example, a major auto manufacturer developed a fleet of electric vehicles that used thermal sodium-sulfur batteries in 1993. During the testing, two vehicles burst into flames while charging. As a result of these fires, the manufacturer ended its thermal sodium-sulfur battery program and the U.S. Department of Energy stopped their funding of thermal battery research. This is despite the enormous advantages that a safe thermal battery would provide to the electric vehicle industry as well as other industries. The relative light weight and low cost of thermal batteries clearly make these devices the best choice for use in electric vehicles if the risk of fire is mitigated.

In accordance with the techniques discussed herein, the risk of fire for a thermal battery is minimized by limiting the amount of fluid or molten material that is present at any one time in the battery. Only a portion of solid electrode material is heated to the fluid state. The remaining portion of non-fluid, solid material is not at risk of combining and reacting if a structural failure occurs within the battery. The thermal energy released from a reaction of the fluid materials due to a breach in the solid electrolyte is minimized by limiting the amount of fluid material in the reaction chamber as well as limiting the amount of fluid material that is present in the battery. The electrode material within the battery is distributed between at least one reaction chamber and a plurality of reservoirs. A heating system is controlled to selectively heat reaction chambers and reservoirs while an electrode delivery mechanism directs fluid electrode material between the components within the battery. For the examples discussed below, a controller monitors parameters and controls the heating system, electrode material delivery system, and a thermal runaway mitigation system to manage the safe and efficient operation of the battery.

As discussed herein, a material is in a fluid state when the material has a consistency sufficiently liquefied to allow the material to flow from one area to another. In other words, the viscosity of a fluid material is such that the material can be directed, pumped, or can otherwise flow from one area to another. A fluid material may, however, have some components that are at least partially solid while others are in a liquid phase. As a result, a fluid material is not necessarily all in a liquid phase. As discussed herein, a material is in a non-fluid state where it is sufficiently solidified such that it cannot flow. In other words, the viscosity of the material in a non-fluid state is such that the material cannot be directed, pumped, or otherwise allowed to flow from one area to another. A non-fluid material, however, may have some components that are in a liquid phase as well as others that are in a solid phase. When a material is in the fluid state, it is fluid, and when a material is in the non-fluid state, it is non-fluid. For the examples discussed herein, the electrode materials are transitioned from a non-fluid state to a fluid state by heating and can be referred to as molten electrode materials and molten fluid electrode materials.

For the example discussed below, a battery includes a reaction chamber having fluid electrodes separated by a solid electrolyte where only selected portions of the electrode materials contained in the battery are heated to place and maintain the portion of electrode materials in the fluid state. The total negative electrode material within the battery is distributed between a plurality of negative electrode material reservoirs and the negative electrode region of the reaction chamber of the battery and the total positive electrode material is distributed between a plurality of positive electrode material reservoirs and a positive electrode region of the reaction chamber. A controller controls a heating system and an electrode material distribution system to manage the temperature and flow of the electrode materials within the battery. As discussed below in further detail, each of the electrode material reservoirs is independently controlled to maintain the electrode material in the reservoir at a selected temperature and in the appropriate state. The electrode material distribution system may include any number of pumps, valves, and channels allowing the controller to direct electrode material to and from the reaction chamber and the reservoirs. In some situations, electrode materials are moved between reservoirs. For the examples herein, the positive electrode material is continuously cycled between the positive electrode region of the reaction chamber and one or more positive electrode material reservoirs while the discharge or charge current is above a threshold. In many situations, there is no need to circulate the positive electrode material if the discharge or charge current is below a threshold. The negative electrode material is supplied to the negative electrode region of the reaction chamber from one or more selected negative electrode material reservoirs during discharge of the battery and is returned to the reservoirs during charging of the battery. The heating system is configured such that each reservoir can be heated and cooled independently. In addition, heat recuperation and heat regeneration techniques may be utilized for efficiency.

FIG. 1 is a block diagram of a fluid electrode apparatus 100 that includes at least a reaction chamber 102, a plurality of negative electrode reservoirs 104, 106, 108, a plurality of positive electrode reservoirs 110, 112, 114, an electrode material distribution system 115, a heating system 116, and a controller 117. The apparatus 100 may form a battery cell, be part of a battery, and/or be part of a battery system. For example, several structures implemented in accordance with the apparatus 100 can be connected to form a multiple cell battery system. The illustration in FIG. 1 depicts the general principles of the example and does not necessarily represent specific shapes, relative sizes, distances, or other structural details of the represented components. In some circumstances, the structures of two or more blocks may be implemented in a single component or structure. In addition, functions described as performed in a single block of FIG. 1 may be implemented in separate structures.

The heating system 116 heats at least one negative electrode reservoir and at least one positive electrode reservoir to place and maintain the materials contained within those selected reservoirs 104, 110 in a fluid state. Therefore, the apparatus 100 includes negative electrode material 118 where some of the material is in a non-fluid state and some of the material is in a fluid state. As discussed herein, the total negative electrode material contained in the apparatus 100 is referred to as negative electrode material 118, the portion of total negative electrode material 118 in the non-fluid state that cannot flow is referred to as non-fluid negative electrode material 120, and the portion of total negative electrode material 118 in the fluid state that can flow is referred to as fluid negative electrode material 124. The apparatus 100 also includes positive electrode material 126 where some of the material 126 is in a non-fluid state and some of the material 126 is in a fluid state during operation. As discussed herein, the total positive electrode material contained in the battery is referred to as positive electrode material 126, the portion of positive electrode material 126 that is in the non-fluid state and cannot flow is referred to as non-fluid positive electrode material 128, and the portion of positive electrode material 126 in the fluid state that can flow is referred to as fluid positive electrode material 130.

The reaction chamber 102 includes a negative electrode region 132 and a positive electrode region 134 separated by a solid electrolyte 136. The plurality of negative electrode reservoirs 104, 106, 108 are connected to the negative electrode region 132 such that the negative electrode material contained in the reservoirs 104, 106, 108 can flow between the reservoir and the negative electrode region 132 when the negative electrode material is in a fluid state. The plurality of positive electrode reservoirs 110, 112, 114 are connected to the positive electrode region 134 such that the positive electrode material contained in the reservoirs 110, 112, 114 can flow between the reservoir and the positive electrode 132 region when the positive electrode material is in a fluid state. During operation of the battery 100, the negative electrode region 132 contains fluid negative electrode material 124 and the positive electrode region 134 contains fluid positive electrode material 130. As discussed below in further detail, the positive electrode region 134 may also contain some reaction products resulting from the normal operation of the apparatus 100. The fluid negative electrode material 124 in the negative electrode region 132 forms a fluid negative electrode 138 of the apparatus 100. The fluid positive electrode material 130 in the positive electrode region 134 forms a fluid positive electrode 140 of the apparatus 100. With properly placed current collectors (not shown in FIG. 1) in each electrode 138, 140 a reaction occurs within the apparatus between the fluid negative electrode 138 and the fluid positive electrode 140 through the solid electrolyte 136 and electrical energy can be harnessed from the electrochemical reaction. The reaction can be reversed by applying electrical energy to the current collectors to charge the apparatus 100. Therefore, the operation of the reaction chamber 102 in the example of FIG. 1 is similar to the operation of conventional thermal cells and batteries with fluid electrodes. A significant advantage of the example over conventional thermal batteries, however, includes limiting the amount of electrode material that is in the fluid state thereby minimizing the potential for fire during a structural failure. For example, the reaction chamber 102 can be configured to limit the amount of fluid negative electrode material within the negative electrode region 132 and the amount of fluid positive electrode material within the positive electrode region 134 available for an undesired chemical reaction if a breach in the solid electrolyte occurs. The amount of thermal energy generated by the direct chemical reaction of the fluid electrodes is directly proportional to the amount of material of each fluid electrode in the reaction chamber 102 and directly proportional to the volume of the respective electrode regions 132, 134 of the reaction chamber 102. Therefore, an objective of one advantageous design includes minimizing the amount of fluid electrode material within the electrode regions 132, 134 by minimizing the volume of the electrode regions 132, 134 in the reaction chamber 102. In some situations, the amount of thermal energy resulting from an undesired chemical reaction can also be minimized by limiting only one of the electrode regions because limiting one of the reactants in a chemical reaction limits the entire chemical reaction.

To increase the safety of the apparatus, a solid non-brittle electrolyte can be used. In addition, the solid electrolyte may include a reinforced structure to increase safety and the ion transport characteristics through the solid electrolyte. Examples of such solid electrolytes are discussed in U.S. patent application Ser. No. 15/982,480, entitled "MOLTEN FLUID ELECTRODE APPARATUS WITH SOLID LITHIUM IODIDE ELECTROLYTE HAVING IMPROVED LITHIUM ION TRANSPORT CHARACTERISTICS", filed concurrently with the present application and expressly incorporated by reference, herein.

The heating system 116 includes several portions that allow for selectively heating selected reservoirs. For the example, the heating system 116 includes a plurality of negative material heating system portions 142, 144, 146 that are configured to independently heat each of selected reservoirs of the plurality of negative electrode reservoirs 104, 106, 108 and a plurality of positive material heating system portions 148, 150, 152 that are configured to independently heat each of selected reservoirs of the plurality of positive electrode reservoirs 110, 112, 114. The heating system 116 also includes a reaction chamber portion 154 that is configured to maintain the reaction chamber 102 at the operating temperature where the electrodes 138, 140 are in the fluid state. A negative distribution heating portion 160 of the heating system 116 heats the negative electrode material distribution mechanism 158 and a positive distribution heating portion 162 of the heating system 116 heats the positive electrode material distribution mechanism 156. For the example of FIG. 1, the heating system 116 includes a network of heating coils or conduits that move heated heat transfer fluid between one or more heaters and the components within the apparatus that are heated. Valves and pumps can be used to direct heating heat transfer fluid to the appropriate locations to facilitate the heating of selected reservoirs while maintaining the non-selected reservoirs at a temperature that is sufficiently low to maintain the electrode materials in the non-fluid state. Other heating systems, however, can be used. The heating system 116, for example, may be an electrical heating system including several electrical heating elements that facilitate the heating of selected reservoirs while maintaining the non-selected reservoirs at a temperature that is sufficiently low to maintain the electrode materials in the non-fluid state. In some situations, the non-selected reservoirs are maintained at a temperature that is significantly below the ambient temperature. Such a technique may increase safety at the cost of decreased efficiency due to the additional energy required to cool the electrode material lower than the ambient temperature. One or more selected reservoirs can be configured as active reservoirs where an active reservoir is a reservoir that is connected to the reaction chamber 102 and electrode material is allowed to flow to the reaction chamber from the active reservoir. As discussed herein, therefore, a selected reservoir is a reservoir that is heated to place and maintain the electrode material in a fluid state and an active reservoir is a selected reservoir that is also operably connected to the reaction chamber 102.

For the situation shown in FIG. 1, a first negative electrode reservoir 104 and a first positive electrode reservoir 110 are heated by a first negative material heating system portion 142 and a first positive material heating system portion 148, respectively. Therefore, the selected reservoirs include the first negative electrode reservoir 104 and the first positive electrode reservoir 110 and the non-selected reservoirs include a second negative electrode reservoir 106, a third negative electrode reservoir 108 and a second positive electrode reservoir 112, and a third positive electrode reservoir 114. In FIG. 1, the negative heating system portions 144, 146 associated with the non-selected negative electrode reservoirs 106, 108 are illustrated with crosshatching while the negative heating system portion 142 associated with the selected negative electrode reservoir 104 is shown with a clear background to indicate that the negative heating system portion 142 is heating the selected negative electrode reservoir 104. Similarly, the positive heating system portions 150, 152 associated with the non-selected positive electrode reservoirs 112, 114 are illustrated with crosshatching while the positive heating system portion 148 associated with the selected positive electrode reservoir 110 is shown with a clear background to indicate that the positive heating system portion 148 is heating the selected positive electrode reservoir 110. The two selected reservoirs are also the active reservoirs in the example. The fluid positive electrode material 130 flows between the positive electrode reservoir 110 and the positive electrode region 134 of the chamber 102. For the example discussed with reference to FIG. 1, therefore, only one of three negative electrode reservoirs and only one of three positive electrode reservoirs are heated to place and maintain the material in the selected reservoirs in the fluid state until an additional fluid electrode material is needed. Any number of reservoirs may be included and any number may be heated where the number of reservoirs heated to place and maintain the electrode material in the fluid state is less than the total number of reservoirs containing the particular electrode material. In one example, as discussed below, twenty negative electrode material reservoirs and ten positive electrode material reservoirs support a single reaction chamber. A single positive electrode material reservoir and a single negative electrode material reservoir are heated to maintain the electrode materials in the fluid state to supply fluid electrode material to the reaction chamber. As the transition point approaches where a new reservoir will be switched for one of the currently active reservoirs, the new reservoir is heated to place and maintain the electrode material in the fluid state so the new reservoir can be switched without interruption in supply of electrode material. In some situations, a backup reservoir can be continuously heated in addition to the active reservoirs in order to have additional fluid electrode material ready for supplying the reaction chamber when needed. Such an implementation, however, may impact safety and efficiency.

A different number of positive electrode reservoirs may be heated than the number of negative electrode reservoirs that are heated. Further, in addition to the selected reservoirs that are heated sufficiently to place and maintain the material in those reservoirs in the fluid state, other reservoirs may be heated but kept at a temperature lower than the temperature where the material begins to melt and become fluid. In some situations, in addition to the selected reservoirs that are heated sufficiently to place and maintain the material in those reservoirs in the fluid state, other reservoirs may be heated but kept at a temperature at, or higher than, the temperature where the material begins to melt and become fluid yet are sufficiently cool to enable a non-hazardous condition. For example, some standby lithium electrode material reservoirs may be maintained at a temperature near 600° F. (315° C.). There are indications that molten lithium at these temperatures is stable in air. Therefore, a lithium electrode material reservoir at or below 600° F. is safer than a lithium reservoir at a higher temperature even though the lithium is molten. As a result, one example of a molten electrode apparatus that is safer than conventional systems includes maintaining a portion of the total electrode material in the apparatus in a liquid state at a temperature below the operating temperature of the reaction chambers. Numerous configurations, sizes, and temperature schemes can be used to implement the apparatus 100. Therefore, the positive electrode reservoirs may have a different size, number, shape, and temperature than the negative electrode reservoirs. Further, the size and shape of each of the positive electrode reservoirs may be the same as other positive electrode reservoirs or may vary and the size and shape of each of the negative electrode reservoirs may be the same as other negative electrode reservoirs or may be different.

During operation of the apparatus 100, the controller 117 manages the electrode material distribution system 115, heating system 116, and other mechanisms based on data received from sensors and other sources. The controller 117 is any controller, processor, electrical circuit, logic circuit, processing circuit, electronics, or processor arrangement that manages the functions described herein as well as facilitating the overall functionality of the apparatus 100. The controller 117 provides control signals to the electrode material distribution system 115 to manage flow of the fluid electrode material between reservoirs and the reaction chamber. The controller 117, for example, may send control signals to components such as valves, motors, and pumps in the fluid electrode distribution system 115 to select and switch active reservoirs during the discharging and charging cycles of the apparatus 100. The controller 117 determines when to heat selected reservoirs and when to begin connecting the appropriate heated reservoirs to the reaction chamber to manage flow of fluid electrode material. In other words, the controller 117 controls the heating system 116 and fluid electrode material distribution system 115 to heat selected reservoirs and manage connection of active reservoirs to the reaction chamber.

The fluid electrode material distribution system 115 includes a positive electrode material distribution mechanism 156 for managing fluid positive electrode material and a negative electrode material distribution mechanism 158 for managing fluid negative electrode material. For the examples herein, the positive electrode material distribution mechanism circulates fluid positive electrode material between the positive electrode region 134 and an active positive electrode reservoir 110. When the concentration of reaction products reaches a first positive discharge threshold, the controller 117 heats another (second) positive electrode reservoir 112. Although other techniques may be used, the controller 117 determines when the first positive discharge threshold is reached based on a volume of positive electrode material in the active reservoir 110. In some situations, the volume is directly detected while on other situations, the volume is calculated based on one or more parameters. As the apparatus is discharged, negative electrode material in the negative electrode region 132 moves through the solid electrolyte, reacts with the fluid positive electrode and forms reaction products. The volume of the fluid positive electrode material being circulated, therefore, increases as the apparatus is discharged. By determining that the volume has reached a particular value, the controller 117 determines that the first positive threshold has been reached. The controller 117 controls the positive electrode material mechanism 115 to connect (switch in) the new heated positive electrode material reservoir and disconnect (switch out) the active positive electrode reservoir when the controller determines that a second positive discharge threshold is reached. In one example, the second positive discharge threshold is at least partially based on a concentration of a specific reaction product within the fluid positive electrode material being circulated. The specific reaction product concentration in most situations is the reaction product associated with the fully discharged positive electrode material and is the established maximum for the apparatus. For example, the concentration of the specific reaction product may be a concentration less than a concentration that includes a significant amount of solid reaction products.

For at least some of the examples, the controller 117 determines whether the second positive discharge threshold has been reached based on the volume of the fluid positive electrode material being circulated. Sensors on the positive electrode reservoirs can be used to determine the volume of fluid positive electrode material. For example, sensors that measure, or at least detect changes in, capacitance across the reservoir can be positioned at one or more selected levels within each reservoir. Since the capacitance is different when positive electrode material is positioned between the two sensors as compared to when there is no electrode material, positive electrode material within the reservoir can be determined to be at least a particular level based on the capacitance showing presence of positive electrode material at that level. Other types of sensors can be used to determine volume. One example includes using pressure sensors since volume can be determined from pressure in a closed system. In another example, the controller integrates the current measured from current sensors to calculate a total charge transferred from the time the reservoir was activated to determine the average reaction product in the fluid positive electrode material which is equivalent to a specific volume increase in fluid positive electrode material. The determination of the average reaction product in the fluid negative electrode material can be used to determine if the trigger threshold has been met or not. In yet another example, the voltage across the reaction chamber is used to determine the average reaction product in the fluid negative electrode material since there is a known relationship between the cell voltage and the average reaction product. Thus, the voltage across the reaction chamber is used to determine if the trigger threshold has been met or not.

For the examples herein, the negative electrode material distribution mechanism 158 provides fluid negative electrode material to the negative electrode region 132 as needed during discharge of the apparatus. As the apparatus is discharged, fluid negative electrode material moves through the solid electrolyte 136. The consumed fluid negative electrode material is replenished with fluid negative electrode material from the active negative material reservoir 104. When the volume of negative electrode material in the active negative electrode material reservoir 104 reaches a first negative discharge threshold, the controller 117 controls the heating system 116 to heat a new negative electrode material reservoir. The controller 117 controls the negative electrode material mechanism 158 to connect (switch in) the newly heated negative electrode material reservoir 106 and disconnect (switch out) the currently active negative electrode reservoir 104 when the controller 117 determines that a second negative threshold is reached. In some situations, both the active reservoir and the new reservoir may be connected to the negative electrode region of the reaction chamber during a transition period. The controller 117 controls the heating system 116 to stop heating the reservoirs that have been disconnected from the reaction chamber 102. Sensors can be used to determine the level of the negative electrode material within a negative electrode material reservoir. One example includes measuring the conductivity between two points at a particular level within the reservoir where a higher conductivity will be measured when the negative electrode material is present at the level. Other techniques can be also used. As discussed above, parameters related to pressure, current, total charge transferred, and capacitance can be used.

The apparatus is charged by providing a voltage across, and power to, the current collectors. During the charging procedure, the potential across the current collectors results in negative electrode material ions being released from the positive electrode material within the positive electrode region of the reaction chamber. The negative electrode material ions move through the solid electrolyte to the negative electrode region of the reaction chamber. The negative electrode material is directed to negative electrode material reservoirs to refill the reservoirs. When a negative electrode material reservoir is filled to capacity, a standby negative electrode material reservoir that is empty, or at least has available capacity, is connected and the filled reservoir is disconnected. As the negative electrode material is released from the positive electrode material, the concentration of the negative electrode material within the positive electrode material decreases. For example, in an apparatus using an electrochemical combination of lithium and sulfur, $2Li_2S_2$ can become $Li_2S_4$ when 2 Li ions are removed. Since the positive electrode material is being circulated between the positive electrode region of the reaction chamber and a positive electrode material reservoir, the concentration of the negative electrode material within the positive electrode material is also decreasing in the active positive electrode material reservoir during the charging process. When the concentration level has reached an acceptable threshold, the electrode material distribution system connects a standby positive electrode material reservoir and disconnects the currently active positive electrode material reservoir that now has a low concentration of the negative electrode material within the positive electrode material. The standby positive electrode material reservoir with a relatively high concentration of the negative electrode material within the positive electrode material becomes the new active positive electrode material reservoir. The charging process continues until all of the negative electrode material reservoirs are filled and all of the positive electrode material reservoirs have a concentration of the negative electrode material within the positive electrode material below the threshold.

The molten fluid electrode apparatus 100 may be implemented with different materials and electrochemical couples. For the example discussed below with reference to FIG. 2, the negative electrode comprises lithium (Li) and the positive electrode comprises sulfur (S). In another example, a sodium-sulfur (Na—S) battery includes a fluid negative electrode comprising sodium (Na) and a fluid positive electrode comprising sulfur (S). In addition, other materials may also be used for the electrodes. Further, the electrode materials may contain mixtures or compounds that include multiple elements in some circumstances. For example, in some batteries with a molten lithium negative electrode, a molten mixture of sulfur and phosphorus can be used for the fluid positive electrode.

The operating temperature, or temperature ranges, of the reservoirs, negative electrode region, positive electrode region, and fluid electrode material distribution system may be selected based on several factors including, for example, the melting point of the negative electrode material, the melting point of the positive electrode material, the boiling point of the negative electrode material, the boiling point of the positive electrode material, the eutectic point of the positive electrode material and resulting chemical species, and the melting point of the solid electrolyte. For the examples discussed herein, the heating system 116 maintains the selected and active reservoirs, the reaction chamber 102, and fluid electrode material distribution system 115 at the same temperature. In some situations, however, the selected reservoirs, the reaction chamber, and fluid electrode material distribution system may be maintained at different temperatures. For example, the selected negative reservoir may be maintained at temperature above, but somewhat near, the melting point of the negative electrode material, the selected positive reservoir may be maintained at temperature above, but somewhat near, the melting point of the positive electrode material and the temperature of the reaction chamber and fluid electrode material distribution system may be maintained at a temperature above the melting points of both electrode materials. Typically, the temperature of positive electrode region 134 is maintained at the same temperature as the negative electrode region 132 in order to avoid a temperature gradient across the solid electrolyte 136. In some situations, however, the temperatures may be different.

Figure 2:
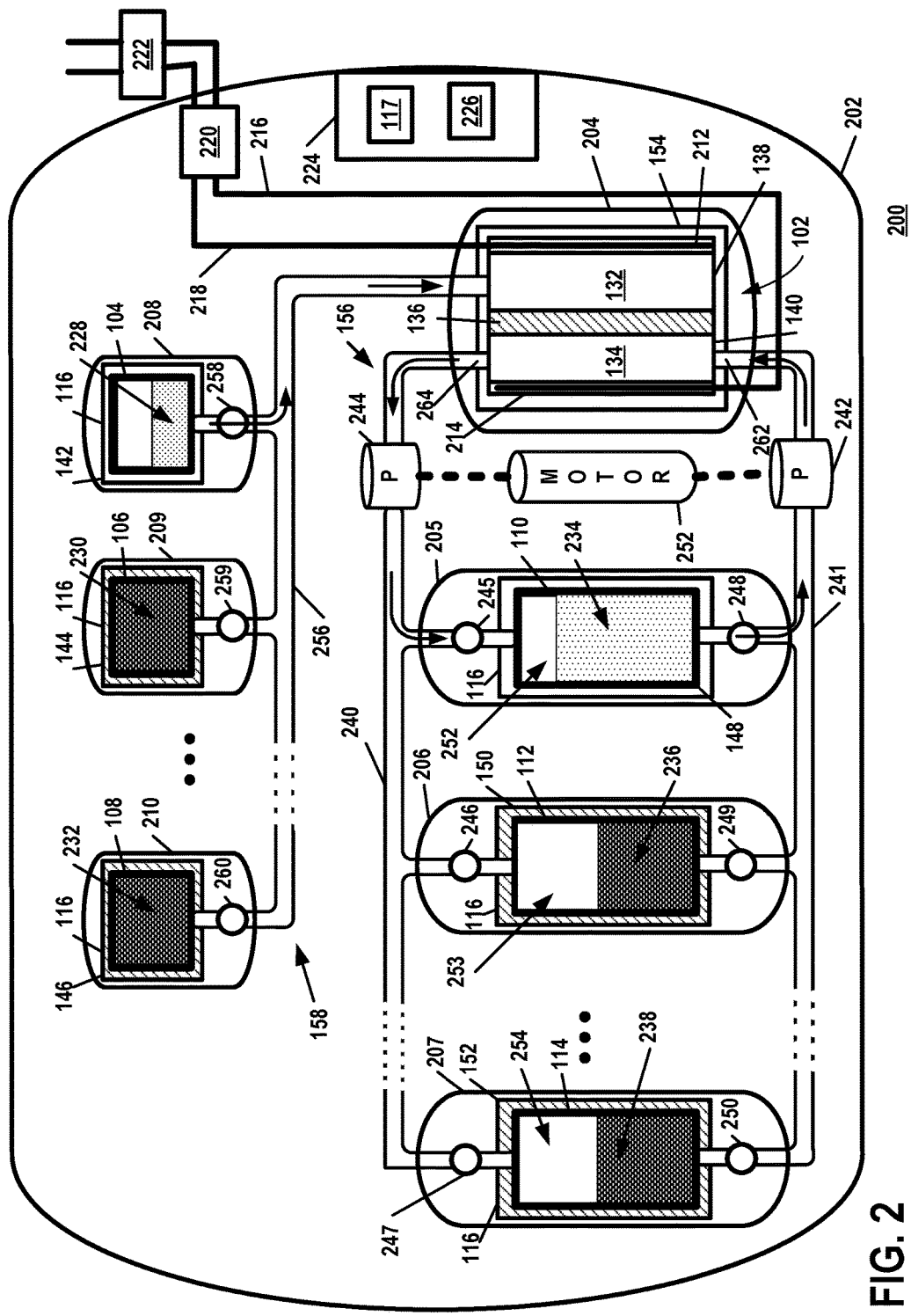
FIG. 2 is an illustration of an example of a single cell battery system including a single reaction chamber connected to a plurality of positive electrode material reservoirs for containing sulfur electrode material and to a plurality of negative electrode material reservoirs for containing lithium electrode material.

FIG. 2 is an illustration of an example of a single cell battery system 200 including a single reaction chamber 102 connected to a plurality of positive electrode material reservoirs 110, 112, 114 for containing sulfur positive electrode material and to a plurality of negative electrode material reservoirs 104, 106, 108 for containing lithium negative electrode material. As discussed herein, the sulfur positive electrode material comprises sulfur and may include other reaction products where the concentration of each reaction product varies during the charging and discharging stages of the cell connected to a sulfur positive electrode material reservoir. The sulfur positive electrode material may also include other materials in some situations. The lithium negative electrode material comprises lithium and may include other materials. For the example of FIG. 2, the single cell battery system 200 has a structure in accordance with the apparatus 100 discussed with reference to FIG. 1. The single cell battery system 200, therefore, is an example of the fluid electrode apparatus 100. As discussed in further detail with reference to FIG. 4, FIG. 5 and FIG. 6, several single cell battery systems 200 can be connected in series or parallel to form a multiple cell battery system. The illustration of FIG. 2 depicts the general principles of the example and does not necessarily represent specific shapes, relative sizes, distances, or other structural details of the represented components. Although FIG. 2 reflects some structural, dimensional, orientational, and positional aspects of the system 200, the figure is not necessarily to scale and does not necessarily depict all features of the single cell battery system 200. In some circumstances, the structures of two or more blocks may be implemented in a single component or structure. In addition, functions described as performed in a single block of FIG. 2 may be implemented in separate structures in some situations.

Although different solid electrolyte materials and structures can be used, the solid electrolyte comprises lithium iodide (LiI) for the example of FIG. 2 and has a reinforcement structure. Examples of suitable techniques and structures for a lithium iodide solid electrolyte are described in the U.S. patent application Ser. No. 15/982,480, entitled "MOLTEN FLUID ELECTRODE APPARATUS WITH SOLID LITHIUM IODIDE ELECTROLYTE HAVING IMPROVED LITHIUM ION TRANSPORT CHARACTERISTICS" referenced above. As discussed in the referenced patent application, the solid electrolyte can have a lithium iodide lattice with a plurality of lithium cations, a plurality of iodide anions, and a plurality of defects.

The defects can result from an introduction of a plurality of nanoparticles into a solid electrolyte that form grain boundary defects at the interface between the solid electrolyte and the nanoparticle, from a solid electrolyte synthesis process that are maintained or pinned by the presence of a plurality of nanoparticles in a solid electrolyte, or from an introduction of aliovalent ions in a solid electrolyte.

The example of FIG. 2 includes several components that form the single cell battery system 200 where all of the components are enclosed in a vacuum sealed main housing 202 and some components are also enclosed within vacuum sealed individual housings 204-210. The reaction chamber 102 is enclosed within a reaction chamber housing 204. Each of the positive electrode material reservoirs 110, 112, 114 is enclosed in a positive reservoir housing 205-207 and each of the negative electrode material reservoirs 104, 106, 108 is enclosed in a positive reservoir housing 208-210. As discussed below, some of the housings can be omitted in some situations. Although the housings have interiors under vacuum for the example, housings can be filled with an inert gas such as argon in some situations. Also, the interiors may be filled with air in other situations. Generally, the interior pressures of the housings may be different from each other and may be different from the ambient pressure.

For the example, the negative electrode material 118 comprises lithium (Li), the positive electrode material 126 comprises sulfur (S), and the solid electrolyte comprises 136 lithium iodide (LiI). Accordingly, for the example of FIG. 2, the reaction chamber 102 can be referred to as a lithium-sulfur (LiS) cell or LiS reaction chamber and is an example of the reaction chamber 102 discussed with reference to FIG. 1 where the fluid negative electrode 138 comprises fluid lithium and the fluid positive electrode 140 comprises fluid sulfur during operation. Other materials may also be present in the fluid electrodes in some situations. The fluid positive electrode 140, for example, may include lithium-sulfur reaction products.

The operation of the LiS single cell battery system 200 is in accordance with operation described with reference to the apparatus 100 of FIG. 1. A first current collector 212 is positioned within the fluid negative electrode 138 and second current collector 214 is positioned within the positive fluid electrode 140. With the properly placed current collectors 212, 214 within each electrode 138, 140, electrical energy can be harnessed from the electrochemical reaction occurring within the cell between the fluid negative electrode 138 and the fluid positive electrode 140 through the solid electrolyte 136. Conductors 216, 218 connect the current collectors 214, 212 to a cell configuration network 220 within the main housing 202 containing the single cell battery system 200. Where the single cell battery system 200 is part of a multiple cell battery system, the cell configuration network 220 is also connected to conductors from other single cell battery systems in the main housing 202. The cell configuration network 220 manages connections between the conductors 216, 218 and conductors of other single cell battery systems that form a multiple cell battery system. The cell configuration network 220 includes electronics that switch cells in and out of the multiple cell battery system (not shown in FIG. 2) to maximize performance and safety of the multiple cell battery system. For example, the cell configuration network 220 may disconnect a cell from the multiple cell battery system where the cell exhibits poor performance, low voltage, or some other problematic symptom. The cell configuration network 220 is connected to a battery configuration network 222 positioned outside the main housing 202. The battery configuration network 222 connects the battery outputs from two or more multiple cell battery systems and provides the combined output to a load. Where the single cell battery system 200 is not connected to other single cell battery system, the cell configuration network 220 can be omitted. In some situations, the battery configuration network 222 can be omitted. The battery configuration network 222 will typically handle larger currents than the cell configuration network 220. As a result, the electrical switching elements and associated electrical interconnects within the battery configuration network 222 must be designed to handle the larger currents and associated heat dissipation. A suitable location for the battery configuration network 222, therefore, is outside of the vacuum enclosure 202.

Other electronics 224 including the controller 117 are mounted within the main housing 202. The electronics 224 manage the operation of the single cell battery system 200 and are connected to components of the heating system 116 and electrode material distribution system 115 as well as to sensors (not shown in FIG. 2). In the interest of clarity, FIG. 2 does not show the interconnections between the electronics 224 and the other components and does not show portions of the heating system 116. In some situations, at least some of the other electronics may be located outside of the housing 202 where the electronics 224 manage multiple cells of a battery system and/or multiple battery systems. Such techniques have the advantage of efficient use of electrical components at the cost of including additional wiring and vacuum feedthroughs in the housings.

The single cell battery system 200 includes a thermal runaway mitigation system (not shown in FIG. 2) or some other cooling system in some situations. Examples of suitable thermal runaway mitigation systems are discussed in U.S. patent application Ser. No. 15/982,494, entitled "DEVICES, SYSTEMS, AND METHODS TO MITIGATE THERMAL RUNAWAY CONDITIONS IN MOLTEN FLUID ELECTRODE APPARATUS", filed concurrently with this application, and incorporated by reference in its entirety, herein. The thermal runaway mitigation system which is connected to and controlled by the controller 117, provides a mechanism for preventing or mitigating thermal runaway in the single cell battery system 200. The thermal runaway mitigation system may be part of a larger thermal runaway mitigation system that prevents or mitigates thermal runaway in a multiple cell battery system.

For the example of FIG. 2, the electronics 224 also include an auxiliary power supply 226. The auxiliary power supply 226 may be a rechargeable battery that is charged by the single cell battery system 200, a multiple cell battery system, or an external power source. The auxiliary power supply 226 may also be provided by an external power source. The auxiliary power supply 226 provides electrical power for the electronics 224 to allow the controller 117 to manage the cell system when power is not available from the battery system. Such a situation may occur, for example, where the battery system has been shut down because it is not in use, to avoid thermal runaway, or for other safety reasons. For the example, the auxiliary power supply 226 also provides energy to start the cell. When the battery cell is cool and no power is being generated by the cell, the auxiliary power supply 226 provides energy to at least heat critical components to operating temperature. For example, the auxiliary power supply 226 may be used to heat the reaction chamber and at least one lithium negative electrode material reservoir and at least one sulfur positive electrode material reservoir until the cell produces sufficient energy to sufficiently power the heating system 116.

The negative electrode reservoirs 104, 106, 108 contain negative electrode material that comprises lithium where an active lithium reservoir 104 is heated to place and maintain the lithium electrode material 228 in a fluid state allowing it to flow into the negative electrode region 132 of the reaction chamber 102. The lithium electrode material 230, 232 in the other, non-selected, non-active negative electrode reservoirs 106, 108 is maintained in the non-fluid state and does not flow to the chamber 102 until a new reservoir is required. When the first negative threshold is reached, another negative reservoir (such as the second lithium reservoir 106) is heated so that the lithium electrode material 230 contained in the new reservoir 106 is fluid and ready to flow to the reaction chamber 102 when the second negative threshold is reached. The positive electrode reservoirs 110, 112, 114 contain positive electrode material that comprises sulfur where at least one reservoir 110 is heated to place and maintain the sulfur electrode material 234 in a fluid state allowing it to flow into the positive electrode region 134 of the reaction chamber 102. The sulfur electrode material 236, 238 in the other, non-selected negative electrode reservoirs 112, 114 is maintained in the non-fluid state and does not flow to the reaction chamber 102 until a new positive reservoir is required. When the first positive threshold is reached, another positive reservoir (such as the second positive reservoir 112) is heated so that the sulfur electrode material 236 contained in the new positive reservoir 112 is fluid and ready to flow to the reaction chamber 102 when the second positive discharge threshold is reached.

During operation of the single cell battery system 200, the reaction results in other compounds or products being formed. For example, in addition to the positive electrode region containing sulfur, the region may also contain di-lithium polysulfide species ($Li_2S_n$ where n is two or higher) and di-lithium sulfide ($Li_2S$). Typically, the reaction through the electrolyte 136 will result is several different chemical species such as $Li_2S_m$ where m is an integer equal to one or more. Any number of chemical species may result and may include, for example $Li_2S$, $Li_2S_2$, $Li_2S_4$, and $Li_2S_6$ products as well as others in some circumstances.

For the example of FIG. 2, the positive electrode material distribution system 156 includes a network of positive electrode material channels 240, 241, a supply pump 242, and a return pump 244, as well as an input valve 245-247 and output valve 248-250 on each sulfur electrode material reservoir 110, 112, 114. Each input valve 245-247 is connected between the return channel 240 and a sulfur electrode material reservoir 110, 112, 114 and each output valve 248-250 is connected between a sulfur electrode material reservoir 110, 112, 114 and the supply channel 241. The input valve 245 and output valve 248 are open for the active sulfur electrode material reservoir 110. The supply pump 242 pumps sulfur electrode material from the active sulfur electrode material reservoir 110 to the positive electrode region 134 of the reaction chamber 102 through the supply channel 241. For the example, a single motor 252 drives the supply pump 242 and return pump 244. An impeller mechanism within each pump 242, 244 is magnetically coupled to the motor 252. Fluid sulfur electrode material 234 is pumped from the positive electrode region 134 to the active sulfur electrode material reservoir 110. The fluid sulfur electrode material 234, therefore, is circulated between the reaction chamber 102 and the active sulfur electrode material reservoir 110 during discharge of the cell. As the cell continues to discharge, the concentration of di-lithium polysulfide species in the sulfur electrode material 234 increases. As a result, the volume of sulfur electrode material 234 being circulated also increases. As discussed below, the first positive discharge threshold and second positive discharge threshold can be based on parameters provided by sensors at the reservoirs where the parameters are related to the volume of sulfur electrode material in the active reservoir. The parameter is provided to the controller 117 which determines whether a threshold has been met. In one example, the sensor measures capacitance across the interior of the reservoir at two levels within the active reservoir to determine when the volume of sulfur electrode material has reached two particular levels. Since the capacitance between two points at each level increases when the sulfur electrode material has reached the level, the controller 117 can determine when the volume levels have been reached. For the examples herein, the material between the two points is either Argon gas, sulfur, a di-lithium polysulfide reaction product, a combination of di-lithium polysulfide reaction products or some combination of these positive electrode materials. Since the relative permittivity ($\varepsilon_1$) of the positive electrode material is greater than the relative permittivity of Argon gas, the capacitance is greater when the positive electrode material is present between the two points. When the first level is reached, it is determined that the first positive threshold has been reached and the controller begins to heat a standby sulfur electrode material reservoir 112. The first level is selected such that there is sufficient time to heat the sulfur electrode material 236 to an adequate temperature before the sulfur electrode material 236 is needed for the reaction chamber 102. When the second level is reached, the controller 117 determines that the second positive discharge threshold has been met and controls the input and output valves on the active sulfur electrode material reservoir and the standby sulfur electrode material reservoir to disconnect the currently active reservoir and connect the new sulfur electrode material reservoir to select a new active sulfur electrode material reservoir. The controller closes the valves on the first sulfur electrode material reservoir and opens the valves on the second sulfur electrode material reservoir. In some situations, the valves on both reservoirs may be open during the transition.

The volume thresholds can be based on several factors. For one example, the threshold volume levels are at least partially based on concentration of di-lithium polysulfide species in the sulfur electrode material 234. The threshold volumes are selected such that the concentration of di-lithium di-sulfide ($Li_2S_2$) is high and di-lithium sulfide ($Li_2S$) is relatively low. For example, the volume threshold may be selected such that the concentration of $Li_2S_2$ is high and no $Li_2S$, or only a small concentration of $Li_2S$, are present in the sulfur electrode material 234 when the sulfur electrode material reservoir is switched. In other words, the sulfur electrode material reservoir is switched out before significant amounts of solid $Li_2S$ are produced. In another example, a solid product filter removes di-lithium sulfide ($Li_2S$) products and the volume thresholds are set based on the remainder of sulfur electrode material 234 in the reservoir with the solid $Li_2S$ removed.

In situations where a solid product filter is used, there are two volume dependent positive discharge thresholds. First, the volume of the $Li_2S$ will increase during the deep discharge of the battery. Thus, a threshold for the volume of the $Li_2S$ can be established and used as a trigger. An alternative threshold could be established by monitoring the volume of $Li_2S_2$ since this volume will decrease during the deep discharge of the battery as molten $Li_2S_2$ becomes solid $Li_2S$ with the addition of more lithium to the molten $Li_2S_2$. A threshold based upon the voltage across the reaction chamber may not be as helpful in the scenario of a deep charge where a high concentration of $Li_2S_2$ exists in the positive electrode material and $Li_2S$ is being formed and $Li_2S$ is being filtered from the positive electrode because the voltage will remain relatively constant during this stage of the deep discharge process. Techniques in accordance with the above techniques may be applied to other electrochemical cells in some situations. For example, other electrochemical chemistries will have analogous chemical species that transition from a molten phase to a solid phase at some point in the discharge process and can thus be filtered out of the positive electrode. As a result, other electrochemical chemistries such as sodium sulfur will have analogous thresholds. Examples of solid products filters are discussed in U.S. patent application Ser. No. 15/982,491, entitled "METHODS, DEVICES AND SYSTEMS TO ISOLATE SOLID PRODUCTS IN MOLTEN FLUID ELECTRODE APPARATUS", filed concurrently with this application, and incorporated by reference in its entirety, herein.

Other types of sensors and data can be used to determine when the positive discharge thresholds are reached. Some examples include monitoring the total charge transferred by the reaction chamber from the time the sulfur electrode material reservoir is activated. One example includes integrating the current from the time a fully charged sulfur material reservoir is switched in the reaction chamber to determine the total charge transferred. From the total charge transferred, the amount of lithium transferred to the molten sulfur electrode material is known so the electrode products can be estimated given the total amount of sulfur in the reservoir to begin with. With this technique, a threshold based upon the total charge transferred and the total amount of sulfur can be established to correlate to any desired di-lithium polysulfide product ($Li_2S_n$) in the positive electrode. In another example, where the solid di-lithium sulfide ($Li_2S$) is not filtered, the voltage across the reaction chamber is a useful threshold for switching the sulfur electrode material reservoirs since the voltage depends upon the chemical species of the positive electrode material. For instance, the voltage when only sulfur is in the reaction chamber is different from the voltage when only di-lithium di-sulfide ($Li_2S_2$) is in the reaction chamber. As noted earlier, the voltage threshold is not as useful during a deep discharge when the positive electrode product reaches $Li_2S_2$ and $Li_2S$ is being formed and filtered from the positive electrode because the voltage will remain relatively constant during this stage of the deep discharge process. In yet another technique, the thresholds are at least partially based on the amount of negative electrode material that is needed to produce the total charge where the volume of negative electrode material is correlated to an amount of positive electrode material for a particular concentration of one or more of the products species in the sulfur electrode material. For instance, the amount of the negative electrode material can be tracked using a pressure measurement or electrical conduction or impedance measurement. Then, the amount of negative electrode material transferred to the positive electrode material can be used to determine the chemical species in the positive electrode. Thus, a threshold can be established to correlate with a desired chemical specie or species in the positive electrode such as $Li_2S_2$ or a combination of $Li_2S_2$ and some low concentration of $Li_2S$.

Since the volume of the circulated sulfur electrode material increases during discharge of the cell, the volume of each sulfur electrode material reservoir is selected to be great enough to accommodate more than the original volume of the sulfur electrode material in the reservoir. A reserve space 252-254 in each sulfur electrode material reservoirs 110, 112, 114 allows for the increase in volume. FIG. 2 shows the reserve space 252 in the active sulfur material reservoir 110 being less than the reserve space 253, 254 in the non-active sulfur electrode material reservoirs 112, 114 since the illustration depicts a state where the volume of the circulated sulfur electrode material 234 has increased during discharge of the cell.

For the example of FIG. 2, the negative electrode material distribution system includes a negative electrode material supply channel 256 and a valve 258-260 on each lithium electrode material reservoir 104, 106, 108. Each valve 258-260 is connected between one of the lithium electrode material reservoirs 104, 106, 108 and the negative electrode material supply channel 256. The valve 258 is open for the active lithium reservoir 104. For the example, the lithium electrode material 228 is drawn from the active negative reservoir 104 into the negative electrode region 132 of the reaction chamber as needed. As the lithium electrode material is consumed by the electrochemical reaction in the reaction chamber 102, it is replenished from the active reservoir 104 through the negative supply channel 256. The orientation and relative positions of the negative electrode material reservoirs 104, 106, 108 and the reaction chamber 102 are selected to allow the fluid lithium electrode material flow to be assisted by gravity. In other situations, pumps can be used. Due to the properties of lithium, electromagnetic pumps can be used where a current passing through the lithium and a magnetic field propel the lithium electrode material in the direction normal to the plane formed by the current and magnetic field vectors (i.e., $\vec{F} = \int I d\vec{l} \times \vec{B}$ Magnetic Force). The resulting electromagnetic force moves the fluid lithium electrode material. For the example, a relatively small amount of argon gas is introduced to each lithium reservoir during manufacturing of the reservoir. The argon gas reduces the vacuum created as the lithium electrode material is drawn from the reservoir. The amount of gas is selected such that there is sufficient amount to avoid a vacuum that intolerably impedes the flow of lithium electrode material from the reservoir but not an amount the results in a pressure in the reservoir that forces more lithium electrode material into the reaction chamber than is needed at any time or that would damage the reaction chamber.

The fluid lithium electrode material, therefore, is supplied from the active lithium reservoir 104 during discharge of the cell until the material is depleted from the reservoir 104. For the example of FIG. 2, the first negative discharge threshold and second negative discharge threshold are based on a parameter provided by one or more sensors at the reservoir where the parameter is related to the volume of lithium electrode material in the active reservoir. The parameter is provided to the controller 117 which determines whether a threshold has been met. In one example, a sensor measures conductivity (or resistance) across the interior of the active reservoir at two levels within the active reservoir to determine when the volume of lithium electrode material has reached two particular levels. Since the conductivity between two points at each level decreases when the lithium electrode material has dropped below the level, the controller 117 can determine when the threshold volume levels have been reached. When the first level is reached, it is determined that the first negative threshold has been reached and the controller 117 begins to heat a standby lithium reservoir (such as the second reservoir 106). The first level is selected such that there is sufficient time to heat the lithium electrode material 230 to an adequate temperature before the currently active reservoir 104 is depleted and the additional lithium is needed for the reaction chamber 102. When the second level is reached, the controller 117 determines that the second negative discharge threshold has been met and controls the valves 258, 259 on the currently active lithium reservoir 104 and the standby lithium reservoir 106 to disconnect the currently active lithium reservoir 104 and connect the new lithium reservoir 106 thereby selecting a new active lithium reservoir. The controller 117 closes the valve 258 on the first lithium reservoir 104 and opens the valve 259 on the second lithium reservoir 106. In some situations, the valves 258, 259 on both reservoirs 104, 106 may be open during the transition.

Other types of sensors and data can be used to determine when the negative discharge thresholds are reached. Some examples include monitoring the total charge produced by the reaction chamber from the time the lithium electrode material reservoir is activated. Based on the total charge, it can be determined how much lithium electrode material remains in the active reservoir.

The number of sulfur electrode material reservoirs and the number of lithium electrode material reservoirs typically depends on the implementation and purpose of the single cell battery system 200. Examples of some of the factors that may at least partially determine the number of the reservoirs include the cost of the reservoirs, the amount of molten lithium that does not represent a significant hazard, the amount of molten sulfur that does not represent a significant hazard, and the energy, power, space, and availability requirements of the battery. Examples other factors that may at least partially determine the number of the reservoirs include the volume and form factor of each reservoir, the chosen maximum amount of electrode material in the fluid state during operation, the selected number of housings, and the overall form factor of the battery system in which the single cell battery system may be integrated. For at least some of the examples discussed herein, the single cell battery system 200 includes ten sulfur electrode material reservoirs and twenty lithium reservoirs each reaction chamber. For this example, the lithium electrode material reservoirs are smaller than the sulfur electrode material reservoirs since there are a greater number of lithium reservoirs (i.e. twenty) than sulfur reservoirs (i.e. ten) and since the sulfur electrode material reservoirs must be large enough to contain the positive electrode material after the lithium has moved through the solid electrolyte and reacted with the sulfur in the positive electrode region.

The heating system 116 heats the selected reservoirs 104, 110 to place and maintain the lithium and sulfur in the fluid state while maintaining the lithium and sulfur within the non-selected reservoirs 106, 108, 112, 114 in the non-fluid state. The heating system 116 includes an electrode material distribution system 115 heating system portion (not shown) and a reaction chamber heating system portion 154 to maintain the electrode material distribution system 115 and the reaction chamber 102 at the appropriate temperature to facilitate the flow of the electrode materials and the desired reaction between the sulfur and lithium through the solid electrolyte comprising lithium iodide. For the example of FIG. 2, the temperature of the selected negative electrode reservoir 104 and the selected positive electrode reservoir 110 is maintained at a temperature around 400 degrees Celsius (° C.). As discussed above, the operating temperature may be based on several factors including the characteristics of the materials of the electrodes and solid electrolyte. For the example of FIG. 2, some of the characteristics that can be considered include the melting point of lithium iodide, 469° C., the melting point of lithium, 180.5° C., the melting point of sulfur, 115.21° C., the boiling point of sulfur, 444.6° C., and the eutectic melting point of lithium polysulfide products ($Li_nS_m$), 365° C. A temperature range that is above the eutectic melting point of lithium polysulfide products but below the melting point of LiI provides the temperature range of 365° C. to 469° C. that can be used in some circumstances. Maintaining the temperature below the boiling point of sulfur may be useful and provide a range 365° C. to 444° C. that can be used in other circumstances. A suitable temperature range, however, includes temperatures between 375° C. and 425° C. The wider temperature range of 115.21° C. to 469° C. can also be used in still other situations. For the examples herein, the temperatures of selected negative electrode reservoir 104, the selected positive electrode reservoir 110, the electrode material distribution system 115, the negative electrode region 132 and the positive electrode region 134 are maintained at approximately the same temperature. Among other advantages, such a scheme avoids a temperature gradient across the solid electrolyte. In some situations, however, the temperatures may be different between the different selected reservoirs and electrode regions. Other temperature ranges and schemes can be used as long as the selected portions of electrode materials can flow to the reaction chamber. As a result, the selected positive reservoir 110 and the positive electrode region 134 should be above the melting point of sulfur, 115.21° C., and the selected negative reservoir 104 and the negative electrode region 132 should be above the melting point of lithium, 180.5° C.

In some situations, additional materials may be added to the positive electrode material and/or to the negative electrode material. For example, phosphorus can be included in the positive electrode material resulting in a fluid phosphorus-sulfur positive electrode. Therefore, another example of the fluid electrode apparatus 100 includes a lithium phosphorus-sulfur (LiPS) battery. Therefore, in one example, the positive electrode material comprises sulfur and, in another example, the positive electrode material comprises sulfur and phosphorous. Examples of suitable temperature ranges for the reservoirs and reaction chamber for a LiPS battery include the ranges discussed above with reference to the LiS single cell battery system 200 of FIG. 2. As mentioned above, other electrochemical combinations of the cell can be used such as sodium and sulfur. Selection of operating temperatures may vary depending on the particular electrochemical combination.

In some situations, additional valves can be included at the reaction chamber in the interest of safety. For example, in addition to the valves 258-260 at the lithium electrode material reservoirs 208-210, a valve can be included at the other end of the channel 256 at the reaction chamber 102. Similarly, additional valves can be included at input port 262 and output port 264 to the positive electrode region 134 of the reaction chamber 120 on the supply channel 241 and return channel 240. Such a configuration, may be useful to provide the ability to further isolate fluid electrode material in the reaction chamber from other battery components or the environment in the case of a thermal runaway event or other failure.

The single cell battery system 200 is charged by providing a voltage across, and power to, the current collectors. During the charging procedure, the potential across the current collectors results in lithium negative electrode material ions being released from the sulfur positive electrode material within the positive electrode region of the reaction chamber. The lithium ions move through the solid electrolyte to the negative electrode region of the reaction chamber. The lithium is directed to lithium negative electrode material reservoirs to refill the reservoirs. When a lithium negative electrode material reservoir is filled to capacity, a standby lithium negative electrode material reservoir that is empty, or at least has available capacity, is connected, and the filled lithium negative electrode material reservoir is disconnected. As the lithium is released from the sulfur positive electrode material, the concentration of the negative electrode material within the positive electrode material decreases. For example, $2Li_2S_2$ can become $Li_2S_4$ when 2 Li-ions are removed, or $2Li_2S_4$ can become $Li_2S_8$ when 2 Li-ions are removed, or $Li_2S_8$ can become $S_8$ when 2 Li-ions are removed. Thus, the concentration of the negative electrode material (i.e., lithium) within the positive electrode material decreases in the circulated sulfur positive electrode material as the single cell battery system 200 is charged. Since the sulfur positive electrode material is being circulated between the positive electrode region of the reaction chamber and a sulfur positive electrode material reservoir, the concentration of the negative electrode material within the positive electrode material is also decreasing in the active sulfur positive electrode material reservoir during the charging process. When the concentration level has reached an acceptable threshold, the electrode material distribution system connects a standby sulfur positive electrode material reservoir and disconnects the currently active sulfur positive electrode material reservoir that now has a lower concentration of the negative electrode material within the positive electrode material. The standby sulfur positive electrode material reservoir with a relatively high concentration of the negative electrode material within the positive electrode material becomes the new active sulfur positive electrode material reservoir. The charging process continues until all of the lithium negative electrode material reservoirs are filled and all of the sulfur positive electrode material reservoirs have a concentration of the negative electrode material within the positive electrode material below the threshold.

Figure 3:
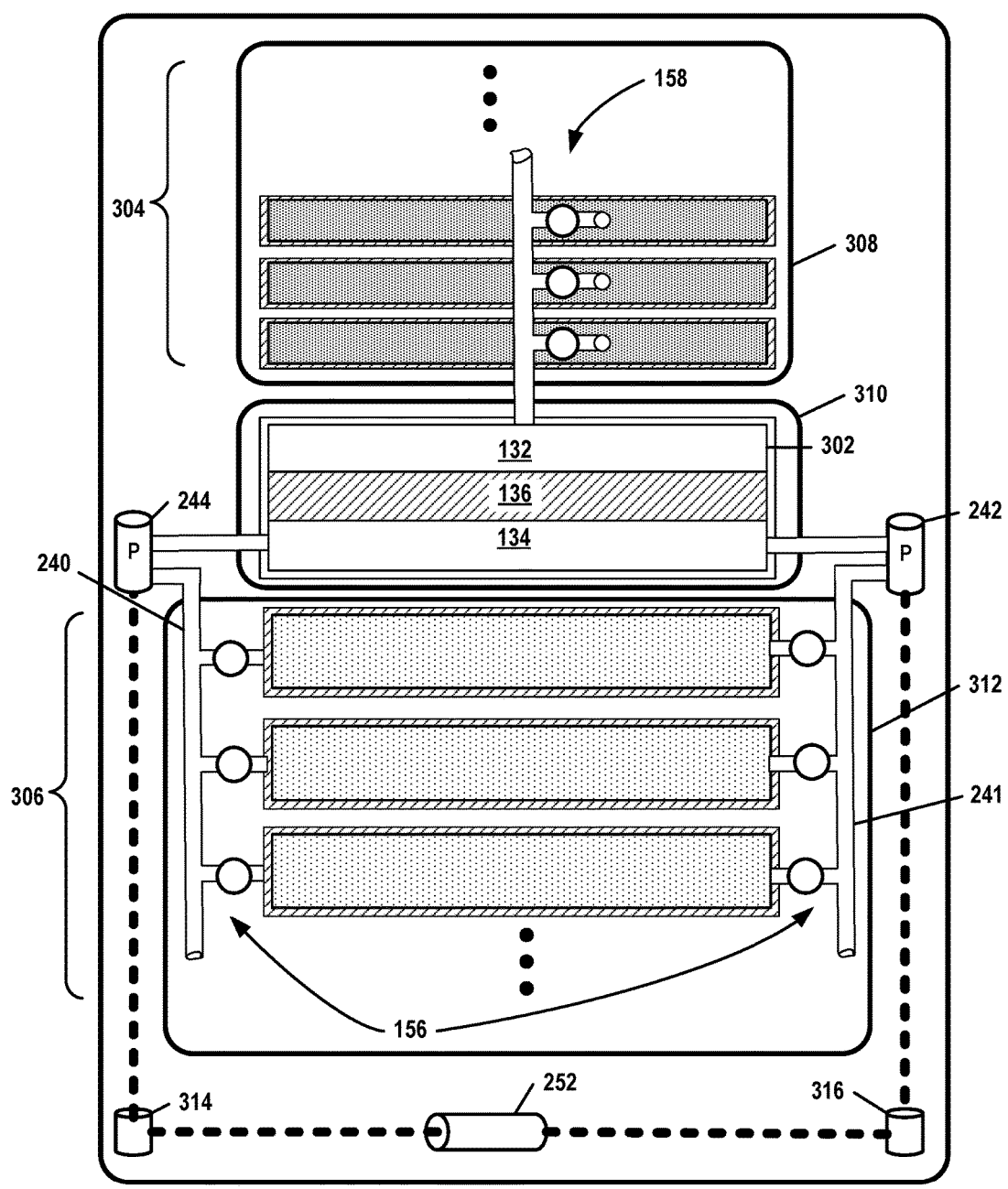
FIG. 3 is an illustration of a front view of a single cell battery system where the reaction chamber, a plurality of lithium electrode material reservoirs, and a plurality of sulfur electrode material reservoirs are vertically stacked planar rectangular prisms.

FIG. 3 is an illustration of a front view of a single cell battery system 300 where the reaction chamber 302, a plurality of lithium electrode material reservoirs 304, and a plurality of sulfur electrode material reservoirs 306 are vertically stacked planar rectangular prisms. The single cell battery system 300 of FIG. 3, therefore, is an example of the single cell battery system 200 of FIG. 2. The illustration in FIG. 3, depicts the general principles of the example and does not necessarily represent specific shapes, relative sizes, distances, or other structural details of the represented components. Although FIG. 3 reflects some structural, dimensional, orientational, and positional aspects of the single cell battery system 300, the figure is not necessarily to scale and does not necessarily depict all features of the single cell battery system 300. In some circumstances, the structures of two or more blocks may be implemented in a single component or structure. In addition, functions described as performed in a single block of FIG. 3 may be implemented in separate structures in some situations.

The single cell battery system 300 operates in accordance with the operations of the apparatus 100 and single cell battery system 200 discussed above. For the example of FIG. 3, the plurality of lithium electrode material reservoirs 304 are positioned directly above the reaction chamber 302 which is positioned directly above the plurality of sulfur electrode material reservoirs 306. The reservoirs 304, 306, and the reaction chamber 302 are rectangular prisms (cuboids) with rounded corners. The reaction chamber 302 and reservoirs 304, 306 are relatively thin and have heights that are relatively short compared to the lengths and widths. In one multiple cell system example discussed below, the reservoirs and reaction chamber are on the order of tens of centimeters wide (e.g., 50 cm) and tens of centimeters long (e.g., 50 cm) and have a height on the order of hundredths of a centimeter (i.e., on the order of tens of micrometers (μm)). The reaction chamber 302, therefore, is an example of the reaction chamber 102 where the reaction chamber has a thin, planar, cuboid shape.

The lithium electrode material reservoirs 304 are enclosed in a lithium reservoir housing 308, the reaction chamber 302 is enclosed in a reaction chamber housing 310 and the sulfur electrode material reservoirs 306 are enclosed in a sulfur electrode material reservoir housing 312. Therefore, the reservoirs 304, 306 in the single cell battery system 300 are not individually enclosed in separate housings as described in the single cell battery system 200 of FIG. 2.

In accordance with the discussion above, a motor 252 drives pumps 242, 244 to circulate sulfur electrode material between a sulfur electrode material reservoir and the positive electrode region of the reaction chamber. For the example of FIG. 3, rotational mechanisms 314, 316 such as gear mechanisms allow the use of single motor 252 to drive both pumps 242, 244. The rotational mechanisms 314, 316 are magnetically coupled to impellers in the pumps 242, 244. In some situations, the rotational mechanisms 314, 316 can be omitted and two motors can be used. An example of a suitable implementation of a pump includes using impellers mounted within the positive electrode material channels 240, 241.

The flow of lithium electrode material from a lithium electrode material reservoir to the negative electrode region of the reaction chamber is assisted by gravity. For the examples discussed herein, the single cell battery system 300 includes twenty lithium electrode material reservoirs 304 and ten sulfur electrode material reservoirs 306. The single cell battery system 300 includes a securing mechanism (not shown) that maintains the positions of the components relative to each other. Although any of several techniques can be used to secure the components in place, the securing mechanism should maintain the structure of the system 300 while electrically and thermally insulating the components from each other. One suitable example includes positioning non-conductive supports between the containers of the components and between the housings.

Additional components and features not shown in FIG. 3 may be included. For example, thermal runaway mitigation components, heating elements, sensors, and electronics discussed with reference to other examples may be included. As discussed above, additional valves at the reaction chamber can be included in some situations.

For some of the examples discussed herein, the electrode material distribution system connects selected reservoirs from a set of reservoirs to a reaction chamber where only the set of reservoirs can be connected to the particular reaction chamber. The electrode material distribution system may be configured to connect any one of the reservoirs to any one of the reaction chambers. As discussed below, for example, when the electrode material distribution system may connect reservoirs from a set of reservoirs associated with a failed reaction chamber to a redundant reaction chamber. In most situations, the complexity of the electrode distribution system will increase with the level of versatility and flexibility of connecting reservoirs to reaction chambers.

Figure 4:
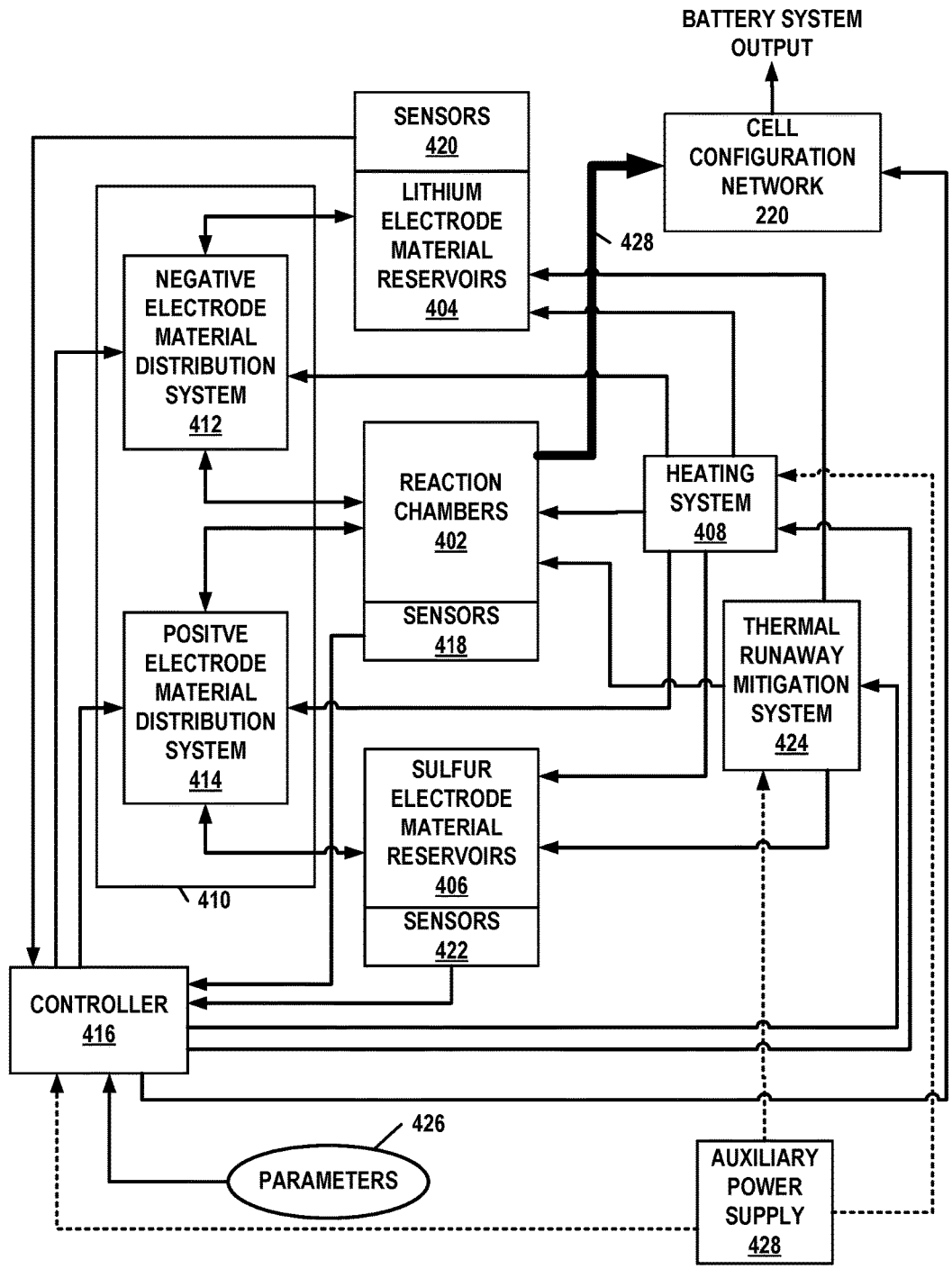
FIG. 4 is a block diagram of an example of a multiple cell battery system that includes multiple reaction chambers where each reaction chamber is connected to multiple lithium electrode material reservoirs and multiple sulfur electrode material reservoirs.

FIG. 4 is a block diagram of an example of a multiple cell battery system 400 that includes multiple reaction chambers 402 where each reaction chamber is connected to multiple lithium electrode material reservoirs 404 and multiple sulfur electrode material reservoirs 406. For the example of FIG. 4, therefore, each of a plurality of reaction chambers 402 is connected to two or more lithium electrode material reservoirs of a plurality of lithium electrode material reservoirs 404 and to two or more sulfur electrode material reservoirs of a plurality of sulfur electrode material reservoirs 406. Each group of components including a single reaction chamber and multiple reservoirs forms a single cell battery system such as the apparatus 100 or single cell battery systems 200, 300 discussed above. Any number of reaction chambers 402 and reservoirs 404, 406 can be used where the selected numbers may depend on the intended purpose of the multiple cell battery 400 and other factors. In an example discussed below with reference to FIG. 6, the multiple cell battery system comprises fourteen reaction chambers, 280 lithium electrode material reservoirs, and 140 sulfur electrode material chambers where each single cell battery system includes a reaction chamber, 20 lithium electrode material reservoirs and 10 sulfur electrode material reservoirs. Although the example of FIG. 4 includes a negative electrode material that comprises lithium and a positive electrode material that comprises sulfur, the techniques discussed with reference to FIG. 4 can be applied to multiple molten electrode cells with other electrochemical combinations. The techniques can be used in a multiple cell battery system including a negative electrode material comprising sodium (Na) and a positive electrode material comprising sulfur, for example. As mentioned above, the positive electrode material may include additional materials such as phosphorus in some situations.

During operation of the multiple cell battery system 400, all of the reaction chambers 402 and selected reservoirs are heated by the heating system 408 to place and maintain the electrode material in the selected reservoirs in the fluid state. The negative electrode material distribution system 412 and the positive electrode material distribution system 414 are also heated to ensure that the electrode materials being distributed remain in the fluid state. In some situations, one or more redundant reaction chambers may be included in the multiple cell battery system 400 that can be substituted for poor performing or failed reaction chambers. The redundant reaction chambers may not be heated until needed or may be heated to operating temperature or temperature below the operating temperature. The heating system 408 includes heating reaction chamber portions for heating the reaction chambers, heating electrode material distribution system portions for heating the electrode material distribution system, and several portions that allow for selectively heating selected reservoirs. The heating system 408, therefore, performs the functions of the heating system 116 discussed above for the multiple single cell battery systems in the multiple cell battery system 400. For the example, the heating system 408 includes a plurality of negative material heating system portions that are configured to independently and selectively heat each of selected reservoirs of the plurality of lithium material electrode reservoirs 404 and a plurality of positive material heating system portions that are configured to independently heat each of selected reservoirs of the plurality of sulfur electrode material reservoirs 406.

In some situations, the heating system 408 may employ regenerative or recuperative heating techniques to improve efficiency. For instance, during the charging process, an active negative electrode material reservoir will be refilled, and an active positive electrode material reservoir will be transitioned back to its fully charged state where the positive electrode material comprises no or a low concentration of the negative electrode material. Once the negative electrode material reservoir is full or the positive electrode material reservoir is fully charged, the controller 416 will remove the active negative or positive electrode material reservoir from the associated electrode material distribution system by closing a valve or valves and will transition the active electrode material reservoir to a de-activated state. Once in the de-activated state, the thermal energy associated with this de-activated electrode material reservoir can be used to heat other cooler portions of the battery using various methods. In one example, a heat transfer fluid can be circulated around the de-activated electrode material reservoir and then circulated around another cooler component within the battery to transfer thermal energy to this cooler component. This circulation continues until a thermal equilibrium is established. Then, the remaining thermal energy within the electrode material reservoir is transferred to a different cooler component using the same technique. This process continues until the remaining thermal energy within the electrode material reservoir is no longer useful to heat other cooler components of the battery. The cooler component of the battery that is being heated can be an electrode material reservoir, a reaction chamber, an electrode distribution system or a thermal mass. During the discharge process, the active negative electrode material reservoir is emptied so little thermal energy can be transferred from this reservoir once empty. On the other hand, the active positive electrode material reservoir during the discharge process is increasing in volume as the positive electrode species transition to a discharged state. Once the active positive reservoir reaches its fully discharged state, the controller 416 removes the active positive electrode material reservoir from the positive electrode material distribution system by closing valves and transitions the active positive electrode material reservoir to a de-activated state. Once in a de-activated state, the heat transfer follows the same method mentioned earlier. Other techniques can be used to efficiently reuse energy within the battery system. An electrode material distribution system 410 includes a negative electrode material distribution system 412 and a positive electrode material distribution system 414 where the electrode material distribution system 410, at the direction and control of a controller 416, directs and controls the flow of lithium electrode material and sulfur electrode material for each single cell battery system in the multiple cell battery system 400. Therefore, the negative electrode material distribution system 412 includes, or at least performs the functions of, several single cell negative electrode material distribution systems such as the negative electrode material distribution systems 158 discussed above in reference to the single cell battery systems 200, 300 and apparatus 100. Similarly, the positive electrode material distribution system 414 includes, or at least performs the functions of, several positive single cell electrode material distribution systems such as the positive electrode material distribution systems 156 discussed above in reference to the single cell battery systems 200, 300 and apparatus 100. In some situations, the electrode material distribution system 410 includes an independent single cell electrode material distribution system for each reaction chamber. In other situations, the single cell electrode material distribution system may not be completely independent from each other and may share common components. In one arrangement, for example, a single motor may be used to drive the impellers of pumps for multiple reaction chambers.

A plurality of sensors 418, 420, 422 provides information that can be used by the controller 416 for controlling the heating system 408, the thermal runaway mitigation system 424, the electrode material distribution system 410 and cell configuration network 220. The plurality of sensors 418, 420, 422 includes reaction chamber sensors 418, lithium reservoir sensors 420, and sulfur reservoir sensors 422. The sensors 418, 420, 422 may include several different types of sensors that may provide data related to temperature, current, voltage, capacitance, electrical conductivity, pressure, volume, weight, acceleration, humidity, moisture, and combinations thereof. For example, the sulfur reservoir sensors 422 may include sensors for measuring capacitance at multiple volume levels in the sulfur electrode material reservoirs 406 and the lithium reservoir sensors 420 may include sensors for measuring conductivity at various levels in the lithium electrode material reservoirs 404, and the reaction chamber sensors 418 may include sensors for measuring current or voltage output from each reaction chamber. In some situations, some of the sensors may be omitted. The plurality of sensors may include other sensors within the system 400 that measure parameters related to other components. For example, sensors may be positioned in each housing to measure moisture or pressure in order to detect a breach of the housing.

In addition to measurements and parameters provided by sensors within the battery system 400, other parameters 426 may be provided from any of several sources external to the battery system 400. For example, data regarding acceleration or deceleration may be provided by a vehicle system with a vehicle powered by the battery system. Such information may be useful in determining a traffic accident has occurred and placing the battery system 400 in safety mode. The safety mode may include preventing or mitigating a thermal runaway situation For the example of FIG. 4, the multiple cell battery system 400 includes a thermal runaway mitigation system 424. The thermal runaway mitigation system 424 cools at least portions of the battery system 400 to avoid or reverse a thermal runaway event. Examples of suitable techniques are discussed in the referenced patent application entitled "DEVICES, SYSTEMS, AND METHODS TO MITIGATE THERMAL RUNAWAY CONDITIONS IN MOLTEN FLUID ELECTRODE APPARATUS". In some situations, one or both of the electrode materials are cooled to place the material in a solid, non-fluid state. Based on one or more parameters, the controller 416 may turn off the heating system 408 for at least selected reservoirs and direct cooling heat transfer fluid to cool at least portions of the battery system 400. In addition to parameters based on sensor information provided by sensors in the battery system 400, the parameters may include external parameters 426 provided from outside the battery system 400. As discussed above, a vehicle may provide information that is used to place the battery system 400 in a safety mode. The safety mode may include activating the thermal runaway mitigation system 424.

The controller 416 is any controller, processor, electrical circuit, logic circuit, processing circuit, electronics, or processor arrangement that manages the functions described herein as well as facilitating the overall functionality of the multiple cell battery system 400. The controller provides control signals to the electrode material distribution system to manage flow of the fluid electrode material between reservoirs and the reaction chamber. The controller 416, for example, may send control signals to components such as valves and pumps in the fluid electrode distribution system 410 to select and switch active reservoirs during the discharging and charging cycles of the system 400. The controller 416 determines when to heat selected reservoirs and when to begin connecting the appropriate heated reservoirs to the reaction chambers to manage flow of fluid electrode material. In other words, the controller 416 controls the heating system 408 and fluid electrode material distribution system 410 to heat selected reservoirs and manage connection of active reservoirs to the reaction chambers 402. As discussed above, the controller 416 also controls components within the thermal runaway mitigation system 424 to increase safety of the battery system 400 and minimize the probability of fire. The controller 416 may also manage the cell configuration network 220 to connect and disconnect reaction chambers. The controller 416, therefore, may perform the functions of the controller 117 discussed above in addition to other functions.

For the example of FIG. 4, a plurality of conductors 428 from the reaction chambers 420 are provided to the cell configuration network 220 which provides a battery system output. The battery system output may be combined with outputs of other battery systems to produce combined output that has a chosen current or voltage. In one example, for instance, five battery systems 400 that each include fourteen reaction chambers are combined in parallel to form a 30 volt, 200 kWh, 150 kW battery system. In another example, five battery systems 400 that each include fourteen reaction chambers are combined in series to form a 150 volt, 200 kWh, 150 kW battery system. If very high battery system availability is required, then one or more redundant battery systems 400 can be added to the battery system. Various combinations of series and parallel electrical circuits with or without redundant battery systems can be configured to meet varying battery system requirements.

The multiple cell battery system 400 includes an auxiliary power supply 428 for providing power to the system when the cells are not generating sufficient energy to sustain and/or manage operation of the battery system 400. For example, when the battery is shut down (turned off) by the controller 416 or has been deactivated by the thermal runaway mitigation system 424, the auxiliary power supply 428 provides power to the controller and other electronics to manage the battery system 400. The auxiliary power supply 428 also provides power during the battery startup procedure. The auxiliary power supply 428 is used to directly or indirectly heat at least selected reactions chambers and reservoirs. When the battery system 400 is generating sufficient energy to support the controller, heating system, and other critical electronics, the auxiliary power supply 428 is no longer used to support these components. The auxiliary power supply 428 is shown connected to the heating system 408, thermal runaway mitigation system 424 and the controller 416 with dashed lines in FIG. 4 to indicate that the auxiliary power supply 428 only provides power during certain situations. The auxiliary power supply 428 may be a rechargeable battery system. In some situations, the auxiliary power supply 428 may be an external battery system provided by another system. For example, where the battery system 400 is used within an electrical vehicle, the vehicle may include an additional battery system. The auxiliary power supply 428 may also be at least partially provided by an alternating current (AC) power supply at a home, office building, or charging station. The auxiliary power supply 428 may include other electronics such as transformers and regulators.

Figure 5:
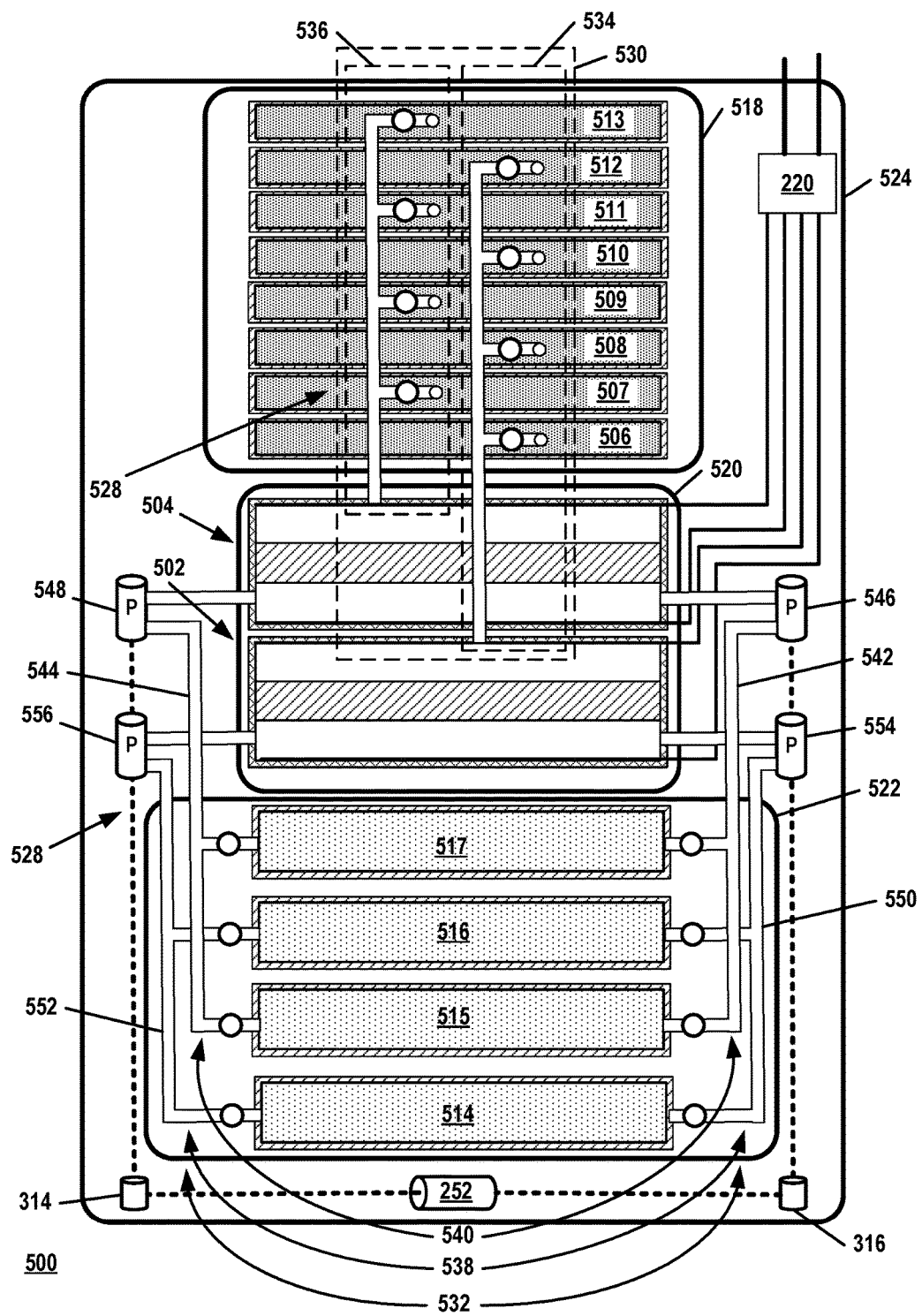
FIG. 5 is an illustration of a front view of an example of a multiple cell battery system that includes two reaction chambers where the lithium electrode material reservoirs, the reaction chambers, and the sulfur electrode material reservoirs are planar and vertically stacked.

FIG. 5 is an illustration of a front view of an example of a multiple cell battery system 500 that includes two reaction chambers 502, 504 where the lithium electrode material reservoirs 506-513, the reaction chambers 502, 504, and the sulfur electrode material reservoirs 514-517 are planar and vertically stacked. For the example, a first reaction chamber 502 is connected to four lithium electrode material reservoirs 506, 508, 510, 512 and two sulfur material electrode material reservoirs 514, 516 and second reaction chamber 504 is connected to four lithium electrode material reservoirs 507, 509, 511, 513 and two sulfur material electrode material reservoirs 515, 517. The multiple cell battery system 500, therefore, includes two single cell battery systems where each single cell battery system is an example of the single cell battery system 300 of FIG. 3. The illustration of FIG. 5, depicts the general principles of the example and does not necessarily represent specific shapes, relative sizes, distances, or other structural details of the represented components. Although FIG. 5 reflects some structural, dimensional, orientational, and positional aspects of the multiple cell battery system 500, the figure is not necessarily to scale and does not necessarily depict all features of the multiple cell battery system 500. In some circumstances, the structures of two or more blocks may be implemented in a single component or structure. In addition, functions described as performed in a single block of FIG. 5 may be implemented in separate structures in some situations.

Each of the single cell battery systems operates in accordance with the operations of the apparatus 100, single cell battery system 200, and the single cell battery system 300 discussed above. For the example of FIG. 5, a plurality of lithium electrode material reservoirs 506-513 are positioned directly above the reaction chambers 502, 504 which are positioned directly above a plurality of sulfur electrode material reservoirs 514-517. The reservoirs 506-517 and the reaction chambers 502, 504 are rectangular prisms (cuboids) with rounded corners. The reaction chambers and reservoirs are relatively thin and have heights that are relatively short compared to the lengths and widths. Such a structure maximizes the areas of the interfaces between the electrodes and the solid electrolyte to facilitate higher current flow. In one multiple cell example discussed below, the reservoirs and reaction chamber are on the order of tens of centimeters wide and long and have a height on the order of hundredths of a centimeter. Other factors, however, may be considered when selecting dimensions of the reaction chambers and reservoirs. The distance between supply channel and return channel on the positive electrode region may at least partially influence the maximum current of the reaction chamber, for example. As a result, the shape of the reaction chamber may be rectangular and may include dimensions where the distance between the channels is less than distance between the other two sides of the rectangle.

The lithium electrode material reservoirs 506-513 are enclosed in a lithium reservoir housing 518, the reaction chambers 502, 504 are enclosed in a reaction chamber housing 520 and the sulfur electrode material reservoirs 514-517 are enclosed in a sulfur electrode material reservoir housing 522. Therefore, the lithium electrode material reservoirs of both single cell battery systems are included in the same lithium housing, both reaction chambers 502, 504 are enclosed in the same reaction chamber housing, and the sulfur electrode material reservoirs of both single cell battery systems are included in the same sulfur reservoir housing in the example of FIG. 5. A battery housing 524 encloses the three housings 518, 520, 522 as well as other components.

The electrode material distribution system 528 of the multiple cell battery system 500 includes a lithium electrode material distribution system 530 and a sulfur electrode material distribution system 532. The lithium electrode material distribution system 530 includes a first reaction chamber portion 534 and a second reaction chamber portion 536. The first reaction chamber portion 534 of the lithium electrode material distribution system 530 includes a negative electrode channel and valves connected to each lithium electrode material reservoir 506, 508, 510, 512 that is connected to the first reaction chamber 502. The second reaction chamber portion 536 of the lithium electrode material distribution system 530 includes a negative electrode channel and valves connected to each lithium electrode material reservoir 507, 509, 511, 513 that is connected to the second reaction chamber 504. Therefore, each portion 534, 536 is an example of the negative electrode material distribution system 158 discussed above in regard to single cell negative electrode material distribution system.

The sulfur electrode material distribution system 532 includes a first reaction chamber portion 538 and a second reaction chamber portion 540 that each include a network of positive electrode material channels, a supply pump, a return pump, input valves and output valves. Therefore, the first reaction chamber portion 538 of the sulfur electrode material distribution system 532 includes positive electrode channels 550, 552, a supply pump 554, a return pump 556, input valves and output valves on each sulfur electrode material reservoir 514, 516 connected to the first reaction chamber 502. The second reaction chamber portion 540 of the sulfur electrode material distribution system 532 includes positive electrode channels 542, 544, a supply pump 546, a return pump 548, input valves and output valves on each sulfur electrode material reservoir 515, 517 connected to the second reaction chamber 504. Therefore, each portion 538, 540 is an example of the positive electrode material distribution system 156 discussed above in regard to a single cell positive electrode material distribution system.

The operation of the first reaction chamber portions 534, 538 and the second reaction chamber portions 536, 540 of the electrode material distribution system 528 is in accordance with the operation of the single cell electrode material distribution system 115, negative electrode material distribution mechanism 158 and positive electrode material distribution mechanism 156 discussed above. For the example of FIG. 5, a single motor 252 drives the pumps for both reaction chambers 502, 504.

Each pair of pumps 546, 548 (554, 556) driven by the motor 252 circulate sulfur electrode material between a sulfur electrode material reservoir and a positive electrode region of each reaction chamber 502, 504. For the example, therefore, the motor 252 drives the supply pump 554 of the first reaction chamber portion 538 and the supply pump of 546 of the second reaction chamber portion 540 of the sulfur electrode material distribution system 532 through a rotational mechanism 316. The motor 252 also drives the return pump 556 of the first reaction chamber portion 538 and the return pump of 548 of the second reaction chamber portion 540 of the sulfur electrode material distribution system 532 through another rotational mechanism 314.

The multiple cell battery system 500 includes a securing mechanism (not shown) that maintains the positions of the components relative to each other. Although any of several techniques can be used to fix the components in place, the securing mechanism should maintain the structure of the system 500 while electrically and thermally insulating the components from each other. One suitable example includes positioning non-conductive supports between the containers of the components.

The two single cell battery systems formed by the two reaction chambers 502, 504 operate at the same time in the example. The electrical energy produced by each single cell battery system can be combined in series by the cell configuration network 220 to provide a voltage output of the multiple cell battery system that is twice the voltage of a single cell battery system. Further, the electrical energy produced by each single cell battery system can be combined in parallel by the cell configuration network 220 to provide a current output of the multiple cell battery system that is twice the current of a single cell battery system. Although the example of FIG. 5 shows two reaction chambers, the techniques described herein can be applied to any number of reaction chambers and reservoirs. As discussed below with reference to FIG. 6, for example, fourteen reaction chambers can be combined in series to provide a voltage of approximately 30V for the lithium-sulfur chemistry.

Additional components and features not shown in FIG. 5 may be included. For example, thermal runaway mitigation components, heating elements, sensors, and electronics discussed with reference to other examples may be included. As discussed above, additional valves can be included at the reaction chambers in the interest of safety.

Figure 6:
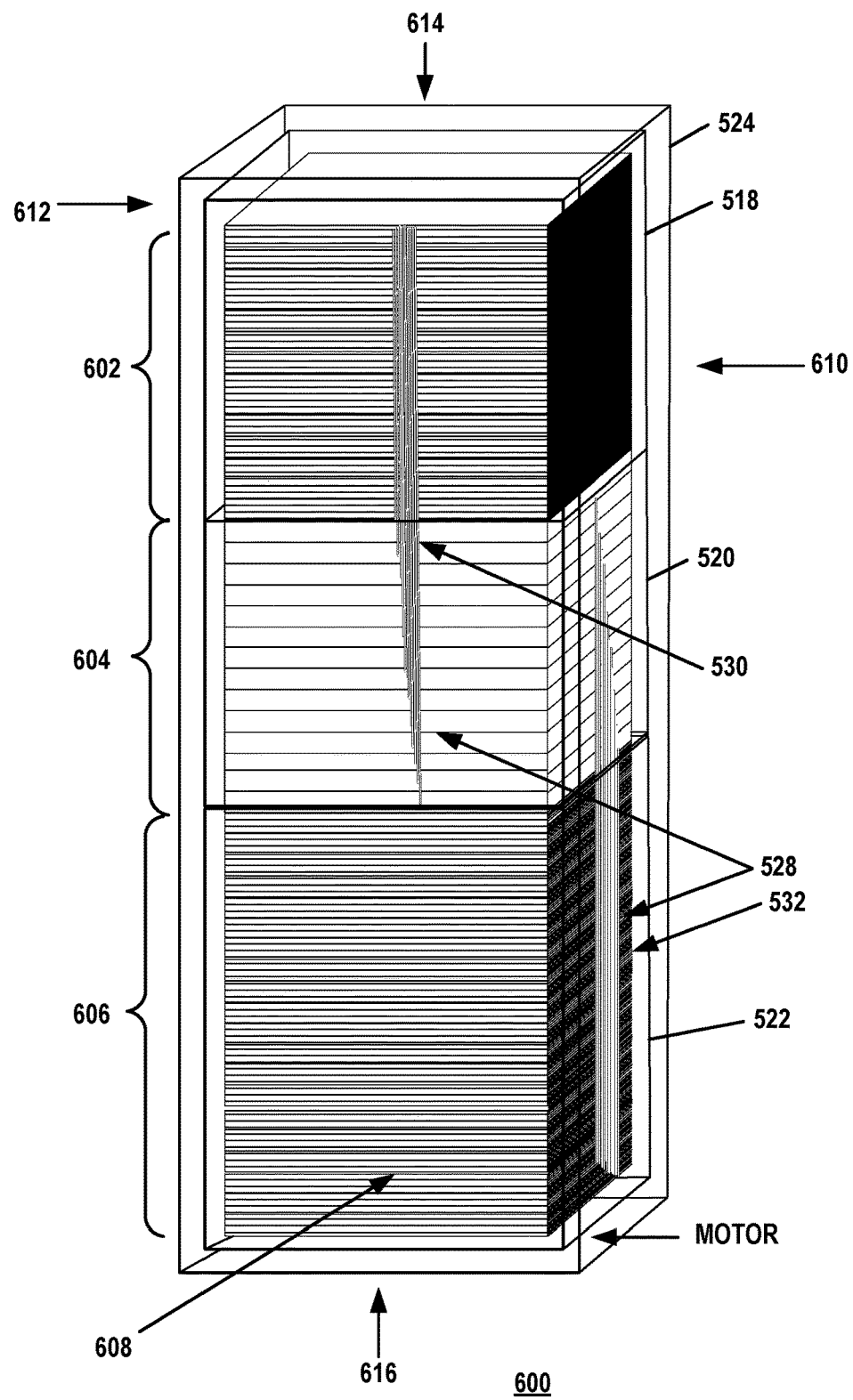
FIG. 6 is an illustration of a perspective view of an example of a multiple cell battery system having 14 reaction chambers where the lithium electrode material reservoirs, the reaction chambers, and the sulfur electrode material reservoirs are planar and vertically stacked.

FIG. 6 is an illustration of a perspective view of an example of a multiple cell battery system 600 having 14 reaction chambers where the lithium electrode material reservoirs 602, the reaction chambers 604, and the sulfur electrode material reservoirs 606 are planar and vertically stacked. For the example, each of the 14 reaction chambers is connected to 20 lithium electrode material reservoirs and 10 sulfur material electrode material reservoirs. The multiple cell battery system 600, therefore, includes 14 single cell battery systems where each single cell battery system is an example of the single cell battery system 300 of FIG. 3. Further, the multiple cell battery system 600 is an example of the multiple cell battery system 500 that includes 14 reaction chambers, 280 lithium electrode material reservoirs and 140 sulfur electrode material reservoirs. The illustration in FIG. 6, depicts the general principles of the example and does not necessarily represent specific shapes, relative sizes, distances, or other structural details of the represented components. Although FIG. 6 reflects some structural, dimensional, orientational, and positional aspects of the system 600, therefore, the figure is not necessarily to scale and does not necessarily depict all features of the multiple cell battery system 600.

Each of the single cell battery systems operates in accordance with the operations of the apparatus 100, single cell battery system 200, and the single cell battery system 300 discussed above and the multiple cell battery system 600 operates in accordance with the multiple battery systems 400, 500 discussed above. For the example of FIG. 6, a plurality of lithium electrode material reservoirs 602 are positioned directly above the 14 reaction chambers 604 which are positioned directly above a plurality of sulfur electrode material reservoirs 606. The reservoirs 602, 606 and the reaction chambers 604 are rectangular prisms (cuboids) with rounded corners. The reaction chambers and reservoirs are relatively thin and have heights that are relatively short compared to the lengths and widths. For the example of FIG. 6, each of the reaction chambers has an external width and length of 44.721 cm and a height of 703.2 μm.

The lithium electrode material reservoirs 602 are enclosed in a lithium reservoir housing 518, the reaction chambers 604 are enclosed in a reaction chamber housing 520 and the sulfur electrode material reservoirs 606 are enclosed in a sulfur electrode material reservoir housing 522. Therefore, all of the lithium electrode material reservoirs are enclosed in the same lithium housing, all the reaction chambers 604 are enclosed in the same reaction chamber housing, and all of the sulfur electrode material reservoirs are enclosed in the same sulfur reservoir housing in the example of FIG. 6. A battery housing 524 encloses the three housings 518, 520, 522 as well as other components.

The electrode material distribution system 528 of the multiple cell battery system 600 includes a lithium electrode material distribution system 530 and a sulfur electrode material distribution system 532. The lithium electrode material distribution system 530 operates in accordance with the description with reference to FIG. 5. The lithium electrode material distribution system 530 for the example of FIG. 6, however, includes 14 portions such that each portion is connected to a reaction chamber and 20 lithium electrode material reservoirs. As discussed above, each portion of the lithium electrode material distribution system 530 includes a negative electrode channel, a valve on each lithium electrode material reservoir and potentially a pump. The lithium electrode material distribution system 530 is disposed along a front face 608 of the multiple cell battery system 600.

The sulfur electrode material distribution system 532 operates in accordance with the sulfur electrode material distribution system 532 discussed with reference to FIG. 5. The sulfur electrode material distribution system 532 for the example of FIG. 6, however, includes 14 portions such that each portion is connected to a reaction chamber and 10 sulfur electrode material reservoirs. As discussed above, each portion of the sulfur electrode material distribution system 532 includes positive electrode channels, a supply pump, and a return pump, as well as input valves and output valves on each sulfur electrode material reservoir. For the example of FIG. 6, the supply pumps and supply positive electrode channels of 14 portions are disposed on a first lateral side 610 and the return pumps and return positive electrode channels of the 14 portions are disposed on a second lateral side 612 opposite the first lateral side 610. Therefore, lithium electrode material distribution system 530 is disposed along a side other than the two sides used for the sulfur electrode material distribution system 532. In some situations, other components can be positioned on or near the fourth side (back face opposite the front face). For example, electronics may be mounted on the inner surface of a housing near the back face or sensors may be positioned on the back face of the battery system 600. In addition, components may be positioned along or near the top face 614 or bottom face 616. For the example, the motor 252 and any associated mechanical mechanisms, such as gears, are positioned within the battery housing 524 along or near the bottom face 616.

The multiple cell battery system 600 includes a securing mechanism that maintains the positions of the components relative to each other. Although any of several techniques can be used to fix the components in place, the securing mechanism should maintain the structure of the multiple cell battery system 600 while electrically and thermally insulating the components from each other. One suitable example includes positioning non-conductive supports between the containers of the components.

Figure 7A:
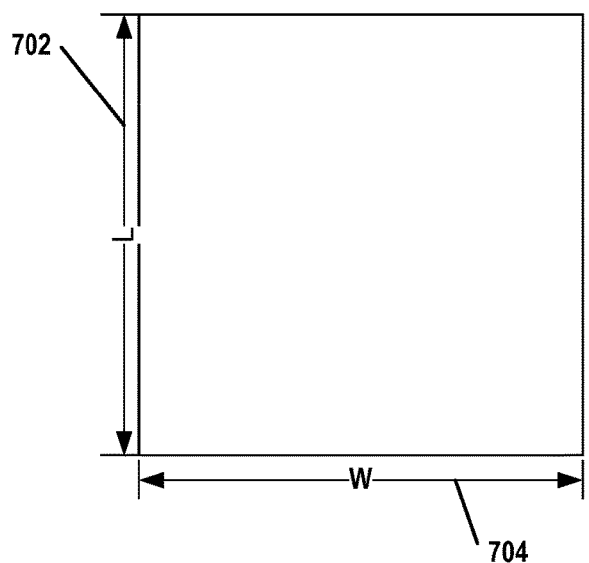
FIG. 7A is an illustration of top views of the reaction chamber, lithium electrode material reservoir, and sulfur electrode material reservoir of the multiple cell battery system.

FIG. 7A, FIG. 7B, FIG. 7C and FIG. 7D are illustrations of some of the components of the multiple cell battery system 600. FIG. 7A is an illustration of top views of the reaction chamber, lithium electrode material reservoir, and sulfur electrode material reservoir of the multiple cell battery system 600. For the example discussed with reference to FIG. 6 and FIG. 7A, the reaction chambers 604, lithium electrode material reservoirs 602, and sulfur electrode material reservoirs 606 have the same length and width. For the example, the external length (L) 702 and width (W) 704 are both equal to 44.721 cm. The heights of the components are discussed below with reference to FIG. 7B, FIG. 7C and FIG. 7D.

Although the multiple cell battery system 600 has a square cross-section from the top, other shapes can be used. In order to maintain the same power capacity of the battery system, the area of the shape should be the same. As mentioned above, the shape of the reaction chambers may be rectangular such that the distance between the supply and return channels in the positive electrode region is relatively short and the other length reaction chamber is relatively long to maintain a constant area and to increase the maximum current produced by the cell. By decreasing the distance between the supply channel and the return channel, the fluid positive electrode material that is flowing through the reactor is not as quickly transformed to a fully discharged state. For instance, if the distance between the supply channel and the return channel of the reaction chamber is too large for a given fluid positive electrode material flow rate and discharge current, the fluid positive electrode material could be fully discharged to a solid state before reaching the end of the reaction chamber and potentially impede the flow of the fluid positive electrode material through the reaction chamber. To resolve this potential issue and maximize the current produced by the cell, the distance between the supply and return channels can be minimized and the flow rate of the positive electrode material can be maximized. This approach would lead to rectangular geometries where the distance between the supply and return channels is shorter than the other rectangular dimension.

Figure 7B:
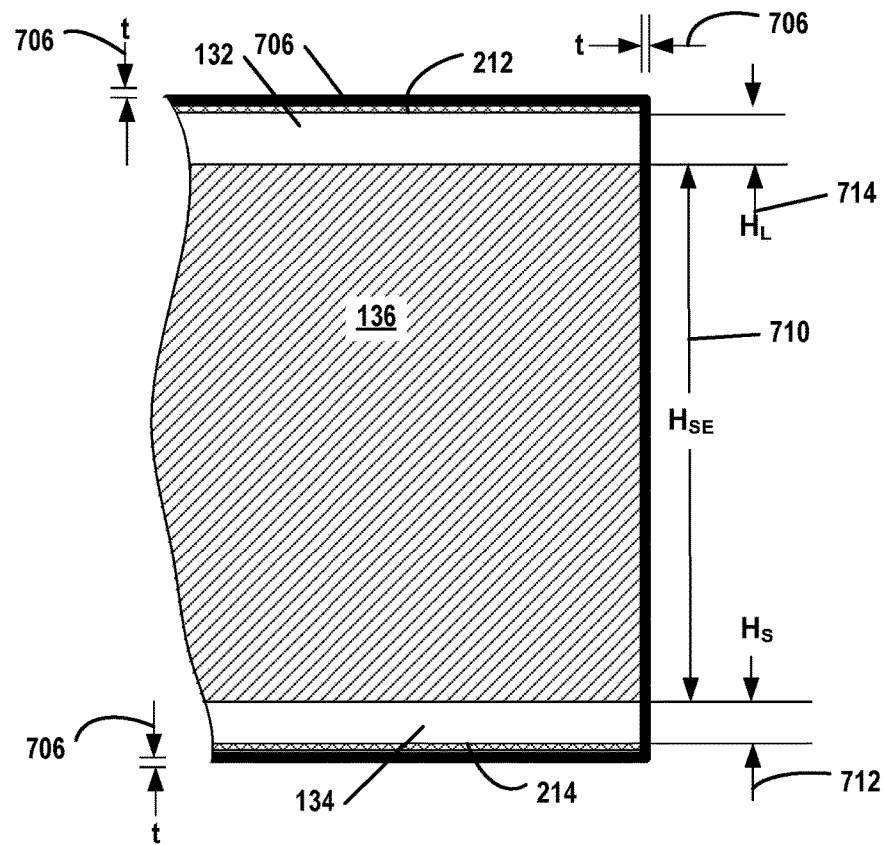
FIG. 7B is an illustration of a cross-sectional side view of a portion of one of the reaction chambers.

FIG. 7B is an illustration of a cross-sectional side view of a portion of one of the reaction chambers 604. For the example, containers 706 of the reaction chambers are ductile cast iron or other relatively low-cost metal or metal alloy capable of operating at the temperatures required for the battery. In one example, the current collectors are separate from the reaction chamber walls and the relatively low-cost metal or metal alloy reaction chamber wall is protected from chemical attack with an inert coating, and the current collectors are protected by an electrically conductive inert coating. Examples of suitable non-electrically conductive coatings for use in the negative electrode region of the reaction chamber include magnesium oxide (MgO), boron nitride (BN), calcium oxide (CaO), tantalum(III) oxide ($Ta_2O_3$), samarium (III) oxide ($Sa_2O_3$), lithium oxide ($Li_2O$), beryllium oxide (BeO), terbium(III) oxide ($Tb_2O_3$), dysprosium (III) oxide ($Dy_2O_3$), thorium dioxide ($ThO_2$), gadolinium(III) oxide ($Gd_2O_3$), erbium(III) oxide ($Er_2O_3$), yttrium(III) oxide ($Y_2O_3$), lithium chloride (LiCl), holmium (III) oxide ($Ho_2O_3$), neodymium(III) oxide ($Nd_2O_3$), ytterbium(III) oxide ($Yb_2O_3$), lanthanum(III) oxide ($La_2O_3$), praseodymium(III) oxide ($Pr_2O_3$), lithium fluoride (LiF), lutetium(III) oxide ($Lu_2O_3$), scandium(III) oxide ($Sc_2O_3$), thulium (III) oxide ($Tm_2O_3$), samarium(III) oxide ($Sm_2O_3$), cerium(III) oxide ($Ce_2O_3$), and mendelevium(III) oxide ($Md_2O_3$). Other potential inert coating that may be suitable include barium oxide (BaO), strontium oxide (SrO), magnesium fluoride ($MgF_2$), cerium(IV) oxide ($CeO_2$), uranium (IV) oxide ($UO_2$), europium (II) oxide (EuO), zirconium dioxide ($ZrO_2$), sodium fluoride (NaF), europium(III) oxide ($Eu_2O_3$), chrysoberyl ($BeAl_2O_4$), calcium silicate ($Ca_2SiO_4$), hafnium(IV) oxide ($HfO_2$), calcium titanate ($CaTiO_3$), $Ca_2Al_2SiO_7$, magnesium aluminate ($MgAl_2O_4$), kalsilite ($KAlSiO_4$), magnesium metasilicate ($MgSiO_3$), $CaMg(SiO_4)_2$, $Ca_3MgSi_2O_7$, Merwinite ($Ca_3Mg(SiO_4)_2$), calcium silicate ($CaSiO_3$). Examples of suitable electrically conductive coatings for use in the negative electrode region of the reaction chamber include vanadium, vanadium alloys such as V-3Ti-1Si, V-15Cr-5Ti, V-9Cr-3Fe-1Zr, molybdenum, molybdenum alloys such as Mo-0.5Ti-0.08Zr (TZM), niobium, and tantalum. Other potential inert electrically conductive coatings that may be suitable include tungsten, chromium, zirconium, titanium, and stainless steel 304 (when operating under 593° C.). Examples of suitable non-electrically conductive coatings for use in the positive electrode region of the reaction chamber include magnesium oxide (MgO), titanium oxide ($TiO_2$), boron nitride (BN), calcium oxide (CaO), tantalum(III) oxide ($Ta_2O_3$), samarium (III) oxide ($Sa_2O_3$), lithium oxide ($Li_2O$), beryllium oxide (BeO), terbium(III) oxide ($Tb_2O_3$), dysprosium (III) oxide ($Dy_2O_3$), thorium dioxide ($ThO_2$), gadolinium (III) oxide ($Gd_2O_3$), erbium(III) oxide ($Er_2O_3$), yttrium(III) oxide ($Y_2O_3$), lithium chloride (LiCl), holmium(III) oxide ($Ho_2O_3$), neodymium(III) oxide ($Nd_2O_3$), ytterbium(III) oxide ($Yb_2O_3$), lanthanum(III) oxide ($La_2O_3$), praseodymium(III) oxide ($Pr_2O_3$), lithium fluoride (LiF), lutetium(III) oxide ($Lu_2O_3$), scandium(III) oxide ($Sc_2O_3$), thulium (III) oxide ($Tm_2O_3$), samarium(III) oxide ($Sm_2O_3$), cerium(III) oxide ($Ce_2O_3$), and mendelevium(III) oxide ($Md_2O_3$). Other potential inert coating that may be suitable include barium oxide (BaO), strontium oxide (SrO), magnesium fluoride ($MgF_2$), cerium(IV) oxide ($CeO_2$), uranium(IV) oxide ($UO_2$), europium (II) oxide (EuO), zirconium dioxide ($ZrO_2$), sodium fluoride (NaF), europium(III) oxide ($Eu_2O_3$), chrysoberyl ($BeAl_2O_4$), calcium silicate ($Ca_2SiO_4$), hafnium(IV) oxide ($HfO_2$), calcium titanate ($CaTiO_3$), $Ca_2Al_2SiO_7$, magnesium aluminate ($MgAl_2O_4$), kalsilite ($KAlSiO_4$), magnesium metasilicate ($MgSiO_3$), $CaMg(SiO_4)_2$, $Ca_3MgSi_2O_7$, Merwinite ($Ca_3Mg(SiO_4)_2$), calcium silicate ($CaSiO_3$). Yet, other potential inert non-electrically conductive coatings that may be suitable include various metal oxides such as alumina ($Al_2O_3$), silica ($SiO_2$), potassium oxide ($K_2O$), and boron trioxide ($B_2O_3$) and even proprietary materials such as Corning Inc.'s Macor product. Yet, other potential inert electrically conductive coatings that may be suitable include molybdenum, molybdenum alloys such as Mo-0.5Ti-0.08Zr (TZM). It should be noted that some of the non-electrically conductive coatings may become electrically conductive at the operating temperature of the battery. The wall thickness (t) 706 of the inexpensive metal or metal alloy is 100 µm, and the thickness of the inert coating is approximately 500 nm. The thickness of the inert coating will depend upon the inert coating material. The solid electrolyte 136 has a height ($H_{SE}$) 710 of 500 µm. The positive electrode region 134 has a height (Hs) 712 of 1.1 µm, and the negative electrode region 132 has a height ($H_L$) 714 of 2.1 µm.

The current collectors are formed from electrically conductive materials. One example of a suitable current collector material includes copper. In some situations, brass can be used and may provide some cost savings over copper. The current collectors 212, 214 are coated with inert electrically conductive coating. One example of a suitable coating material for the negative current collector 212 is vanadium, an inert, electrically conductive coating. Other suitable coatings for the negative electrode current collector 212 include vanadium alloys such as V-3Ti-1Si, V-15Cr-5Ti, V-9Cr-3Fe-1Zr, molybdenum, molybdenum alloys such as Mo-0.5Ti-0.08Zr (TZM), niobium, and tantalum. Other potential inert electrically conductive coating that may be suitable include tungsten, chromium, zirconium, titanium, and stainless steel 304 (when operating under 593° C.).

The positive electrode current collector may be coated with tungsten doped titanium oxide in a rutile phase, an inert, electrically conductive coating. Other suitable coatings for the positive electrode current collector 214 include niobium doped titanium oxide, tantalum doped titanium oxide, indium tin oxide, molybdenum, and $RCoO_3$ where R is lanthanum (La), praseodymium (Pr), neodymium (Nd), samarium (Sm), europium (Eu) and gadolinium (Gd).

In another example, the current collectors 212, 214 are incorporated in the reaction chamber walls. The metal or metal alloy walls of the reaction chamber are coated with an electrically conductive coating allowing current to flow through the coating and the chamber wall. The negative electrode current collector 212 when integrated into the reaction chamber wall has a thickness of 100 µm associated with the relatively low-cost metal or metal alloy wall and a thickness of 2.5 µm associated with vanadium, an inert, electrically conductive coating on the inexpensive metal or metal alloy wall. The inert coating protects the current collector 212 from reactions with the negative electrode material. Other suitable coatings for the negative electrode current collector 212 include vanadium alloys such as V-3Ti-1Si, V-15Cr-5Ti, V-9Cr-3Fe-1Zr, molybdenum, molybdenum alloys such as Mo-0.5Ti-0.08Zr (TZM), niobium, and tantalum. Other potential inert electrically conductive coating that may be suitable include tungsten, chromium, zirconium, titanium, and stainless steel 304 (when operating under 593° C.).

The positive electrode current collector 214 when integrated into the reaction chamber wall has a thickness of 100 µm associated with the inexpensive metal or metal alloy wall and a thickness of 500 nm associated with tungsten doped titanium oxide in a rutile phase, an inert, electrically conductive coating on the metal or metal alloy wall. The inert coating protects the current collector 214 from reactions with the positive electrode material. Other suitable coatings for the positive electrode current collector 214 include niobium doped titanium oxide, tantalum doped titanium oxide, indium tin oxide, molybdenum, and $RCoO_3$ where R is lanthanum (La), praseodymium (Pr), neodymium (Nd), samarium (Sm), europium (Eu) and gadolinium (Gd).

Where the current collectors are integrated with the reaction chamber walls, each portion of the reaction chamber structure is electrically insulated from the other. In other words, the reaction chamber walls enclosing the negative electrode region of the reaction chamber is electrically insulated from the reaction chamber walls enclosing the positive electrode region of the reaction chamber.

Where the current collectors are integrated with the reaction chamber walls, additional electrical insulation may be used to isolate each cell from the others. This may be particularly useful where redundant reaction chambers are available to incorporate into the battery system to replace a failing reaction chamber. In some situations, the battery system may be implemented such that the reaction chambers are physically stacked and are in electrical contact with each other. For example, a battery system including several reaction chambers may have a structure where the negative reactive chamber portion of lower reaction chamber contacts the positive reaction chamber portion of a reaction chamber above the lower reaction chamber. The reaction chambers are, therefore, connected in a series combination in such an implementation. Using such a structure may at least partially depend on the mean time between failures (MTBF) for the battery cells and required performance since the battery system cannot be easily reconfigured during operation to replace failed reaction chambers.

Figure 7C:
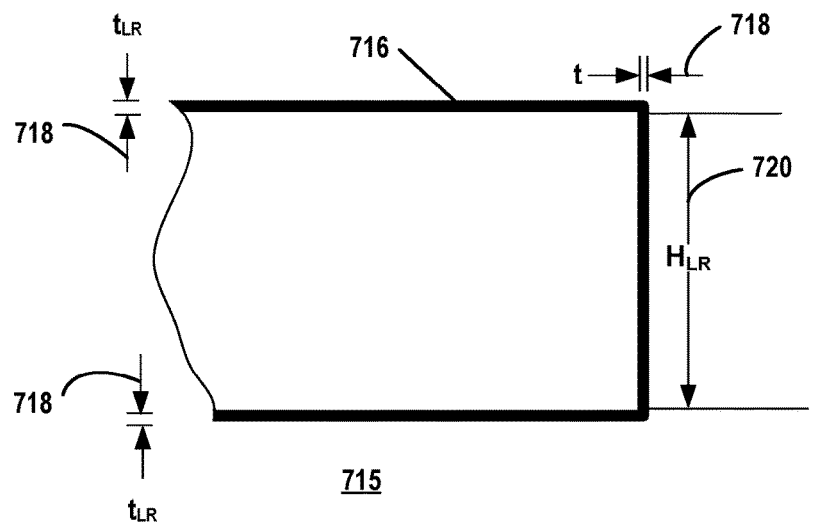
FIG. 7C is an illustration of a cross-sectional side view of a portion of one of the lithium electrode material reservoirs.

FIG. 7C is an illustration of a cross-sectional side view 715 of a portion of one of the lithium electrode material reservoirs 602. For the example, the containers 716 of the lithium electrode material reservoirs 602 are ductile cast iron or relatively low-cost metal or metal alloy capable of operating at the temperatures required for the battery coated with an inert coating and have a wall thickness ($t_{LR}$) 718 of 100 µm and an inert coating thickness of 500 nm. The internal height ($H_{LR}$) 720 of the lithium electrode material reservoir is 187 µm for the example. The inert coating protects the lithium electrode material reservoirs 602 from reactions with the negative electrode material. Examples of suitable inert coatings include magnesium oxide (MgO), boron nitride (BN), calcium oxide (CaO), tantalum(III) oxide ($Ta_2O_3$), samarium (III) oxide ($Sa_2O_3$), lithium oxide ($Li_2O$), beryllium oxide (BeO), terbium(III) oxide ($Tb_2O_3$), dysprosium (III) oxide ($Dy_2O_3$), thorium dioxide ($ThO_2$), gadolinium(III) oxide ($Gd_2O_3$), erbium(III) oxide ($Er_2O_3$), yttrium(III) oxide ($Y_2O_3$), lithium chloride (LiCl), holmium (III) oxide ($Ho_2O_3$), neodymium(III) oxide ($Nd_2O_3$), ytterbium(III) oxide ($Yb_2O_3$), lanthanum(III) oxide ($La_2O_3$), praseodymium(III) oxide ($Pr_2O_3$), lithium fluoride (LiF), lutetium(III) oxide ($Lu_2O_3$), scandium(III) oxide ($Sc_2O_3$), thulium (III) oxide ($Tm_2O_3$), samarium(III) oxide ($Sm_2O_3$), cerium(III) oxide ($Ce_2O_3$), and mendelevium(III) oxide ($Md_2O_3$). Other potential inert coating that may be suitable include barium oxide (BaO), strontium oxide (SrO), magnesium fluoride ($MgF_2$), cerium(IV) oxide ($CeO_2$), uranium (IV) oxide ($UO_2$), europium (II) oxide (EuO), zirconium dioxide ($ZrO_2$), sodium fluoride (NaF), europium(III) oxide ($Eu_2O_3$), chrysoberyl ($BeAl_2O_4$), calcium silicate ($Ca_2SiO_4$), hafnium(IV) oxide ($HfO_2$), calcium titanate ($CaTiO_3$), $Ca_2Al_2Si_{O7}$, magnesium aluminate ($MgAl_2O_4$), kalsilite ($KAlSiO_4$), magnesium metasilicate ($MgSiO_3$), $CaMg(SiO_4)_2$, $Ca_3MgSi_2O_7$, Merwinite ($Ca_3Mg(SiO_4)_2$), calcium silicate ($CaSiO_3$). Yet, other potential inert coating that may be suitable include vanadium, vanadium alloys such as V-3Ti-1Si, V-15Cr-5Ti, V-9Cr-3Fe-1Zr, molybdenum, molybdenum alloys such as Mo-0.5Ti-0.08Zr (TZM), niobium, and tantalum. Other potential inert coating that may be suitable include tungsten, chromium, zirconium, titanium, and stainless steel 304 (when operating under 593° C.). Note that different coating thicknesses may be required for the various coating materials. For instance, a 2.5 µm coating of vanadium could be required to protect the lithium reservoir wall from long term corrosion where only 500 nm of magnesium oxide (MgO) may be required to provide the same level of corrosion protection.

Figure 7D:
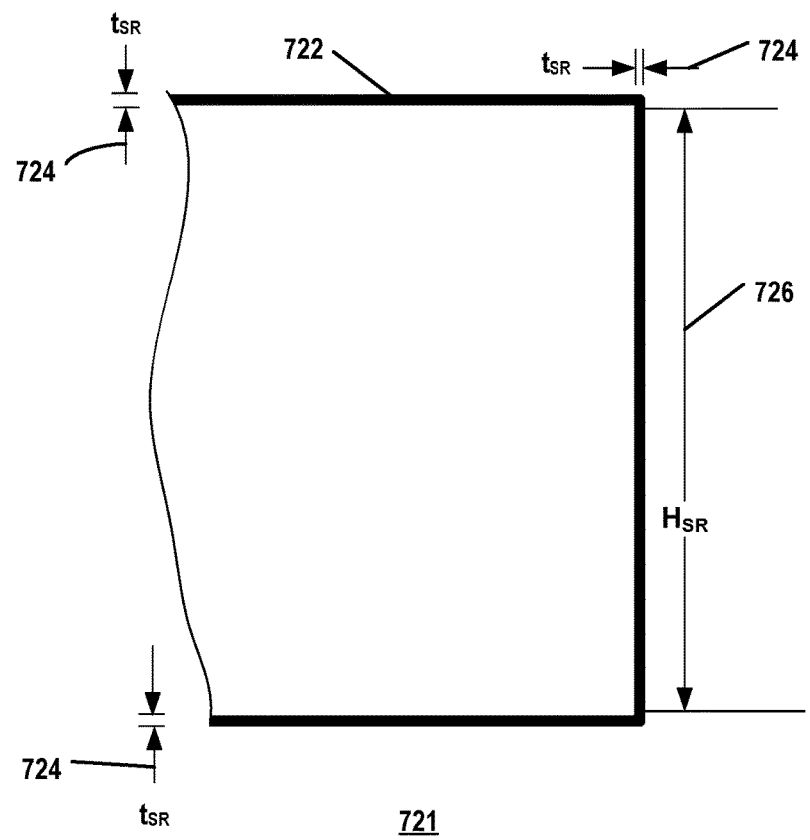
FIG. 7D is an illustration of a cross-sectional side view of a portion of one of the sulfur electrode material reservoirs.

FIG. 7D is an illustration of a cross-sectional side view 721 of a portion of one of the sulfur electrode material reservoirs 606. For the example, the containers 722 of the sulfur electrode material reservoirs 606 are ductile cast iron or relatively low-cost metal or metal alloy capable of operating at the temperatures required for the battery and are coated with an inert coating. The sulfur electrode material reservoirs 606 have a wall thickness ($t_{SR}$) 724 of 100 µm and an inert coating thickness of 500 nm. The internal height ($H_{SR}$) 726 of the sulfur electrode material reservoir is 644.65 µm for the example. The inert coating protects the sulfur electrode material reservoirs 606 from reactions with the positive electrode material. Suitable inert coatings include magnesium oxide (MgO), titanium oxide ($TiO_2$), boron nitride (BN), calcium oxide (CaO), tantalum(III) oxide ($Ta_2O_3$), samarium (III) oxide ($Sa_2O_3$), lithium oxide ($Li_2O$), beryllium oxide (BeO), terbium(III) oxide ($Tb_2O_3$), dysprosium (III) oxide ($Dy_2O_3$), thorium dioxide ($ThO_2$), gadolinium(III) oxide ($Gd_2O_3$), erbium(III) oxide ($Er_2O_3$), yttrium(III) oxide ($Y_2O_3$), lithium chloride (LiCl), holmium (III) oxide ($Ho_2O_3$), neodymium(III) oxide ($Nd_2O_3$), ytterbium(III) oxide ($Yb_2O_3$), lanthanum(III) oxide ($La_2O_3$), praseodymium(III) oxide ($Pr_2O_3$), lithium fluoride (LiF), lutetium(III) oxide ($Lu_2O_3$), scandium(III) oxide ($Sc_2O_3$), thulium (III) oxide ($Tm_2O_3$), samarium(III) oxide ($Sm_2O_3$), cerium(III) oxide ($Ce_2O_3$), and mendelevium(III) oxide ($Md_2O_3$). Other potential inert coating that may be suitable include barium oxide (BaO), strontium oxide (SrO), magnesium fluoride ($MgF_2$), cerium(IV) oxide ($CeO_2$), uranium (IV) oxide ($UO_2$), europium (II) oxide (EuO), zirconium dioxide ($ZrO_2$), sodium fluoride (NaF), europium(III) oxide ($Eu_2O_3$), chrysoberyl ($BeAl_2O_4$), calcium silicate ($Ca_2SiO_4$), hafnium(IV) oxide ($HfO_2$), calcium titanate ($CaTiO_3$), $Ca_2Al_2Si_{O7}$, magnesium aluminate ($MgAl_2O_4$), kalsilite ($KAlSiO_4$), magnesium metasilicate ($MgSiO_3$), $CaMg(SiO_4)_2$, $Ca_3MgSi_2O_7$, Merwinite ($Ca_3Mg(SiO_4)_2$), calcium silicate ($CaSiO_3$). Yet, other potential inert coating that may be suitable include molybdenum, molybdenum alloys such as Mo-0.5Ti-0.08Zr (TZM), various metal oxides such as alumina ($Al_2O_3$), silica ($SiO_2$), potassium oxide ($K_2O$), and boron trioxide ($B_2O_3$) and proprietary materials such as Corning Inc.'s Macor product. Note that different coating thicknesses may be required for the various coating materials. For instance, a 1 µm coating of molybdenum could be required to protect the sulfur electrode material reservoir wall from long term corrosion where only 500 nm of magnesium oxide (MgO) may be required to provide the same level of corrosion protection.

An improvement in safety associated with lithium electrode material reservoir housing 518, the reaction chamber housing 520, the sulfur electrode material reservoir housing 522, and the battery housing 524 is possible through the addition of protective coatings to the interior portion of these housings.

For example, the interior portion of the lithium electrode material reservoir housing 518 can be coated with an inert coating that will protect the lithium electrode material reservoir housing 518 from reactions with the negative electrode material should a breach form within one of the lithium reservoirs or within one of the lithium electrode material distribution components. Suitable coating materials include the coating materials detailed earlier for the lithium electrode material reservoirs 602.

The interior portion of the reaction chamber housing 520 can be coated with inert coating that will protect the reaction chamber housing 520 from reactions with the negative and positive electrode materials should a breach form within one of the reaction chamber or within one of the lithium or sulfur electrode material distribution components. Suitable coating materials include magnesium oxide (MgO), boron nitride (BN), calcium oxide (CaO), tantalum(III) oxide ($Ta_2O_3$), samarium (III) oxide ($Sa_2O_3$), lithium oxide ($Li_2O$), beryllium oxide (BeO), terbium(III) oxide ($Tb_2O_3$), dysprosium (III) oxide ($Dy_2O_3$), thorium dioxide ($ThO_2$), gadolinium (III) oxide ($Gd_2O_3$), erbium(III) oxide ($Er_2O_3$), yttrium(III) oxide ($Y_2O_3$), lithium chloride (LiCl), holmium(III) oxide ($Ho_2O_3$), neodymium(III) oxide ($Nd_2O_3$), ytterbium(III) oxide ($Yb_2O_3$), lanthanum(III) oxide ($La_2O_3$), praseodymium(III) oxide ($Pr_2O_3$), lithium fluoride (LiF), lutetium(III) oxide ($Lu_2O_3$), scandium(III) oxide ($Sc_2O_3$), thulium (III) oxide ($Tm_2O_3$), samarium(III) oxide ($Sm_2O_3$), cerium(III) oxide ($Ce_2O_3$), and mendelevium(III) oxide ($Md_2O_3$). Other potential inert coating that may be suitable include barium oxide (BaO), strontium oxide (SrO), magnesium fluoride ($MgF_2$), cerium(IV) oxide ($CeO_2$), uranium(IV) oxide ($UO_2$), europium (II) oxide (EuO), zirconium dioxide ($ZrO_2$), sodium fluoride (NaF), europium(III) oxide ($Eu_2O_3$), chrysoberyl ($BeAl_2O_4$), calcium silicate ($Ca_2SiO_4$), hafnium(IV) oxide ($HfO_2$), calcium titanate ($CaTiO_3$), $Ca_2Al_2SiO_7$, magnesium aluminate ($MgAl_2O_4$), kalsilite ($KAlSiO_4$), magnesium metasilicate ($MgSiO_3$), $CaMg(SiO_4)_2$, $Ca_3MgSi_2O_7$, Merwinite ($Ca_3Mg(SiO_4)_2$), calcium silicate ($CaSiO_3$). Yet, other potential inert coating that may be suitable include molybdenum, molybdenum alloys such as Mo-0.5Ti-0.08Zr (TZM).

The interior portion of the sulfur electrode material reservoir housing 522 can be coated with inert coating that will protect the sulfur electrode material reservoir housing 522 from reactions with the positive electrode material should a breach form within one of the sulfur electrode material reservoirs or within one of the sulfur electrode material distribution components. Suitable coating materials include the coating materials detailed earlier for the sulfur electrode material reservoirs 606.

The interior portion of the battery housing 524 can be coated with an inert coating that will protect the battery housing 524 from reactions with the negative and positive electrode materials should a breach form within one of the lithium or sulfur electrode material distribution components or other breaches form within the components that are located within the battery housing 524. Suitable coating materials include the coating materials detailed earlier for the reaction chamber housing 520.

For the example, the walls of the lithium electrode material reservoir housing 518, the reaction chamber housing 520, the sulfur electrode material reservoir housing 522, and the battery housing 524 are 500 μm of aluminum with coating thicknesses ranging from 500 nm to 2.5 μm depending upon the material of the coating. Other reservoir and reaction chamber dimensions and thicknesses can be used. Other coatings and combinations of coatings can also be used depending on the particular situation.

Figure 8:
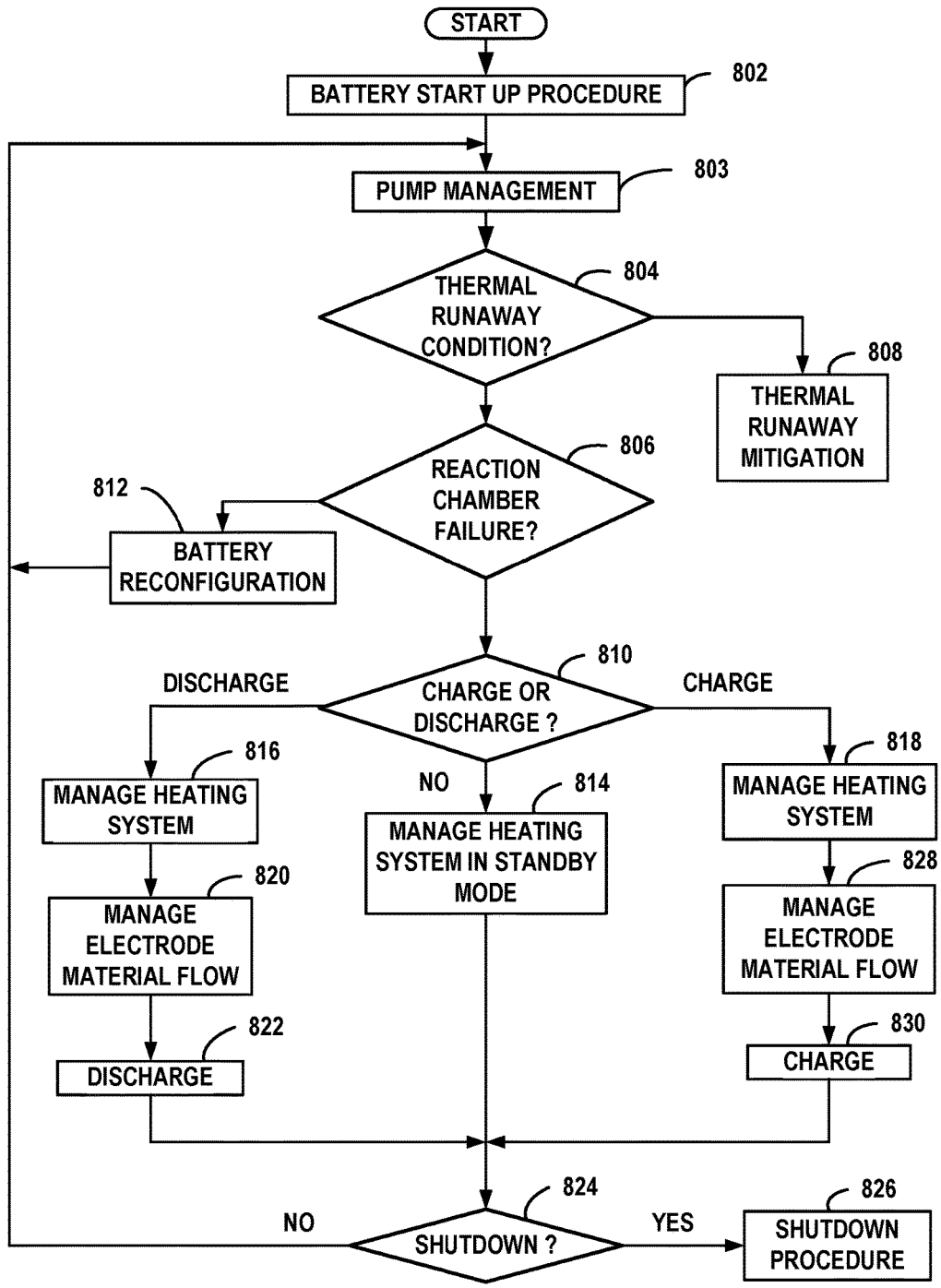
FIG. 8 is a flowchart of an example of a method of managing a multiple cell battery system.

FIG. 8 is a flowchart of an example of a method of managing a multiple cell battery system. Although the method can be performed with other battery systems, the example of FIG. 8 is performed in a multiple cell battery system with thermal cells having molten fluid electrodes such as the multiple cell battery systems discussed with reference to FIG. 4, FIG. 5, FIG. 6 and FIGS. 7A-D discussed above. The steps of FIG. 8 can be performed in a different order than shown and some steps may be combined into a single step. Additional steps may be performed and some steps may be omitted. Further, two or more steps can be performed simultaneously in some circumstances. For example, the charging and discharging steps are typically continuously and simultaneously performed with the steps for managing the battery system in the respective states.

At step 802, a battery start-up procedure is performed. The battery startup procedure places the components in the appropriate state to prepare the battery system for operation.

At step 803, the pumps are managed. For the examples herein, the speed of the pumps within the positive electrode material distribution system is variable and can be adjusted based on conditions. Use of variable speed pumps may improve efficiency of the battery system.

At step 804, it is determined whether a thermal runaway condition exists. The controller monitors information provided by any combination of information from internal sensors, external sensors, and calculated parameters as well as data or signals provided by other systems to determine if the battery system is in a thermal runaway event or if conditions indicate that a thermal runaway event is possible. If no thermal runaway condition exists, the method continues at step 806. Otherwise, the method continues at step 808 where a thermal runaway mitigation procedure is performed.

The thermal runaway procedure cools at least some portions of the battery to freeze at least some of the molten fluid electrode material in the battery system. Suitable examples of methods for performing steps 804 and 808 are discussed in the referenced US patent application entitled "DEVICES, SYSTEMS, AND METHODS TO MITIGATE THERMAL RUNAWAY CONDITIONS IN MOLTEN FLUID ELECTRODE APPARATUS".

At step 806, it is determined whether any reaction chamber is exhibiting poor performance and should be replaced. The controller monitors one or more parameters to determine if the performance of any reaction chamber is below a threshold. In one example, the controller monitors the voltage and determines if the voltage drops below a minimum voltage threshold. Examples of other parameters that can be monitored to determine whether a battery reconfiguration procedure is necessary include temperature, electrical impedance, and flow of molten electrode through a reaction chamber. If no replacement is necessary, the method continues at step 810. Otherwise, a battery reconfiguration procedure is performed at step 812.

At step 812, the battery system is reconfigured to replace a poor performing or failed reaction chamber. In some situations, a redundant reaction chamber is continuously heated during operation of the battery so that it can immediately replace another reaction chamber. In other situations, a redundant reaction chamber is heated when it is determined a currently active reaction chamber has failed, is likely to fail, or will likely need to be replaced. When the redundant reaction chamber is at the operating temperature, the controller disconnects the active chamber to be replaced and connects the redundant reaction chamber. In one example, reservoirs are first disconnected from the active reaction chamber to be replaced and connected to the redundant reaction chamber before the redundant reaction chamber is electrically connected in the battery system. In another example, the redundant reaction chamber is connected to a redundant set of reservoirs and is electrically connected to the battery without a need to divert electrode material from reservoirs used by the replaced reaction chamber.

At step 810, it is determined whether the battery system is in a discharge state, charge state, or standby state. In one example, the controller determines the state of the battery based on the level and direction of current through the battery system. In some situations, there may be a small current draw from the battery system in the standby state. Such a situation may occur where the battery system is used to power electronics in the battery system or to charge power supplies used by the electronics, but no external load is present. If the current indicates there is a load on the battery system, it is determined whether the current is below a threshold. If there is current draw below the threshold, it is determined that the battery is in standby state or mode. If the battery system is not charging or discharging, the heating system is managed in a standby state at step 814. If the battery system is discharging, the method continues at step 816. If it is determined that the battery system is charging, the method continues at step 818. For the example, the controller may place the battery system in the standby mode from the charge state or the discharge state based on the charge level of the battery system. When the battery is discharging and is near or has reached a fully discharge state, the controller may determine that the battery system should be in the standby state and may disconnect the battery system from the load. As described below, the battery system is also shut down when the battery system is fully discharged and is not being charged. The controller may also place the battery in the standby state when it is charging and is fully charged.

At step 816, the heating system is managed in the discharge state. The controller controls the portions of the heating system to maintain the reaction chambers and the electrode material distribution system at the appropriate operating temperature and to heat selected reservoirs. The lithium electrode material reservoirs are heated such that a minimum amount of lithium electrode material is in the fluid state while ensuring that a sufficient volume of fluid lithium electrode material is available to the reaction chambers. The sulfur electrode material reservoirs are heated such that a minimum amount of sulfur electrode material is in the fluid state while ensuring that a sufficient volume of fluid sulfur electrode material with sufficiently low concentrations of the negative electrode material within the positive electrode material is available to the reaction chambers.

At step 820, the electrode material flow is managed in the discharge state. The controller controls the electrode material distribution system to direct fluid electrode material from the appropriate reservoirs to the reaction chambers. The controller opens and closes valves at least partially based on information provided by sensors. New lithium electrode material reservoirs are connected to reaction chambers and currently active lithium electrode material reservoirs are disconnected from reaction chambers when lithium electrode material is depleted from the currently active lithium electrode material reservoirs. New sulfur electrode material reservoirs are connected to reaction chambers and currently active sulfur electrode material reservoirs are disconnected from reaction chambers when the sulfur electrode material in the currently active sulfur electrode material reservoirs reaches a desired positive electrode material reaction product composition such as molten di-lithium di-sulfide ($Li_2S_2$) or some ratio of molten di-lithium di-sulfide ($Li_2S_2$) and solid lithium sulfide ($Li_2S$). As discussed below with reference to FIG. 11, steps 816 and 820 are performed simultaneously for the examples herein.

At step 822, the battery system continues to discharge. As mentioned above, the discharge step is typically simultaneously occurring with other steps of the method during the discharge state.

At step 824, it is determined whether the battery system should be shut down (i.e., turned off). The controller determines whether an on-off indicator indicates that the battery system should be on or off. Such an indicator, for example, may be the state of an on-off switch or a signal provided by the system powered by the battery system. The shutdown determination is also based on whether the battery is completely discharged. For the example, the controller determines that the battery system should be shut down when the battery is fully discharged and is not charging even when the on-off indicator is set to "on". If the battery system is in the charging state and is fully charged, for the example, the controller determines the battery system should be shut down only if the on-off indictor is set to off. In some situations, however, the controller may evaluate other conditions to determine if the battery system is fully charged. For example, if the battery has reached the standby state because it is fully charged and is not discharging, the controller may shutdown the battery after the battery has been inactive for predetermined maximum time period. The shutdown determination may also be based on other factors. If it is determined that the battery system should be turned off, the method continues at step 826. Otherwise, the method returns to step 803 where monitoring and management of the battery system continues.

At step 826, the battery system shutdown procedure is performed. The controller manages the heating system and electrode material distribution system to systematically cool the reservoirs and reaction chambers to place the battery system in an off state. For the examples herein, the controller monitors the on-off indicator in the off state to determine whether the battery system should be turned on. An auxiliary power supply may provide power to the controller in the off state. In some situations, the battery system does not monitor the on-off indicator and the battery startup procedure is triggered by a change in on-off indicator.

If it is determined that the battery system is in standby mode at step 810, the heating system is managed in the standby state at step 814. At step 814, reaction chambers, electrode material distribution system, and selected reservoirs are maintained at the operating temperature of the battery system. For the example, the electrode material distribution is inactive in the standby mode. The method proceeds to step 824.

If it is determined that the battery system is in the charge state at step 810, the heating system is managed in the charge state at step 818. At step 818, the controller controls the portions of the heating system to maintain the reaction chambers and electrode material distribution system at the appropriate operating temperature and to heat selected reservoirs. The lithium electrode material reservoirs are heated such that fluid lithium electrode material can be directed to the heated reservoirs from the reaction chamber as lithium is produced in the negative electrode region of the reaction chamber during the charging cycle. As a lithium electrode material reservoir nears full capacity, a standby lithium reservoir is heated so it is prepared to accept lithium electrode material. The standby lithium reservoir is empty or at least has available capacity to accept additional lithium electrode material. The sulfur electrode material reservoirs are heated such that a standby sulfur electrode material reservoir is heated to the operating temperature when the sulfur electrode material in the currently active sulfur electrode material reservoir has reached a desired positive electrode material reaction product composition such as molten sulfur ($S_8$, $S_6$, or other sulfur species) or some ratio of molten sulfur ($S_8$, $S_6$, or other sulfur species) to di-lithium polysulfide ($LizS_m$) species.

At step 828, the electrode material flow is managed in the charging state. The controller controls the electrode material distribution system to direct fluid electrode material from the appropriate reservoirs to the reaction chambers. The controller opens and closes values at least partially based on information provided by sensors. Standby lithium electrode material reservoirs are connected to reaction chambers and currently active lithium electrode material reservoirs are disconnected from reaction chambers when the volume of lithium electrode material in the currently active lithium electrode material reservoirs has reached a sufficiently high level. The standby lithium electrode material reservoirs are empty or at least have capacity to accept lithium electrode material. Standby sulfur electrode material reservoirs are connected to reaction chambers and currently active sulfur electrode material reservoirs are disconnected from reaction chambers when the sulfur electrode material in the currently active sulfur electrode material reservoirs reaches a desired positive electrode material reaction product composition such as molten sulfur ($S_8$, $S_6$, or other sulfur species) or some ratio of molten sulfur ($S_8$, $S_6$, or other sulfur species) to di-lithium polysulfide ($Li_2S_m$) species. The method continues at step 824.

Therefore, as discussed herein, a standby lithium electrode material reservoir during the discharge state is a lithium electrode material reservoir that contains lithium electrode material that will be directed to the reaction chamber but is not yet the active lithium electrode material reservoir. A standby lithium electrode material reservoir during the charge state, however, is a lithium electrode material reservoir that is empty or at least has capacity to accept lithium electrode material from the reaction chamber. A standby sulfur electrode material reservoir during the discharge state is a sulfur electrode material reservoir that contains sulfur electrode material with sufficiently low concentrations of the negative electrode material within the positive electrode material and at a relatively low volume. A standby sulfur electrode material reservoir during the charge state is a sulfur electrode material reservoir that contains sulfur electrode material with higher concentrations of the negative electrode material within the positive electrode material and at a relatively higher volume since it was used during the discharge state.

Figure 9:
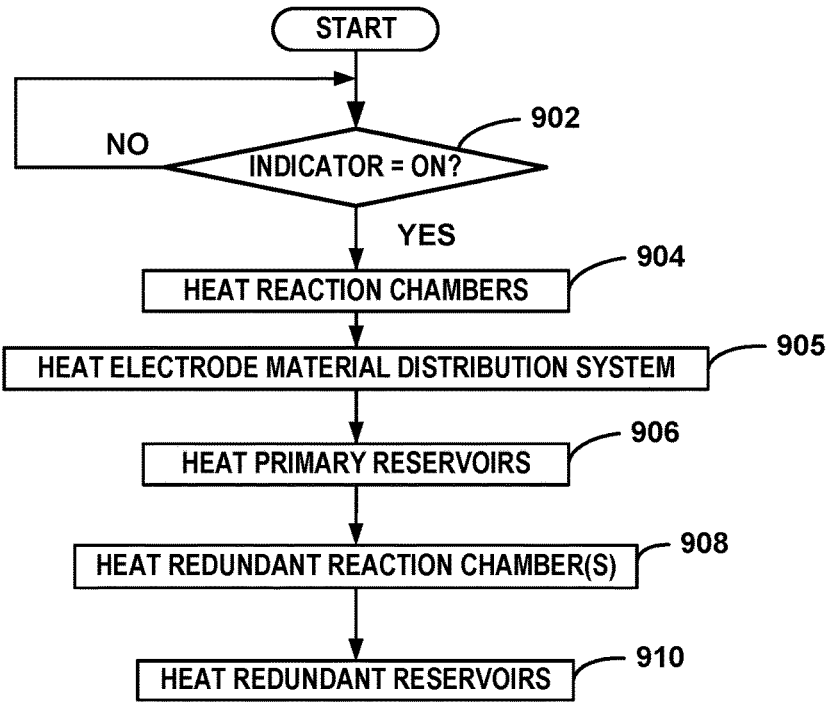
FIG. 9 is a flowchart of an example of method of performing a battery startup procedure.

FIG. 9 is a flowchart of an example of a method of performing a battery startup procedure. The method of FIG. 9, therefore, is an example of a method for performing step 802 in FIG. 8.

At step 902, it is determined whether the on-off indicator is set to "on". In some situations, the on-off indicator may be a setting of a switch. For example, a user selected external switch may be open to indicate an "off" setting or may be closed to indicate an "on" setting. In other situations, the on-off indicator may be a signal provided by an external system. Where the battery system is installed in an electric vehicle, for example, the vehicle system can provide an indicator signal that indicates whether the battery system should remain on or be turned off. If it is determined that the indicator does not indicate an "on" setting, the method continues to step 902 to continue monitoring the indicator. If the setting is "on" the method proceeds to step 904 where the primary reaction chambers are heated to the operating temperature. The controller sends the appropriate signals to the heating system to heat the primary reaction chambers. Where the battery system includes redundant reaction chambers, only the primary reaction chambers are heated at step 904 for the example. As discussed above, an example of a suitable operating temperature of a battery system with negative electrodes comprising lithium and positive electrodes comprising sulfur is 400° C.

At step 905, the electrode material distribution system is heated to the operating temperature. The controller provides control signals to the heating system to activate the selected heating system portions or elements.

At step 906, the primary reservoirs are heated. The primary active lithium electrode material reservoirs and the primary active sulfur electrode material reservoirs are heated to the operating temperature. The controller provides control signals to the heating system to activate the selected heating system portions or elements.

At step 908, redundant reaction chambers are heated to the operating temperature. In systems that include redundant reaction chambers, the redundant reaction chambers are heated after the primary reaction chambers and primary reservoirs are heated. The controller provides control signals to the heating system to activate the selected heating system portions or elements.

At step, 910, the redundant reservoirs are heated to the operating temperature. In systems that include redundant reservoirs, the redundant reservoirs are heated after the primary reaction chambers, primary reservoirs, and redundant reaction chambers are heated. The controller provides control signals to the heating system to activate the selected heating system portions or elements. In battery systems that do not include redundant reaction chambers or reservoirs or in battery systems that only heat the redundant reaction chambers or reservoirs when a fault or anticipated fault in the primary reaction chamber occurs, steps 908 and 910 can be omitted.

Figure 10:
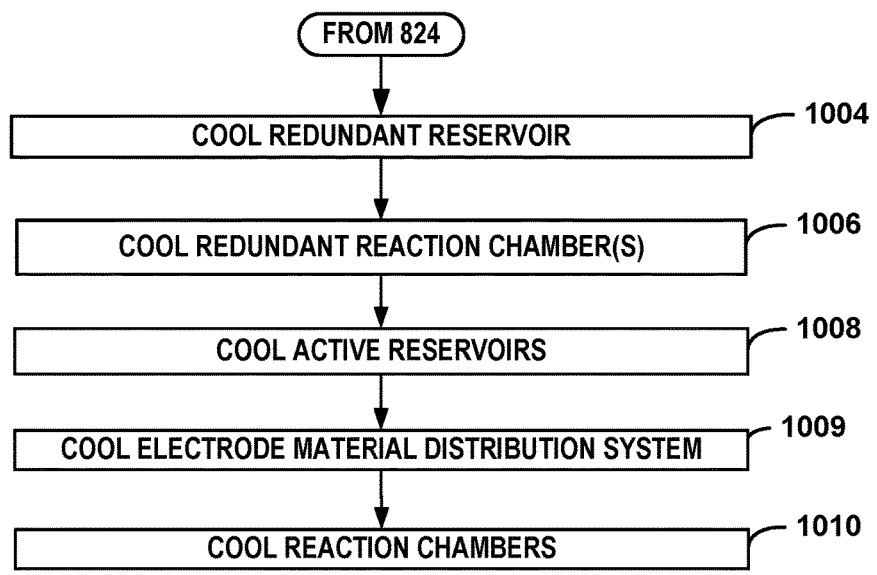
FIG. 10 is a flowchart of an example of method of performing a battery shutdown procedure.

FIG. 10 is a flowchart of an example of a method of performing a battery shutdown procedure. The method of FIG. 10, therefore, is an example of a method for performing step 826 of FIG. 8.

At step 1004, the redundant reservoirs are cooled. In one example, the redundant reservoirs cease to be heated and allowed to cool to the ambient temperature. In some situations, the redundant reservoirs are cooled to a temperature below the ambient temperature in the interest of increased safety but at the cost of efficiency since energy is used to cool the redundant reservoirs below the ambient temperature. In systems that include redundant reservoirs, the redundant reservoirs are cooled before the primary reaction chambers, primary reservoirs and redundant reaction chambers are cooled. The controller provides control signals to the heating system to deactivate the selected heating system portions or elements to allow the redundant reservoirs to cool. Where the redundant reservoirs are cooled below the ambient temperature, the controller may manage cooling elements such as conduits or channels with cooled heat transfer fluid to cool the reservoirs.

At step 1006, redundant reaction chambers are cooled to ambient temperature. In systems that include redundant reaction chambers, the redundant reaction chambers are cooled before the primary reaction chambers and primary reservoirs are cooled during the shutdown procedure example. The controller provides control signals to the heating system to deactivate the selected heating system portions or elements to allow any redundant reaction chamber to cool. In battery systems that do not include redundant reaction chambers or reservoirs or in battery systems that only heat the redundant reaction chambers or reservoirs when a fault or anticipated fault in the primary reaction chamber occurs, steps 1004 and 1006 can be omitted.

At step 1008, active reservoirs are cooled to ambient temperature. The controller sends the appropriate signals to the heating system to deactivate the heating portions of the reservoirs to allow the reservoirs to cool. In some situations, the active reservoirs can be cooled to a temperature below the ambient temperature.

At step 1009, the electrode material distribution system is cooled to ambient temperature. The controller sends the appropriate signals to the heating system to deactivate the heating portions of the electrode material distribution system to allow the electrode material distribution system to cool. In some situations, the electrode material distribution system can be cooled to a temperature below the ambient temperature.

At step 1010, the primary reaction chambers are cooled to ambient temperature. In systems that include redundant reaction chambers and redundant reservoirs, the primary reaction chambers are cooled after the redundant reaction chambers, redundant reservoirs and primary reservoirs are cooled. The controller provides control signals to the heating system to deactivate the selected heating system portions or elements to allow the reaction chambers to cool. In some situations, the primary reaction chambers can be cooled to a temperature below the ambient temperature.

Figure 11:
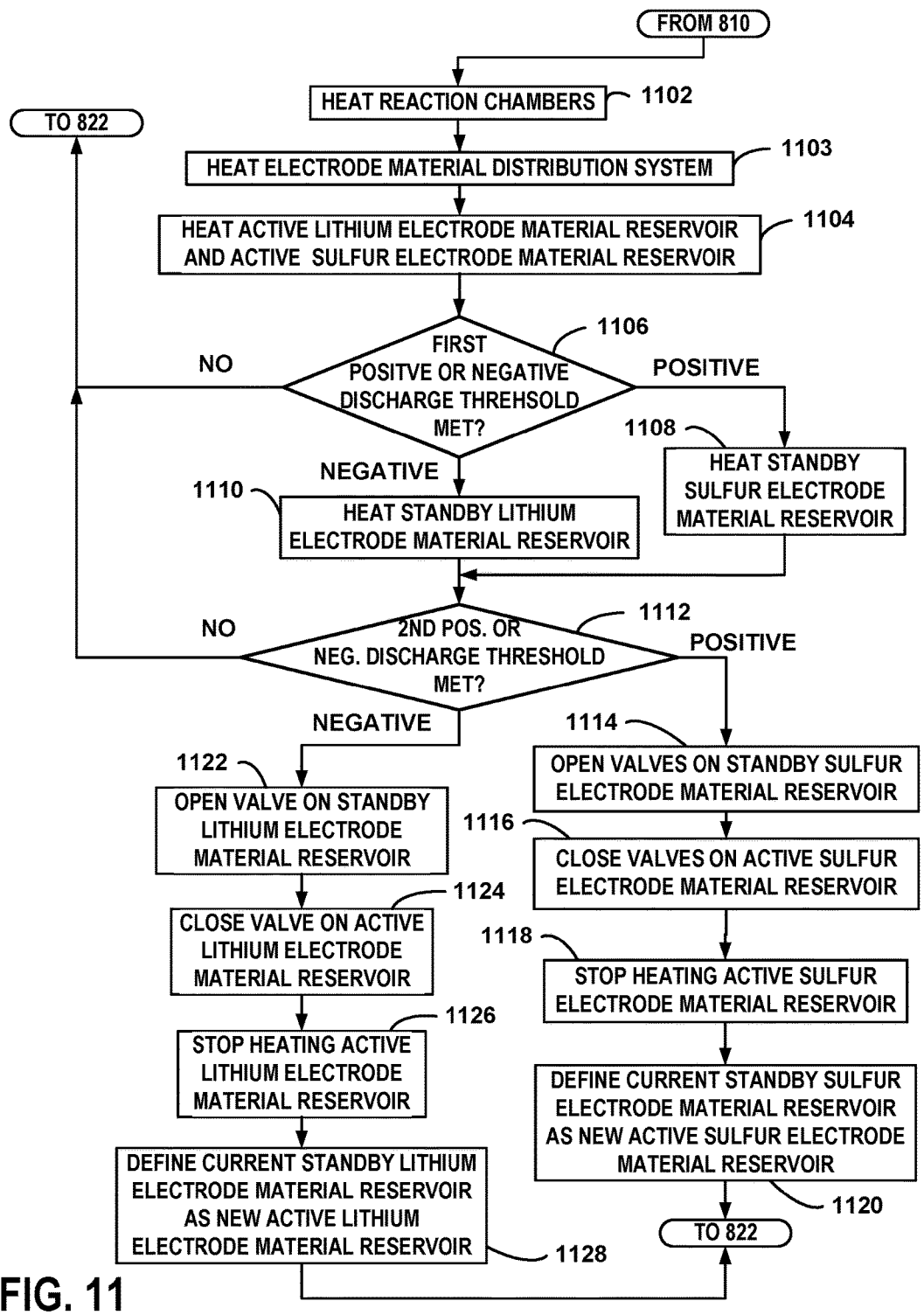
FIG. 11 is a flowchart of an example of a method of managing the electrode material flow and the heating system during discharge of the battery system.

FIG. 11 is a flowchart of an example of a method of managing the heating system and the electrode material distribution system during discharge of the battery system. The method of FIG. 11, therefore, is an example of a method of performing step 816 and step 820 of FIG. 8.

At step 1102, the operating temperature of the reaction chambers is maintained. The controller provides control signals to the heating system to manage the reaction chamber portions of the heating system to keep the reaction chambers at the operating temperature.

At step 1103, the operating temperature of the electrode material distribution system is maintained. The controller provides control signals to the heating system to manage the electrode material distribution system portion of the heating system to keep the electrode material distribution system at the operating temperature.

At step 1104, active lithium electrode material reservoirs and the active sulfur electrode material reservoirs are maintained at the operating temperature. The controller controls the reservoir portions of the heating system for the active reservoirs to heat the reservoirs.

At step 1106, it is determined whether the first positive discharge threshold or the first negative discharge threshold has been met. For the example, the controller monitors at least one parameter for each reservoir indicating the levels of electrode material in the active sulfur electrode material reservoirs and levels of lithium electrode material in the active lithium electrode material reservoirs. As discussed above, sensors indicating capacitance can be used to determine levels in the sulfur electrode material reservoirs and sensors indicating resistance or conductivity can be used to determine levels in the lithium electrode material reservoirs. Other sensors, parameters, and techniques can be used to determine if the first thresholds are met. If the first positive discharge threshold is met for any of the first sulfur electrode material reservoirs, the method continues at the step 1108. If the first negative discharge threshold is met for any of the first lithium electrode material reservoirs, the method continues at the step 1110. If neither the first positive discharge threshold nor the first negative discharge threshold is met, the method continues to monitor and manage the system in accordance with the method discussed with reference to FIG. 8 and the method returns to step 822.

At step 1108, a standby sulfur electrode material reservoir is heated for each reaction chamber where the active sulfur electrode material reservoir has met the first positive threshold. The controller provides control signals to the heating system to heat the standby sulfur electrode material reservoirs to operating temperature.

At step 1110, a standby lithium electrode material reservoir is heated for each reaction chamber where the active lithium electrode material reservoir has met the first negative threshold. The controller provides control signals to the heating system to heat the standby lithium electrode material reservoirs to operating temperature.

After step 1108 or 1110 is performed, the method continues at step 1112 where it is determined whether the second positive discharge threshold or second negative discharge threshold is met. For the example, the controller monitors at least one parameter for each reservoir indicating the levels of electrode material in the active sulfur electrode material reservoirs and levels of lithium electrode material in the lithium electrode material reservoirs. As discussed above, sensors indicating capacitance can be used to determine levels in the sulfur electrode material reservoirs and sensors indicating resistance or conductivity can be used to determine levels in the lithium electrode material reservoirs. Other sensors, parameters, and techniques can be used to determine if the second thresholds are met. If neither second discharge threshold has been met, the method returns to step 822 and management of the battery system continues in accordance with the method discussed with reference to FIG. 8. If the second positive discharge threshold is met for any of the active sulfur electrode material reservoirs, the method continues at the step 1114. If the second negative discharge threshold is met for any of the active lithium electrode material reservoirs, the method continues at the step 1122.

After it is determined that the second positive discharge threshold has been met for at least one reaction chamber at step 1112, the method continues at step 1114. At step 1114, the supply valve and the return valve are opened on a standby sulfur electrode material reservoir for each reaction chamber where the second negative discharge threshold was reached for the active sulfur electrode material reservoir. The controller provides control signals to the valves to open the valves.

At step 1116, the supply valve and the return valve are closed on the active sulfur electrode material reservoir for each reaction chamber where the second negative discharge threshold was reached for the active sulfur electrode material reservoir. The controller provides control signals to the valves to close the valves.

At step 1118, the active sulfur electrode material reservoir is no longer heated for each active sulfur electrode material reservoir where the second positive discharge threshold has been met. The controller provides control signals to the heating system to deactivate the reservoir portions for the active sulfur electrode material reservoirs where the second positive discharge threshold has been met.

At step 1120, the standby sulfur electrode material reservoir is defined as the active sulfur electrode material for each active sulfur electrode material reservoir where the second positive discharge threshold has been met and the active sulfur electrode material reservoir has been disconnected from the reaction chamber. Therefore, after the original active sulfur electrode material reservoir is no longer heated, the standby sulfur electrode material reservoir for the associated reaction chamber becomes the new active sulfur electrode material reservoir. The method then continues at step 822 to continue the discharging and management of the battery system. Steps 1114 and 1116 can be performed simultaneously in some situations. In other situations, step 1116 is performed immediately after step 1114. In yet other situations, a delay can be applied between step 1114 and 1116 such that the valves on both the active sulfur electrode material reservoir and the standby sulfur electrode material reservoir remain open for a period of time. Such a technique minimizes potential disruption of the flow of sulfur electrode material during the transition between sulfur electrode material reservoirs.

At step 1122, the valves on the standby lithium electrode material reservoirs are opened for each reaction chamber where the second negative discharge threshold was reached for the active lithium electrode material reservoir. The controller provides control signals to the appropriate valves to open each selected valve to allow lithium electrode material to flow to the reaction chambers where the level of lithium electrode material in the active lithium electrode material reservoir has reached the second negative discharge threshold.

At step 1124, the valves on the active lithium electrode material reservoirs are closed for each reaction chamber where the second negative discharge threshold was reached for the active lithium electrode material reservoir. The controller provides control signals to the appropriate valves to close each selected valve to stop lithium electrode material from flowing to the reaction chambers where the level of lithium electrode material in the active lithium electrode material reservoir has reached the second negative discharge threshold. Steps 1122 and 1124 can be performed simultaneously in some situations. In other situations, step 1124 is performed immediately after step 1122. In yet other situations, a delay can be applied between step 1122 and 1124 such that the valves on both the active lithium electrode material reservoir and the standby lithium electrode material reservoir remain open for a period of time. Such a technique minimizes potential disruption of the flow of lithium electrode material during the transition between lithium electrode material reservoirs.

At step 1126, the active lithium electrode material reservoir is no longer heated for each active lithium electrode material reservoir where the second negative discharge threshold has been met. The controller provides control signals to the heating system to deactivate the reservoir portions for the active lithium electrode material reservoirs where the second positive discharge threshold has been met.

At step 1128, the standby lithium electrode material reservoir is defined as the active lithium electrode material for each active lithium electrode material reservoir where the second negative discharge threshold has been met. Therefore, after the current active lithium electrode material reservoir is no longer heated, the standby lithium electrode material reservoir for the associated reaction chamber becomes the new active lithium electrode material reservoir. The method then continues at step 822 where the battery system continues the discharge and is managed in accordance with the method discussed with reference to FIG. 8.

Figure 12:
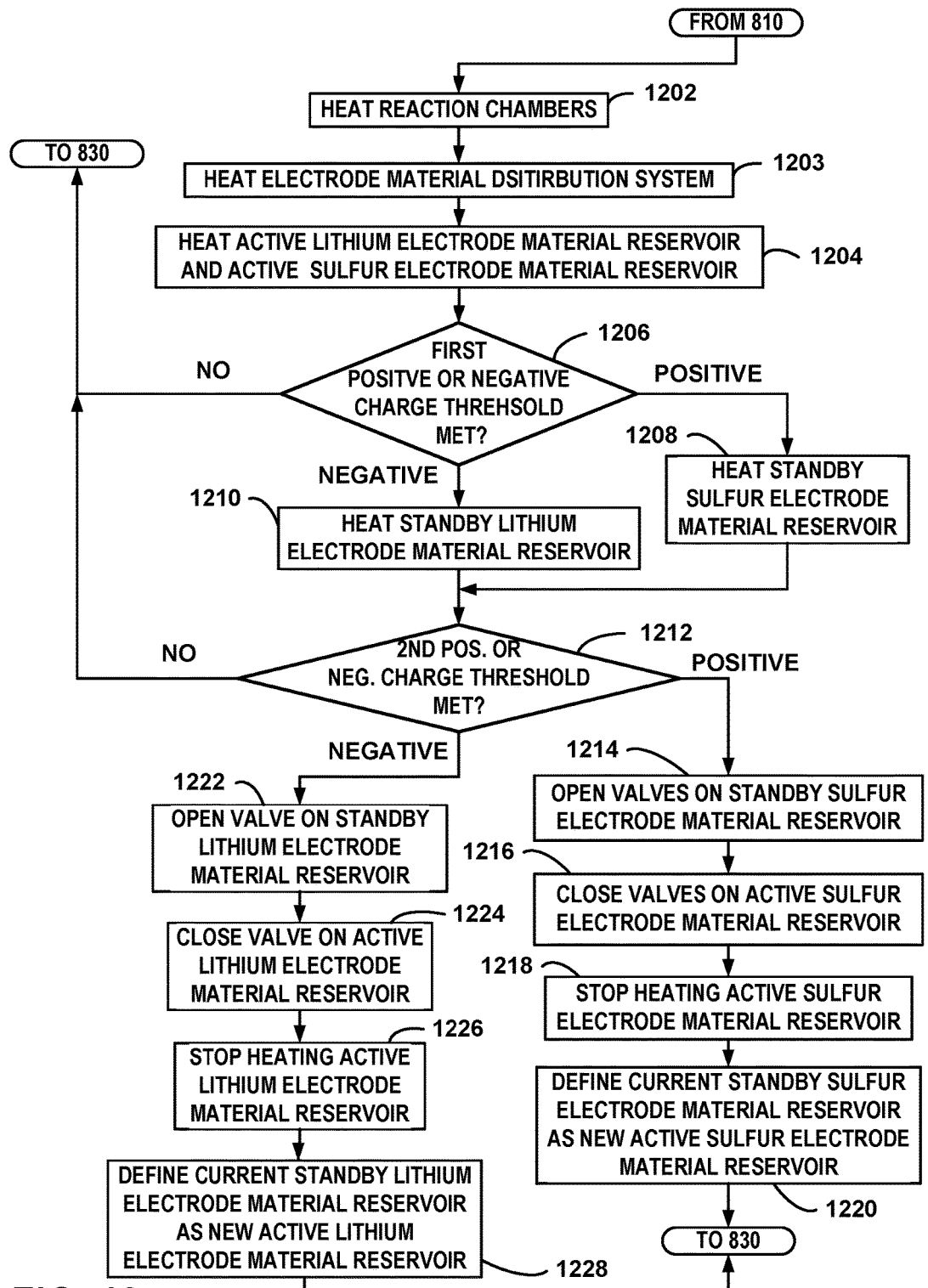
FIG. 12 is a flowchart of an example of a method of managing the electrode material flow and the heating system during charging of the battery system.

FIG. 12 is a flowchart of an example of a method of managing the heating system and the electrode material distribution system during charging of the battery system. The method of FIG. 12, therefore, is an example of a method of performing step 818 and step 828 of FIG. 8.

At step 1202, the operating temperature of the reaction chambers is maintained. The controller provides control signals to the heating system to manage the reaction chamber portions of the heating system to keep the reaction chambers at the operating temperature.

At step 1203, the operating temperature of the electrode material distribution system is maintained. The controller provides control signals to the heating system to manage the electrode material distribution system portion of the heating system to keep the electrode material distribution system at the operating temperature.

At step 1204, active lithium electrode material reservoirs and the active sulfur electrode material reservoirs are maintained at the operating temperature. The controller controls the reservoir portions of the heating system for the active reservoirs to heat the reservoirs.

At step 1206, it is determined whether the first positive charge threshold or the first negative charge threshold has been met. For the example, the controller monitors at least one parameter for each reservoir indicating the levels of electrode material in the active sulfur electrode material reservoirs and levels of lithium electrode material in the active lithium electrode material reservoirs. During the charging cycle, the active lithium electrode reservoirs are the reservoirs that are receiving lithium electrode material from the reaction chamber and are being refilled. The first negative charge threshold, therefore, is related to the volume of material in the active lithium electrode material reservoir. During the charging cycle, the active sulfur electrode reservoirs are the reservoirs that are circulating sulfur electrode material through the reaction chamber. As the positive electrode material circulates through the reaction chamber, the positive electrode material is depleted of lithium as the lithium cations pass through the solid electrolyte to the negative electrode region of the reaction chamber. The first positive charge threshold, therefore, is related to the volume of material in the active sulfur electrode material reservoir. As discussed above, sensors indicating capacitance can be used to determine levels in the sulfur electrode material reservoirs and sensors indicating resistance or conductivity can be used to determine levels in the lithium electrode material reservoirs. Other sensors, parameters, and techniques can be used to determine if the first thresholds are met. If neither the first positive charge threshold nor the first negative charge threshold is met, the method continues to monitor and manage the system in accordance with the method discussed with reference to FIG. 8 and the method returns to step 830. If the first positive charge threshold is met for any of the active sulfur electrode material reservoirs, the method continues at the step 1208. If the first negative charge threshold is met for any of the active lithium electrode material reservoirs, the method continues at the step 1210.

At step 1208, a standby sulfur electrode material reservoir is heated for each reaction chamber where the active sulfur electrode material reservoir has met the first positive charge threshold. The controller provides control signals to the heating system to heat the standby sulfur electrode material reservoirs to operating temperature. As discussed herein, the standby sulfur electrode material reservoir during the charge state is a sulfur electrode material reservoir that has increased volume due to additional lithium sulfide products produced during the discharge cycle.

At step 1210, a standby lithium electrode material reservoir is heated for each reaction chamber where the active lithium electrode material reservoir has met the first negative charge threshold. The controller provides control signals to the heating system to heat the standby lithium electrode material reservoirs to the operating temperature. The standby lithium electrode material reservoir in the charging process is a lithium electrode material reservoir that is empty or at least has capacity to accept additional lithium electrode material.

After step 1208 or 1210 is performed, the method continues at step 1212 where it is determined whether the second positive charge threshold or second negative charge threshold is met. For the example, the controller monitors at least one parameter for each reservoir indicating the levels of electrode material in the active sulfur electrode material reservoirs and levels of lithium electrode material in the active lithium electrode material reservoirs. As discussed above, sensors indicating capacitance can be used to determine levels in the sulfur electrode material reservoirs and sensors indicating resistance or conductivity can be used to determine levels in the lithium electrode material reservoirs. Other sensors, parameters, and techniques can be used to determine if the second thresholds are met. If neither second charge threshold has been met, the method returns to step 830 where management and monitoring of the battery system continues in accordance with the method discussed with reference to FIG. 8. If the second positive charge threshold is met for any of the active sulfur electrode material reservoirs, the method continues at the step 1214. If the second negative charge threshold is met for any of the active lithium electrode material reservoirs, the method continues at the step 1222.

At step 1214, the supply valve and the return valve are opened on a standby sulfur electrode material reservoir for each reaction chamber where the second negative charge threshold was reached for the active sulfur electrode material reservoir. The controller provides control signals to the valves to open the valves.

At step 1216, the supply valve and the return valve are closed on the active sulfur electrode material reservoir for each reaction chamber where the second negative charge threshold was reached for the active sulfur electrode material reservoir. The controller provides control signals to the valves to close the valves.

Steps 1214 and 1216 can be performed simultaneously in some situations. In other situations, step 1216 is performed immediately after step 1214. In yet other situations, a delay can be applied between step 1214 and 1216 such that the valves on both the active sulfur electrode material reservoir and the standby sulfur electrode material reservoir remain open for a period of time. Such a technique minimizes potential for disruption of the flow of sulfur electrode material during the transition between sulfur electrode material reservoirs.

At step 1218, the active sulfur electrode material reservoir is no longer heated for each active sulfur electrode material reservoir where the second positive charge threshold has been met. The controller provides control signals to the heating system to deactivate the reservoir portions for the active sulfur electrode material reservoirs where the second positive charge threshold has been met.

At step 1220, the standby sulfur electrode material reservoir is defined as the active sulfur electrode material for each active sulfur electrode material reservoir where the second positive charge threshold has been met. Therefore, after the current active sulfur electrode material reservoir is no longer heated, the standby sulfur electrode material reservoir for the associated reaction chamber becomes the new active sulfur electrode material reservoir. The method then returns to step 830 where the battery system is charged, monitored and managed in accordance with the method discussed with reference to FIG. 8.

At step 1222, the valves on the standby lithium electrode material reservoirs are opened for each reaction chamber where the second negative charge threshold was reached for the active lithium electrode material reservoir. The controller provides control signals to the appropriate valves to open each selected valve to allow lithium electrode material to flow to the reaction chambers where the level of lithium electrode material in the active lithium electrode material reservoir has reached the second negative charge threshold. During charging, the second negative charge threshold is associated with a higher volume of lithium electrode material in the lithium electrode material reservoir than the first negative charge threshold since the lithium electrode material reservoir is being filled during the charge cycle.

At step 1224, the valves on the active lithium electrode material reservoirs are closed for each reaction chamber where the second negative charge threshold was reached for the active lithium electrode material reservoir. The controller provides control signals to the appropriate valves to close each selected valve to stop lithium electrode material from flowing from the reaction chambers into the active lithium electrode material reservoirs where the level of lithium electrode material in the active lithium electrode material reservoir has reached the second negative charge threshold.

Steps 1222 and 1224 can be performed simultaneously in some situations. In other situations, step 1224 is performed immediately after step 1222. In yet other situations, a delay can be applied between step 1222 and 1224 such that the valves on both the active lithium electrode material reservoir and the standby lithium electrode material reservoir remain open for a period of time. Such a technique minimizes potential for disruption of the flow of lithium electrode material during the transition between lithium electrode material reservoirs.

At step 1226, the active lithium electrode material reservoir is no longer heated for each active lithium electrode material reservoir where the second negative charge threshold has been met. The controller provides control signals to the heating system to deactivate the reservoir portions for the active lithium electrode material reservoirs where the second positive charge threshold has been met.

At step 1228, the standby lithium electrode material reservoir is defined as the active lithium electrode material for each active lithium electrode material reservoir where the second negative charge threshold has been met. Therefore, after the current active lithium electrode material reservoir is no longer heated, the standby lithium electrode material reservoir for the associated reaction chamber becomes the new active lithium electrode material reservoir.

The method then returns to step 830 where the battery system is charged, monitored and managed in accordance with the method discussed with reference to FIG. 8.

Figure 13:
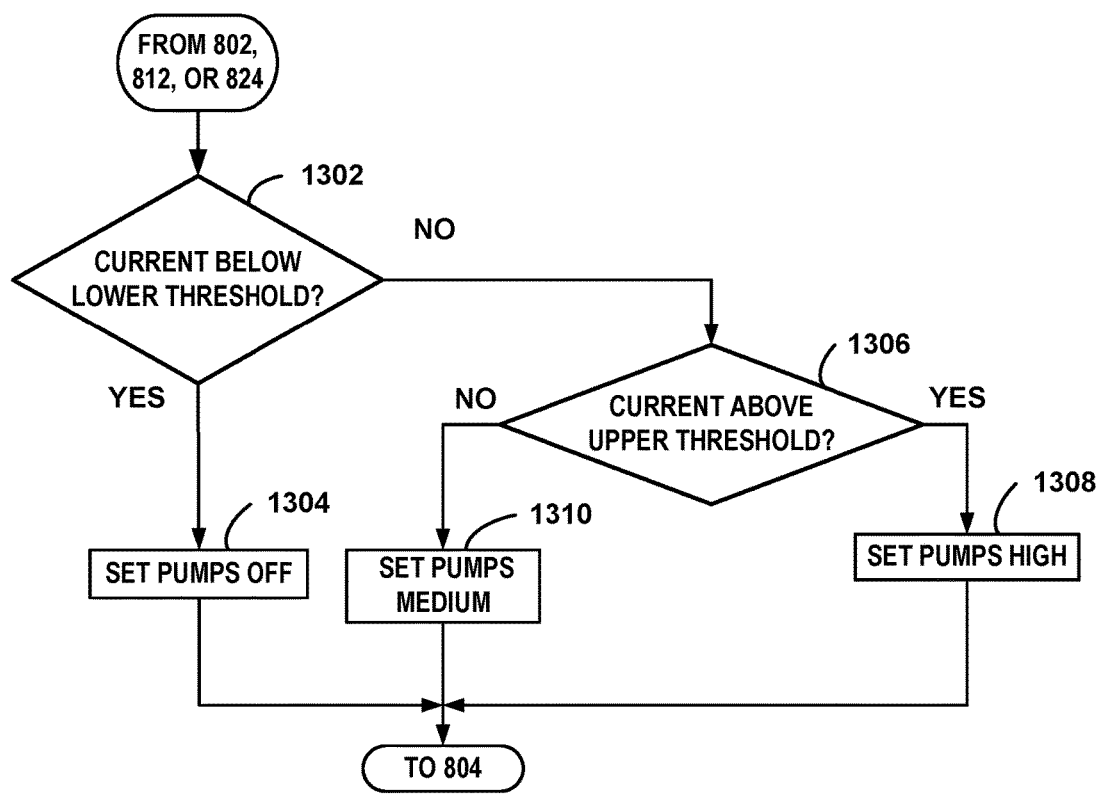
FIG. 13 is a flowchart of an example of a method of pump management in the battery system.

FIG. 13 is a flowchart of an example of a method of managing the pump within the electrode material distribution system. The method of FIG. 13, therefore, is an example of a method of performing step 803 of FIG. 8.

At step 1302, it is determined whether the current flow within the battery system is greater than a lower current threshold. The controller monitors sensors indicating current flow and compares the current flow to a lower threshold. If the current is below the lower threshold, the method proceeds to step 1304. If the current is not lower than the lower threshold, the method continues at step 1306.

At step 1306, it is determined whether the current flow within the battery system is greater than an upper current threshold. The controller monitors sensors indicating current flow and compares the current flow to the upper threshold. If the current is above the upper threshold, the method proceeds to step 1308. If the current is not above the upper threshold, the method continues at step 1310.

At step 1304, the pumps in the positive electrode material distribution system are turned off. The controller provides control signals to turn off the motor driving the supply pumps and the return pumps to deactivate the pumps.

At step 1308, the pumps in the positive electrode material distribution system are set to a maximum speed. The controller provides control signals to control the speed of the motor driving the supply pumps and the return pumps to set the speed of the pumps to "high".

At step 1310, the pumps in the positive electrode material distribution system are set to an intermediate speed. The controller provides control signals to control the speed of the motor driving the supply pumps and the return pumps to set the speed of the pumps to "medium".

When the discharge current is below the lower threshold during discharge, therefore, the rate of production of solid lithium sulfide products ($Li_2S$) is sufficiently low such that the pumps can be turned off. The production of solid $Li_2S$ is unlikely to inhibit reactions in the reaction chambers and reduce battery system performance. When the discharge current is above the upper threshold, however, the rate of production of solid lithium sulfide products ($Li_2S$) is sufficiently high to warrant setting the pumps to a maximum speed. The increased production of solid $Li_2S$ when the discharge current is high is more likely to freeze the fluid electrode material, inhibit the flow of the positive electrode material through the reaction chambers, inhibit reactions in the reaction chamber, and reduce battery system performance. As a result, setting the pumps to high moves additional sulfur electrode material through the reaction chamber reducing the concentration of lithium sulfide products ($Li_2S$) and increasing the performance of the battery system. Where the discharge current from the battery system is between the lower current threshold and the upper current threshold, the medium setting provides adequate flow of sulfur electrode material through the reaction chamber without the unnecessarily setting the pumps to high. The thresholds are set to balance maximizing the efficiency of the battery system energy production with maximizing the efficiency of powering the pumps.

When the charge current is below the lower threshold during charging, the rate of decomposition of di-lithium polysulfide products ($Li_2S_n$) to higher level di-lithium polysulfide products ($Li_2S_{n+m}$ where m is a positive integer) or to sulfur species (i.e. $S_8$, $S_6$, etc.) is sufficiently low such that the pumps can be turned off. When the charge current is above the upper threshold, however, the rate of release of lithium cations from the di-lithium polysulfide products ($Li_2S_n$) is sufficiently high to warrant setting the pumps to a maximum speed in order to introduce electrode material with higher concentrations of di-lithium polysulfide products ($Li_2S_n$) into the reaction chamber. If more di-lithium polysulfide products ($Li_2S_n$) are not introduced under high current conditions, the di-lithium polysulfide products ($Li_2S_n$) could transition to sulfur species (i.e., $S_8$, $S_6$, $S_4$, etc.) before reaching the output port 264 of the reaction chamber that would lead to battery performance issues. As a result, setting the pumps to high moves additional di-lithium polysulfide products ($Li_2S_n$) electrode material through the reaction chamber reducing the concentration of the "fully charged" sulfur species (i.e., $S_8$, $S_6$, $S_4$, etc.) and increasing performance of the battery system during the charging cycle. Where the charge current from the battery system is between the lower current threshold and the upper current threshold, the medium setting provides adequate flow of di-lithium polysulfide products ($Li_2S_n$) electrode material through the reaction chamber without the unnecessarily setting the pumps to high. The thresholds are set to balance maximizing the efficiency of the battery system energy storage with maximizing the efficiency of powering the pumps.

The thresholds may be based on other parameters in addition to battery system current. For example, the thresholds may also be based on the level of sulfur electrode material within the sulfur electrode material reservoirs. Although the example of FIG. 13 includes three pump speeds (i.e., "off", "medium", and "high"), other pumps speeds can be used. In some situations, the pumps may be set either to "on" or "off". In other situations, more than three pumps speed settings can be used. In addition, the pumps speeds may have numerous potential settings such that the pump speed is variable. For example, the pump speed can be a function of the battery system current in some situations. Further, a variable pump may also be based on an algorithm output based on multiple parameters and factors. In one example, the variable speed of the pumps is controlled by a calculation based on the battery system current, total charge transferred to the sulfur positive electrode material in a reservoir, and the levels of sulfur electrode material in the sulfur electrode material reservoirs.

It should be understood that, depending on the example, certain acts or events of any of the methods described herein can be performed in a different sequence, may be added, merged, or left out altogether (e.g., not all described acts or events are necessary for the practice of the method). Moreover, in certain examples, acts or events may be performed concurrently, rather than sequentially or even reversed. In addition, while certain aspects of this disclosure are described as being performed by a single module or component for purposes of clarity, it should be understood that the functions described in this disclosure may be performed by any suitable combination of components.

Clearly, other embodiments and modifications of this invention will occur readily to those of ordinary skill in the art in view of these teachings. The above description is illustrative and not restrictive. This invention is to be limited only by the following claims, which include all such embodiments and modifications when viewed in conjunction with the above specification and accompanying drawings. The scope of the invention should, therefore, be determined not with reference to the above description, but instead should be determined with reference to the appended claims along with their full scope of equivalents.

What is claimed is:

1. An apparatus comprising:
   a plurality of negative electrode reservoirs configured to contain a negative electrode material;
   a plurality of positive electrode reservoirs configured to contain a positive electrode material;
   a heating system configured to heat negative electrode material within a selected negative electrode reservoir of the plurality of negative electrode reservoirs to maintain the negative electrode material contained in the selected negative electrode reservoir in a fluid state and configured to heat positive electrode material in a selected positive electrode reservoir to maintain the positive electrode material contained in the selected positive electrode reservoir in the fluid state while maintaining, in a non-fluid state, negative electrode material in a non-selected negative electrode reservoir and positive electrode material in a non-selected positive electrode reservoir;
   a reaction chamber comprising a solid electrolyte positioned in the reaction chamber to form a positive electrode region on a first side of the solid electrolyte and to form a negative electrode region on a second side of the solid electrolyte; and
   an electrode material distribution system configured to cycle fluid positive electrode material between the selected positive electrode reservoir and the positive electrode region and configured to transfer, during a discharge state of the apparatus, fluid negative electrode material from the selected negative electrode reservoir to the negative electrode region.

2. The apparatus of claim 1, wherein the negative electrode material comprises lithium (Li), the positive electrode material comprises sulfur (S), and the solid electrolyte comprises lithium (Li).

3. The apparatus of claim 2, wherein the solid electrolyte comprises lithium iodide (LiI).

4. The apparatus of claim 3, wherein the electrode material distribution system is further configured to transfer, during a charge state of the apparatus, fluid negative electrode material from the negative electrode region to the selected negative electrode reservoir.

5. The apparatus of claim 4, wherein the electrode material distribution system comprises a negative electrode material distribution system comprising a plurality of negative material distribution valves wherein each negative material distribution valve is connected between a negative electrode material reservoir of the plurality of electrode material reservoirs and the negative electrode region, the negative material distribution valves configured to be opened and closed such that a selected negative material distribution valve connected between the selected negative electrode material reservoir and the negative electrode region is open.

6. The apparatus of claim 5, wherein fluid negative electrode material flows from the selected negative electrode reservoir to the negative electrode region at least partially due to gravity during the discharge state of the apparatus.

7. The apparatus of claim 5, wherein the electrode material distribution system comprises a positive electrode material distribution system comprising:
a pump connected to the positive electrode region;
a plurality of positive material distribution valves comprising a positive material distribution valve connected to each of the plurality of positive electrode material reservoirs.

8. The apparatus of claim 5, wherein the electrode material distribution system comprises a positive electrode material distribution system comprising:
a supply pump connected to the positive electrode region;
a return pump connected to the positive electrode region;
a plurality of positive material distribution supply valves comprising a positive material distribution supply valve connected between each positive electrode material reservoir of the plurality of positive electrode material reservoirs and the supply pump;
a plurality of positive material distribution return valves comprising a positive material distribution return valve connected between each positive electrode material reservoir of the plurality of positive electrode material reservoirs and the return pump, wherein the plurality of positive material distribution supply valves and the plurality of positive material distribution return values are configured such that a selected positive material distribution supply valve connected between the selected positive electrode material reservoir and the supply pump is open and wherein a selected positive material distribution return valve connected between the selected positive electrode material reservoir and the return pump is open.

9. The apparatus of claim 8, further comprising:
a controller configured to:
cause the heating system to heat a standby negative electrode material reservoir to maintain negative electrode material within the standby negative electrode material reservoir in a fluid state;
open a standby negative material distribution valve between the standby negative electrode material reservoir and the negative electrode region;
close the selected negative material distribution valve; and
cause the heating system to stop heating the selected negative electrode material reservoir.

10. The apparatus of claim 9, wherein the controller is configured to:
cause the heating system to heat the standby negative electrode material reservoir in response to a first negative discharge threshold; and
in response to a second negative discharge threshold, to open the standby negative material distribution valve, close the selected negative material distribution valve, and cause the heating system to stop heating the selected negative electrode material reservoir.

11. The apparatus of claim 10, wherein the first negative discharge threshold is related to a first volume of negative electrode material in the selected negative electrode material reservoir and wherein the second negative discharge threshold is related to a second volume of negative electrode material in the selected negative electrode material reservoir.

12. The apparatus of claim 11, further comprising at least one current sensor providing current data to the controller, the controller configured to determine the volume of negative electrode material in the selected negative electrode material reservoir at least partially based on the current data.

13. The apparatus of claim 12, the controller configured to determine the volume of negative electrode material in the selected negative electrode material reservoir by integrating a current level produced by the reaction chamber over time to determine a total charge transferred through the reaction chamber, and correlating the total charge transferred to a volume of negative electrode material removed from the negative electrode material reservoir.

14. The apparatus of claim 8, further comprising:
a controller configured to:
cause the heating system to heat a standby positive electrode material reservoir to maintain positive electrode material within the standby positive electrode material reservoir in a fluid state;
open a standby positive material distribution supply valve between the standby positive electrode material reservoir and the positive electrode region;
open a standby positive material distribution return valve between the standby positive electrode material reservoir and the positive electrode region;
close the selected positive material distribution supply valve;
close the selected positive material distribution return valve; and
cause the heating system to stop heating the selected positive electrode material reservoir.

15. The apparatus of claim 14, wherein the controller is configured to:
cause the heating system to heat the standby positive electrode material reservoir in response to a first positive discharge threshold; and
in response to a second positive discharge threshold, to open the standby positive material distribution supply valve, to open the standby positive material distribution return valve, close the selected positive material distribution supply valve, close the selected positive material distribution return valve, and cause the heating system to stop heating the selected positive electrode material reservoir.

16. The apparatus of claim 15, wherein the first positive discharge threshold is related to a first volume of positive electrode material in the selected positive electrode material reservoir and wherein the second positive discharge threshold is related to a second volume of positive electrode material in the selected positive electrode material reservoir.

17. The apparatus of claim 16, further comprising at least one current sensor providing current data to the controller, the controller configured to determine the volume of positive electrode material in the selected negative electrode material reservoir at least partially based on the current data.

18. The apparatus of claim 17, the controller configured to determine the volume of positive electrode material in the selected positive electrode material reservoir by integrating a current level produced by the reaction chamber over time to determine a total charge transferred through the reaction chamber, and correlating the total charge transferred to a volume of positive electrode material removed from the negative electrode material reservoir.

19. The apparatus of claim 1, further comprising:
a negative electrode material reservoir housing enclosing the plurality of negative electrode material reservoirs;
a positive electrode material reservoir housing enclosing the plurality of positive electrode material reservoirs; and
a reaction chamber housing enclosing the reaction chamber.

20. The apparatus of claim 19, wherein the negative electrode material reservoir housing, the positive electrode material reservoir housing and the reaction chamber housing have interiors under vacuum.

21. The apparatus of claim 19, wherein the negative electrode material reservoir housing, the positive electrode material reservoir housing and the reaction chamber housing have interiors comprising air.

22. The apparatus of claim 19, wherein the negative electrode material reservoir housing, the positive electrode material reservoir housing and the reaction chamber housing have interiors comprising argon gas.

23. The apparatus of claim 19, further comprising a main housing enclosing the negative electrode material reservoir housing, the positive electrode material reservoir housing, and the reaction chamber housing.

24. The apparatus of claim 23, wherein an interior surface of the negative electrode material reservoir housing, an interior surface of the positive electrode material reservoir housing, an interior surface of the reaction chamber housing, and an interior surface of the main housing are coated with a coating material configured to protect the interiors surfaces from chemical attack from the electrode materials.

25. The apparatus of claim 1, further comprising:
a reaction chamber container comprising:
    a negative electrode container portion and forming, with the solid electrolyte, the negative electrode region, the negative electrode container portion having an inner surface coated with a negative electrode coating material configured to protect the negative electrode container portion from chemical attack from the negative electrode material; and
    a positive electrode container portion forming, with the solid electrolyte, the positive electrode region, the positive electrode container portion having an inner surface coated with a positive electrode coating material configured to protect the positive electrode container portion from chemical attack from the positive electrode material.

26. The apparatus of claim 25, wherein the negative electrode coating material and the positive electrode coating material are non-electrically conductive.

27. The apparatus of claim 26, further comprising:
a negative electrode current collector positioned within the negative electrode region and having a surface coated with a negative electrically conductive coating material configured to protect the negative electrode current collector from chemical attack from the negative electrode material; and
a positive electrode current collector positioned within the positive electrode region and having a surface coated with a positive electrically conductive coating material configured to protect the positive electrode current collector from chemical attack from the positive electrode material.

28. The apparatus of claim 27, wherein the positive non-electrically conductive coating material is the same as the negative non-electrically conductive coating material.

29. The apparatus of claim 25, wherein:
the negative electrode container portion is electrically conductive and forms a negative electrode current collector;
the positive electrode container portion is electrically conductive and forms a positive electrode current collector; and
the negative electrode coating material and the positive electrode coating material are electrically conductive.

30. The apparatus of claim 1, wherein a total fluid electrode material comprises the fluid positive electrode material and the fluid negative electrode material, the apparatus further comprising a thermal runaway mitigation system configured to, in response to a thermal runaway trigger, cool at least a portion of the total fluid electrode material.

31. The apparatus of claim 30, wherein the thermal runaway mitigation system is configured to cool at least the portion of the fluid electrode material to a temperature below the melting point of the at least the portion of the fluid electrode material to maintain the at least the portion of fluid electrode material in a solid state.

32. The apparatus of claim 30, wherein the thermal runaway mitigation system is configured to cool at least a portion of the fluid negative electrode material and at least a portion of the fluid positive electrode material.

33. The apparatus of claim 32, wherein the thermal runaway mitigation system is configured to cool at least the portion of the fluid negative electrode material to a negative electrode freezing temperature below the melting point of the at least the portion of fluid negative electrode material and to cool at least the portion of the fluid positive electrode material to a positive electrode freezing temperature below the melting point of the at least the portion of fluid positive electrode material.

34. The apparatus of claim 30, wherein the thermal runaway mitigation system is configured to direct a cooling heat transfer fluid to an area that allows the cooling heat transfer fluid to be thermally conductive with the at least the portion fluid electrode material.

35. The apparatus of claim 1, further comprising an auxiliary power supply configured to provide power to the heating system during a startup procedure where:
the reaction chamber is heated to bring negative fluid electrode material within the negative electrode region from a negative electrode initial temperature that is below a negative material melting point to a negative electrode operating temperature above the negative material melting point; and
the reaction chamber is heated to bring positive fluid electrode material within the positive electrode region from a positive electrode initial temperature that is below a positive material melting point to a positive electrode operating temperature above the positive material melting point.

36. The apparatus of claim 33, wherein during the startup procedure:
the selected negative reservoir is heated to bring negative fluid electrode material within the selected negative reservoir from a negative reservoir initial temperature that is below the negative material melting point to a negative reservoir operating temperature above the negative material melting point; and the selected positive reservoir is heated to bring positive fluid electrode material within the selected positive reservoir from a positive reservoir initial temperature that is below the positive material melting point to a positive reservoir operating temperature above the positive material melting point.

37. The apparatus of claim 1, wherein the solid electrolyte has a lithium iodide lattice comprising a plurality of lithium cations, a plurality of iodide anions and a plurality of defects.

38. The apparatus of claim 37, wherein the plurality of defects comprises a plurality of grain boundary defects associated with introduction of a plurality of nanoparticles to lithium iodide forming the lithium iodide.

39. The apparatus of claim 38, the plurality of grain boundary defects comprising at least one of:
a plurality of nanoparticle grain boundary defects resulting at grain boundaries of the plurality of nanoparticles; and
a plurality of pinned grain boundary defects formed prior to the introduction of the plurality of nanoparticles and maintained in the lithium iodide lattice at least partially as a result of the introduction of the plurality of nanoparticles.

40. A molten electrode battery system comprising:
a plurality of negative electrode reservoirs configured to contain a negative electrode material;
a plurality of positive electrode reservoirs configured to contain a positive electrode material;
a heating system configured to heat negative electrode material within a plurality of selected negative electrode reservoirs of the plurality of negative electrode reservoirs to maintain the negative electrode material contained in the selected plurality of negative electrode reservoirs in a fluid state and configured to heat positive electrode material in a plurality of selected positive electrode reservoirs to maintain the positive electrode material contained in the selected positive electrode reservoirs in a fluid state while maintaining, in a non-fluid state, negative electrode material in a non-selected negative electrode reservoir and positive electrode material in a non-selected positive electrode reservoir;
a plurality of reaction chambers, each reaction chamber comprising a solid electrolyte positioned in the reaction chamber to form a positive electrode region on a first side of the solid electrolyte and to form a negative electrode region on a second side of the solid electrolyte; and
an electrode material distribution system configured to:
cycle fluid positive electrode material between a first selected positive electrode reservoir of the plurality of selected positive electrode reservoirs and the positive electrode region of a first reaction chamber of the plurality of reaction chambers;
transfer, during a discharge state of the apparatus, fluid negative electrode material from a first selected negative electrode material reservoir of the selected negative electrode reservoirs to the negative electrode region of the first reaction chamber;
cycle fluid positive electrode material between a second selected positive electrode reservoir of the plurality of selected positive electrode reservoirs and the positive electrode region of a second reaction chamber of the plurality of reaction chambers; and
transfer, during a discharge state of the apparatus, fluid negative electrode material from a second negative electrode material reservoir of the selected negative electrode reservoirs to the negative electrode region of the second reaction chamber.

41. A flow battery system comprising:
a plurality of negative electrode reservoirs configured to contain a negative electrode material;
a plurality of positive electrode reservoirs configured to contain a positive electrode material;
a heating system configured to heat negative electrode material within a plurality of selected negative electrode reservoirs of the plurality of negative electrode reservoirs to maintain the negative electrode material contained in the selected plurality of negative electrode reservoirs in a fluid state and configured to heat positive electrode material in a plurality of selected positive electrode reservoirs to maintain the positive electrode material contained in the selected positive electrode reservoirs in a fluid state while maintaining, in a non-fluid state, negative electrode material in a non-selected negative electrode reservoir and positive electrode material in a non-selected positive electrode reservoir;
a plurality of reaction chambers, each reaction chamber comprising a solid electrolyte positioned in the reaction chamber to form a positive electrode region on a first side of the solid electrolyte and to form a negative electrode region on a second side of the solid electrolyte, each reaction chamber connected to at least one of the plurality of selected negative electrode reservoirs and at least one of the plurality of selected positive electrode reservoirs;
a negative electrode material reservoir housing enclosing the plurality of negative electrode material reservoirs and having an interior under vacuum;
a positive electrode material reservoir housing enclosing the plurality of positive electrode material reservoirs and having an interior under vacuum; and
a reaction chamber housing enclosing the reaction chamber and having an interior under vacuum.

42. The battery system of claim 41, further comprising a main housing enclosing the negative electrode material reservoir housing, the positive electrode material reservoir housing, and the reaction chamber housing.

43. The battery system of claim 42, wherein an interior surface of the negative electrode material reservoir housing, an interior surface of the positive electrode material reservoir housing, an interior surface of the reaction chamber housing, and an interior surface of the main housing are coated with a coating material configured to protect the interior surfaces from chemical attack from the contained electrode materials.

44. A battery system comprising:
a plurality of negative electrode reservoirs configured to contain a negative electrode material;
a plurality of positive electrode reservoirs configured to contain a positive electrode material;
a heating system configured to heat negative electrode material within a plurality of selected negative electrode reservoirs of the plurality of negative electrode reservoirs to maintain the negative electrode material contained in the selected negative electrode reservoirs in a fluid state and configured to heat positive electrode material in a plurality of selected positive electrode reservoirs of the plurality of positive electrode reservoirs to maintain the positive electrode material contained in the selected positive electrode reservoirs in a fluid state while maintaining, in a non-fluid state, negative electrode material in at least one non-selected negative electrode reservoir and positive electrode material in at least one non-selected positive electrode reservoir;

a plurality of reaction chambers, each reaction chamber comprising a solid electrolyte positioned in the reaction chamber to form a positive electrode region on a first side of the solid electrolyte and to form a negative electrode region on a second side of the solid electrolyte, the reaction chamber configured to receive fluid negative electrode material in the negative electrode region from at least one of the selected negative electrode reservoirs and to receive fluid positive electrode material in the positive electrode region from at least one of the selected positive electrode reservoirs.

45. The battery system of claim 44, wherein the second side is opposite the first side.

46. The battery system of claim 45, wherein the negative electrode material comprises lithium (Li), the positive electrode material comprises sulfur (S), and the solid electrolyte comprises lithium (Li).

47. The battery system of claim 46 wherein the solid electrolyte comprises lithium iodide (LiI).

48. The battery system of claim 46, wherein the positive electrode material comprises phosphorous (P).

49. The battery system of claim 44, wherein the heating system is configured to heat the selected positive electrode reservoirs to maintain the temperature of the positive electrode material within the selected positive electrode reservoirs between 115° C. and 469° C. and to heat the selected negative electrode reservoirs to maintain the temperature of the negative electrode material within the selected negative electrode reservoirs between 115° C. and 469° C.

50. The battery system of claim 49, wherein the heating system is configured to heat the selected positive electrode reservoirs to maintain the temperature of the positive electrode material within the selected positive electrode reservoirs between 365° C. and 469° C. and to heat the selected negative electrode reservoirs to maintain the temperature of the negative electrode material within the selected negative electrode reservoirs between 365° C. and 469° C.

51. The battery system of claim 50, wherein the heating system is configured to heat the selected positive electrode reservoirs to maintain the temperature of the positive electrode material within the selected positive electrode reservoirs between 365° C. and 444° C. and to heat the selected negative electrode reservoirs to maintain the temperature of the negative electrode material within the selected negative electrode reservoirs between 365° C. and 444° C.

52. The battery system of claim 51, wherein the heating system is configured to heat the selected positive electrode reservoirs to maintain the temperature of the positive electrode material within the selected positive electrode reservoirs between 375° C. and 425° C. and to heat the selected negative electrode reservoirs to maintain the temperature of the negative electrode material within the selected negative electrode reservoirs between 375° C. and 425° C.

53. The battery system of claim 46, wherein the heating system is configured to heat the selected positive electrode reservoirs to maintain the temperature of the positive electrode material within the selected positive electrode reservoirs at approximately 400° C. and to heat the selected negative electrode reservoirs to maintain the temperature of the negative electrode material within the selected negative electrode reservoirs at approximately 400° C.

54. The battery system of claim 44, wherein a total number of reaction chambers is at least 14.

55. The battery system of claim 54, wherein a total number of negative electrode material reservoirs is at least 280.

56. The battery system of claim 55, wherein a total number of positive electrode material reservoirs is at least 140.

* * * * *